United States Patent
Ale Ebrahim et al.

(10) Patent No.: US 11,673,097 B2
(45) Date of Patent: Jun. 13, 2023

(54) FILTRATION MEMBRANE AND METHODS OF USE AND MANUFACTURE THEREOF

(71) Applicant: VALORBEC, SOCIETE EN COMMANDITE, Montreal (CA)

(72) Inventors: Elnazsadat Ale Ebrahim, Montreal (CA); Christian Moreau, Boucherville (CA); Ali Dolatabadi, Montreal (CA); Md. Saifur Rahaman, Montreal (CA); Fariba Tarasi, Montreal (CA)

(73) Assignee: VALORBEC, SOCIETE EN COMMANDITE, Montréal (CA)

( * ) Notice: Subject to any disclaimer, the term of this patent is extended or adjusted under 35 U.S.C. 154(b) by 48 days.

(21) Appl. No.: 16/872,177

(22) Filed: May 11, 2020

(65) Prior Publication Data

US 2020/0353424 A1 Nov. 12, 2020

Related U.S. Application Data

(60) Provisional application No. 62/845,590, filed on May 9, 2019.

(51) Int. Cl.
*B01D 71/02* (2006.01)
*B01D 69/02* (2006.01)
(Continued)

(52) U.S. Cl.
CPC ......... *B01D 67/0039* (2013.01); *B01D 65/02* (2013.01); *B01D 65/08* (2013.01);
(Continued)

(58) Field of Classification Search
CPC .... B01D 67/0039; B01D 65/02; B01D 65/08; B01D 69/02; B01D 69/10; B01D 69/145;
(Continued)

(56) References Cited

U.S. PATENT DOCUMENTS

2006/0199024 A1 9/2006 Lima et al.
2009/0280262 A1* 11/2009 Tung ............... B01D 69/12
118/308
(Continued)

FOREIGN PATENT DOCUMENTS

CN 103623711 A 3/2014
CN 204563801 U 8/2015
(Continued)

OTHER PUBLICATIONS

Athanasekou, et.al., Prototype composite membranes of partially reduced graphene oxide/TiO2 for photocatalytic ultrafiltration water treatment under visible light, Applied Catalysis B: Environmental, vols. 158-159, 2014, pp. 361-372, ISSN 0926-3373, https://doi.org/10.1016/j.apcatb.2014.04.012. (Year: 2014).*
(Continued)

*Primary Examiner* — Bradley R Spies
*Assistant Examiner* — Jeannie McDermott
(74) *Attorney, Agent, or Firm* — Lavery, De Billy, LLP; Isabelle Pelletier

(57) ABSTRACT

A filtration membrane is provided. It comprises a porous support substrate and a porous active layer on top of the support substrate, wherein the active layer is formed of a network of interconnected, randomly arranged ceramic splats with ceramic particles occupying interstices between the splats, and wherein free spaces between the particles define a network of interconnected pores extending through the thickness of the active layer. There are also provided a method of filtering a feed using the membrane and a method of manufacturing the membrane by suspension plasma spraying.

20 Claims, 29 Drawing Sheets

(51) Int. Cl.
| | |
|---|---|
| B01D 65/08 | (2006.01) |
| B01D 69/14 | (2006.01) |
| B01D 67/00 | (2006.01) |
| B01D 69/10 | (2006.01) |
| C02F 1/72 | (2023.01) |
| C02F 1/32 | (2023.01) |
| B01D 65/02 | (2006.01) |
| C02F 101/30 | (2006.01) |

(52) U.S. Cl.
CPC .............. *B01D 69/02* (2013.01); *B01D 69/10* (2013.01); *B01D 69/145* (2013.01); *B01D 71/02* (2013.01); *C02F 1/32* (2013.01); *C02F 1/725* (2013.01); *B01D 2325/02* (2013.01); *C02F 2101/30* (2013.01); *C02F 2303/16* (2013.01); *C02F 2303/20* (2013.01); *C02F 2305/10* (2013.01)

(58) Field of Classification Search
CPC ................ B01D 71/02; B01D 2325/02; B01D 2311/2619; B01D 69/141; B01D 2321/343; B01D 2323/18; B01D 71/024; B01D 69/12; B01D 67/0041; C02F 1/32; C02F 1/725; C02F 2101/30; C02F 2303/16; C02F 2303/20; C02F 2305/10; C02F 1/444; Y02W 10/37
See application file for complete search history.

(56) References Cited

U.S. PATENT DOCUMENTS

| | | | |
|---|---|---|---|
| 2011/0244216 A1 | 10/2011 | Meyer et al. | |
| 2012/0052183 A1 | 3/2012 | Wu et al. | |
| 2013/0126773 A1* | 5/2013 | Ajdelsztajn | C23C 4/129 427/455 |
| 2013/0220126 A1 | 8/2013 | Hospach et al. | |
| 2013/0255499 A1 | 10/2013 | Gindrat et al. | |
| 2013/0260132 A1 | 10/2013 | Hazel et al. | |
| 2014/0197103 A1 | 7/2014 | Votaw et al. | |
| 2015/0140284 A1 | 5/2015 | Mantkowski et al. | |
| 2015/0162583 A1 | 6/2015 | Dadheech et al. | |
| 2015/0233256 A1 | 8/2015 | Anand et al. | |
| 2015/0258508 A1 | 9/2015 | Lopetegui Garnica et al. | |
| 2016/0273089 A1 | 9/2016 | Strock | |
| 2016/0281204 A1 | 9/2016 | Ucasz | |
| 2016/0320059 A1 | 11/2016 | Pearson et al. | |
| 2017/0016104 A1* | 1/2017 | Hazel | C23C 4/134 |
| 2017/0152753 A1 | 6/2017 | Serra et al. | |
| 2019/0275472 A1* | 9/2019 | Li | B01D 63/065 |

FOREIGN PATENT DOCUMENTS

| | | |
|---|---|---|
| CN | 206476792 U | 9/2017 |
| CN | 108787370 A | 11/2018 |
| CN | 108793978 A | 11/2018 |
| DE | 102014222686 A1 | 5/2016 |
| KR | 20180076523 A | 7/2018 |
| WO | 9820181 A1 | 5/1998 |
| WO | 2014126633 A | 11/2014 |
| WO | 2018073538 A1 | 4/2018 |

OTHER PUBLICATIONS

D. Grey, D. Garrick, D. Blackmore, J. Kelman, M. Muller, and C. Sadoff, "Water security in one blue planet: twenty-first century policy challenges for science.," Philos. Trans. A. Math. Phys. Eng. Sci., vol. 371, No. 2002, pp. 201-204, 2013.
M. M. Pendergast and E. M. V. Hoek, "A review of water treatment membrane nanotechnologies," Energy Environ. Sci., vol. 4, No. 6, p. 1946, 2011.
M. M. Mekonnen and Y. A. Hoekstra, "Four Billion People Experience Water Scarcity", Sci. Adv., vol. 2:e1500323, No. Feb. pp. 1-7, 2016.
C. J. Vörösmarty, P.B. McIntyre, M. O. Gessner, D. Dudgeon, A. Prusevich, P. Green, S. Glidden, S. E. Bunn, C. A. Sullivan, C.R. Liermann, and P.M. Davies, "Global threats to human water security and river biodiversity", Nature, vol. 467, No. 7315, pp. 555-561, 2010.
R. Herman, S. Sampath, and R. McCune, "Thermal Spray: Current Status and Future Trends", MRS Bull., vol. 25, No. 7, pp. 17-25, 2000.
J.V. Heberlein, P. Fauchais and M. Boulos, "Thermal Spray Fundamentals", New York: Springer, 2014.
M. Mulder, "Basic principles of membrane technology", Dordrecht: Kluwer Acad. PubL, 2010.
S. Alzahrani and A. W. Mohammad, "Challenges and trends in membrane technology implementation for produced water treatment: A review", J. Water Process Eng., vol. 4, pp. 107-133,2014.
H. E. Johnson and B. L. Schulman, "Assessment of the potential for refinery applications of inorganic membrane technology: An identification and screening analysis. Final report.", No. DOE/FE/61680-H3. Sfa Pacific, Inc., Mountain View, CA (United States), 1993.
R. W. Baker, "Membrane Technology and Applications", Hoboken, N.J.: Wiley, 2013.
B. Van Der Bruggen, C. Vandecasteele, T. Van Gestel, W. Doyen, and R. Leysen, "A review of pressure-driven membrane processes in wastewater treatment and drinking water production", Environ. Prog., vol. 22, No. 1, pp. 46-56, 2003.
M. Ulbricht, "Advanced functional polymer membranes", vol. 47, No. 7, pp. 2217-2262, 2006.
R. W. Baker and B. T. Low, "Gas separation membrane materials: A perspective", Macromolecules, vol. 47, No. 20, pp. 5999-7013, 2014.
A. Prakash Rao, N. V Desai, and R. Rangarajan, "Interfacially synthesized thin film composite RO membranes for seawater desalination", J. Membr. Sci., vol. 124, No. 2, pp. 263-272,1997.
A. Sagle and B. Freeman, "Fundamentals of membranes for water treatment", Futur. Desalin. Texas, vol. 2, No. 137, pp. 1-17, 2004.
J. Kim and B. Van Der Bruggen, "The use of nanoparticles in polymeric and ceramic membrane structures: Review of manufacturing proceduresand performance improvement for water treatment", Environ. Pollut., vol. 158, No. 7, pp. 2335-2349, 2010.
A. Rahimpour, M. Jahanshahi, B. Rajaeian, and M. Rahimnejad, "TiO2 entrapped nanocomposite PVDF/SPES membranes: Preparation, characterization, antifouling and antibacterial properties", Desalination, vol. 278, No. 1-3, pp. 343-353, 2011.
L. Yan, Y. S. Li, and C. B. Xiang, "Preparation of polyfvinylidene fluoride)(pvdf) ultrafiltration membrane modified by nano-sized alumina (Al2O3) and its antifouling research", Polymer., vol. 46, No. 18, pp. 7701-7706, 2005.
M. Zargar, Y. Hartanto, B. Jin, and S. Dai, "Polyethylenimine modified silica nanoparticles enhance interfacial interactions and desalination performance of thin film nanocomposite membranes", J. Memb. Sci., vol. 541, pp. 19-28, 2017.
A. Bottino, G. Capannelli, and A. Comite, "Preparation and characterization of novel porous PVDF-ZrO2 composite membranes", Desalination, vol. 146, No. 1-3, pp. 35-40, 2002.
L. Huang, S. Zhao, Z. Wang, J. Wu, J. Wang, and S. Wang, "In situ immobilization of silver nanoparticles for improving permeability, antifouling and anti-bacterial properties of ultrafiltration membrane", J. Memb. Sci., vol. 499, pp. 269-281, 2016.
J. Finley, "Ceramic membranes: A robust filtration alternative", Filtr. Sep., vol. 42, No. 9,pp. 34-37, 2005.
T. Tsuru, "Inorganic Porous Membranes for Liquid Phase Separation", J. Separation & purification methods, vol. 30, No. 2, pp. 191-220, 2001.
M. M. Cortalezzi, J. Rose, A. R. Barron, and M. R. Wiesner, "Characteristics of ultrafiltration ceramic membranes derived from alumoxane nanoparticles", J. Memb. Sci., vol. 205, No. 1-2, pp. 33-43, 2002.
R. R. Bhave, J. Guibaud and R. Rumeau, "Inorganic Membranes Synthesis, Characteristics and Applications", Dordrecht: Springer, 1991.

(56) References Cited

OTHER PUBLICATIONS

X. Ding, Y. Fan, and N. Xu, "A new route for the fabrication of TiO2 ultrafiltration membranes with suspension derived from a wet chemical synthesis", J. Memb. Sci., vol. 270, No. 1-2, pp. 179-186, 2006.

Y. Lv, H. Liu, Z. Wang, L. Hao, Y. Sang, D. Liu, J. Wang, and R. Boughton, "Silver nanoparticle-decorated porous ceramic composite for water treatment," J. Memb. Sci., vol. 331, No. 1-2, pp. 50-56, Apr. 2009.

B.S. Karnik, S.H. Davies, M.J. Baumann, and S.J. Masten, "Fabrication of Catalytic Membranes for the Treatment of Drinking Water Using Combined Ozonation and Ultrafiltration", vol. 39, No. 19, pp. 7656-7661, 2005.

N. Ma, X. Quan, Y. Zhang, S. Chen, and H. Zhao, "Integration of separation and photocatalysis using an inorganic membrane modified with Si-doped TiO2 for water purification", J. Memb. Sci., vol. 335, No. 1-2, pp. 58-67, 2009.

"Wastewater UV Disinfection Systems—Trojan UV", [Online]. Accessed on Jul. 5, 2018. Available: https://www.trojanuv.com/products/wastewater/.

S. K. Sastry, A. K. Datta, and R. W. Worobo, "Ultraviolet Light", J. Food Sci., vol. 65, No. 8, pp. 90-92, 2000.

"Fresh-Aire UV", [Online]. Accessed on Jul. 5, 2018. Available: https://www.freshaireuv.com/index.html.

Air Oasis UV PCO Air Purifiers, UV Air Cleaners Sanitizers, [Online]. Accessed on Jul. 5, 2018. Available: https://www.air-oasis-uv-pco-sanitizers.com/.

C. Ramli, Z. Amali, N. Asim, W.N. Isahak, Z. Emdadi, N. Ahmad-Ludin, M.A Yarmo, M.A. and K. Sopian, "Photocatalytic degradation of methylene blue under UV light irradiation on prepared carbonaceous TiO2", Scientific World Journal., 2014.

C. G. Joseph, Y. H. Taufiq-Yap, G. Li Puma, K. Sanmugam, and K. S. Quek, "Photocatalytic degradation of cationic dye simulated wastewater using four radiation sources, UVA, UVB, UVC and solar lamp of identical power output", Desalin. Water Treat., vol. 57, No. 17, pp. 7976-7987, 2016.

C. Xu, G. P. Rangaiah, and X. S. Zhao, "Photocatalytic Degradation of Methylene Blue by Titanium Dioxide: Experimental and Modeling Study", J. Ind & Eng Chemistry research, vol. 53, No. 38, pp. 14641-14649, 2014.

E. Bannier, G. Darut, E. Sánchez, A. Denoirjean, M.C. Bordes, M. D. Salvador, E. Rayón, E. and H. Ageorges, "Microstructure and photocatalytic activity of suspension plasma sprayed TiO2 coatings on steel and glass substrates", Surf. Coatings Technol., vol. 206, No. 2-3, pp. 378-386, 2011.

S. Kozerski, F. L. Toma, L. Pawlowski, B. Leupolt, L. Latka, and L. M. Berger, "Suspension plasma sprayed TiO2 coatings using different injectors and their photocatalytic properties", Surf. Coatings Technol., vol. 205, No. 4, pp. 980-986, 2010.

F.-L. Toma, G. Bertrand, D. Klein, C. Coddet, and C. Meunier, "Nanostructured photocatalytic titania coatings formed by suspension plasma spraying", J. Therm. Spray Technol., vol. 15, No. 4, pp. 587-592, 2006.

J. H. Carey, J. Lawrence, and H. M. Tosine, "Photodechlorination of PCB's in the Presence of Titanium Dioxide in Aqueous Suspensions." Bull. of Environmental Contamination and Toxicology, vol. 16, No. 6, pp. 697-701, 1976.

E. Friedler and Y. Gilboa, "Performance of UV disinfection and the microbial quality of greywater effluent along a reuse system for toilet flushing", Sci. Total Environ., vol. 408, No. 9, pp. 2109-2117, Apr. 2010.

C. Sattler, L. de Oliveira, M. Tzschirner, and A. E. H. Machado, "Solar photocatalytic water detoxification of paper mill effluents", Energy, vol. 29, No. 5-6, pp. 835-843, Apr. 2004.

M. R. Hoffmann, S. T. Martin, W. Choi, D. W. Bahnemannt, and W. M. Keck, "Environmental Applications of Semiconductor Photocatalysis", Chem. Rev, vol. 95, No. 1, pp. 69-96, 1995.

F. L. Toma, L. M, Berger, I. Shakhverdova, B. Leupolt, A. Potthoff, K. Oelschlägel, T. Meissner, J. Gomez, and Y. Miguel, "Parameters Influencing the Photocatalytic Activity of Suspension-Sprayed TiO2 Coatings", J. Therm. Spray Technol., vol. 23, No. Oct. pp. 1-17, 2014.

K. Madhusudan Reddy, S. V Manorama, and A. Ramachandra Reddy, "Bandgap studies on anatase titanium dioxide nanoparticles", Mater. Chem. Phys., vol. 78, No. 1, pp. 239-245, 2003.

Y. Ao, J. Xu, D. Fu, L. Ba, C. Yuan, "Deposition of anatase titania onto carbon encapsulated magnetite nanoparticles", Nanotechnol., vol. 19, No. 40, pp. 405604, 2008.

R. Molinari, M. Mungari, E. Drioli, A. Paola, and V. Loddo, "Study on a photocatalytic membrane reactor for water purification", Catal. Today, vol. 55, No. 1-2, pp. 71-78, 2000.

R.-X. Zhang, L. Braeken, P. Luis, X.-L. Wang, and B. Van Der Bruggen, "Novel binding procedure of TiO 2 nanoparticles to thin film composite membranes via self-polymerized polydopamine", J. Memb. Sci., vol. 437, pp. 179-188, 2013.

S. S. Chin, K. Chiang, and A. G. Fane, "The stability of polymeric membranes in a TiO2 photocatalysis process", J. Memb. Sci., vol. 275, No. 1-2, pp. 202-211, Apr. 2006.

H. Choi, E. Stathatos, and D. D. Dionysiou, "Sol-gel preparation of mesoporous photocatalytic TiO2 films and TiO2/Al2O3 composite membranes for environmental applications", Appl. Catal. B Environ., vol. 63, No. 1-2, pp. 60-67, 2006.

F. L. Toma, L. M. Berger, C. C. Stahr, T. Naumann, and S. Langner, "Microstructures and functional properties of suspension-sprayed Al 2O 3 and TiO 2 coatings: An overview", J. Therm. Spray Technol., vol. 19, No. 1-2, pp. 262-274, 2010.

E. S. C. Fan and O. Kesler, "Deposition of Lanthanum Strontium Cobalt Ferrite (LSCF) Using Suspension Plasma Spraying for Oxygen Transport Membrane Applications", J. Therm. Spray Technol., vol. 24, No. 6, pp. 1081-1092, 2015.

A. Killinger, R. Gadow, G. Mauer, A. Guignard, R Vaßen, and D. Stöver, "Review of New Developments in Suspension and Solution Precursor Thermal Spray Processes", J. Therm. Spray Technol., vol. 20, No. 4, pp. 677, 2011.

O. Kesler, "Plasma Spray Processing of Solid Oxide Fuel Cells", Mater. Sci. Forum, vol. 539, pp. 1385-1390, 2007.

P. Fauchais, M. Vardelle, A. Vardelle, and L. Bianchi, "Plasma Spray: Study of the Coating Generation", Ceram. Int. Publ. bv Elsevier Sci. Ltd. Techna S.r, vol. 221, No. 95, pp. 295-303, 1996.

G. Ramakrishnan, G. Dwivedi, S. Sampath, and A. Orlov, "Development and optimization of thermal sprayed ceramic microfiltration membranes", J. Memb. Sci., vol. 489, pp. 106-111, Sep. 2015.

X. Ma, J. Dai, H. Zhang, J. Roth, T. D. Xiao, and D. E. Reisner, "Solid Oxide Fuel Cell Development by Using Novel Plasma Spray Techniques", J. Fuel Cell Sci. Technol., vol. 2, No. 3, p. 190, 2005.

A. A. Kulkarni, S. Sampath, A. Goland, and H. Herman, "Plasma spray coatings for producing next-generation supported membranes", Top. Catal., vol. 32, No. 3-4, pp. 241-249, 2005.

S. S. Madaeni, M. E. Aalami-Aleagha, and P. Daraei, "Preparation and characterization of metallic membrane using wire arc spraying", J. Memb. Sci., vol. 320, No. 1-2, pp. 541-548, 2008.

K. L. Tung, C. Hsiung, T.C. Ling, K.S Chang, T. Wu, and Y.L. Li, "Preparation and characterization of aluminum oxide cermet microfiltration membrane using atmospheric plasma spraying", Desalination, vol. 245, No. 1-3, pp. 408-421, 2009.

F. L. Toma, A. Potthoff, L. M. Berger, and C. Leyens, "Demands, Potentials, and Economic Aspects of Thermal Spraying with Suspensions: A Critical Review", J. Therm. Spray Technol., vol. 24, No. 7, pp. 1143-1152, 2015.

R. Vaßen, H. Kaßner, G. Mauer, and D. Stöver, "Suspension Plasma Spraying: Process Characteristics and Applications", J. Therm. Spray Technol., vol. 19, No. 1-2, pp. 219-225, Jan. 2010.

L. Pawlowski, "Suspension and solution thermal spray coatings", Surf. Coatings Technol., vol. 203, No. 19, pp. 2807-2829, 2009.

P. Fauchais, V. Rat, C. Delbos, J. F. Coudert, and T. Chartier, "Understanding of Suspension DC Plasma Spraying of Finely Structured Coatings for SOFC", Trans. on Plasma Sci., vol. 33, No. 2, pp. 920-930, 2010.

P. Fauchais, R. Etchart, and C. Delbos, "Suspension and solution plasma spraying of finely structured layers: potential application to SOFCs", J. Phys. D Appl. Phys, vol. 40, pp. 2394-2406, 2007.

(56) References Cited

OTHER PUBLICATIONS

N. Sharifi, M. Pugh, C. Moreau, and A. Dolatabadi, "Developing hydrophobic and superhydrophobic TiO2 coatings by plasma spraying", Surf. Coat. Technol., vol. 289, pp. 29-36, 2016.

A. Vardelle, C. Moreau, N. J. Themelis, and C. Chazelas, "A Perspective on Plasma Spray Technology", Plasma Chem. and Plasma Process., vol. 35, No. 3, pp. 491-509, May 2015.

P. Fauchais, V. Rat, J. F. Coudert, R. Etchart-Salas, and G. Montavon, "Operating parameters for suspension and solution plasma-spray coatings", Surf. Coatings Technol., vol. 202, No. 18, pp. 4309-4317, 2008.

P. Fauchais and A. Vardelle, "Solution and Suspension Plasma Spraying of Nanostructure Coatings", Adv. Plasma Spray Appl., No. Mar. 2012, pp. 149-188, 2012.

P. Fauchais, R. Etchart-Salas, V. Rat, J. F. Coudert, N. Caron, and K. Wittmann-Ténèze, "Parameters controlling liquid plasma spraying: Solutions, sols, or suspensions", J. Therm. Spray Technol., vol. 17, No. 1, pp. 31-59, Mar. 2008.

J. O. Berghaus, J.-G. Legoux, C. Moreau, F. Tarasi, and T. Chrska, "Mechanical and Thermal Transport Properties of Suspension Thermal-Sprayed Alumina-Zirconia Composite Coatings", J. Therm. Spray Technol., vol. 17, No. 1 pp. 91 104, 2008.

K. Vanevery, M. Krane, R.W. Trice, and, H. Wang, "Column Formation in Suspension Plasma-Sprayed Coatings and Resultant Thermal Properties", J. Therm. Spray Technol., vol. 20, No. 4, pp. 817-828, 2011.

F. L. Toma, L. M. Berger, D. Jacquet, and D. Wicky, "Comparative study on the photocatalytic behaviour of titanium oxide thermal sprayed coatings from powders and suspensions", Surf. Coatings Technol., vol. 203, No. 15, pp. 2150-2156, 2009.

F. L. Toma, G. Bertrand, D. Klein, C. Meunier, and S. Begin, "Development of photocatalytic active Tio2 surfaces by thermal spraying of nanopowders", J. Nanomater., vol. 2008, No. 1, p. 58, 2008.

D. A. H. Hanaor and C. C. Sorrell, "Review of the anatase to rutile phase transformation", J. Material Sci., vol. 46, No. 4, pp. 855-874, 2011.

G. Mauer, A. Guignard, and R. Vaßen, "Plasma spraying of efficient photoactive TiO2 coatings". Surf. Coatings Technol., vol. 220, pp. 40-43, 2013.

E. S. C. Fan and O. Kesler, "Deposition of Lanthanum Strontium Cobalt Ferrite (LSCF) Using Suspension Plasma Spraying for Oxygen Transport Membrane Applications", J. Therm. Spray Technol., vol. 24, No. 6, pp. 1081-1092, Aug. 2015.

M. C. Bordes, M. Vincent, A. Moreno, and R. Moreno, "Microstructure and photocatalytic activity of APS coatings obtained from different TIO2 nanopowders", Surf. Coatings Technol., vol. 220, pp. 179-186, Apr. 2013.

O. Rezania, "Anelastic Behavior of Suspension Plasma Sprayed Ceramic Coatings", Master, Concordia University, 2016.

R. Rampon, O. Marchand, C. Filiatre, and G. Bertrand, "Influence of suspension characteristics on coatings microstructure obtained by suspension plasma spraying", Surf. Coatings Technol., vol. 202, No. 18, pp. 4337-4342, Jun. 2008.

A. B. Abell, K. L. Willis, and D. A. Lange, "Mercury Intrusion Porosimetry and Image Analysis of Cement-Based Materials", J. Colloid & Interface Sci., vol. 211, No. 1, pp. 39-44. Mar. 1999.

S. hee Kim and C. C. Chu, "Pore structure analysis of swollen dextran-methacrylate hydrogels by SEM and mercury intrusion porosimetry", J. Biomed. Mater. Res., vol. 53, No. 3, pp. 258-266, 2000.

"HP4750 Assembly & Operational Manual", Sterlitech Corporation, 2018. Accessed on Jul. 5, 2018, [Online]. Available: https://www.sterlitech.com/media/wysiwyg/Manual2018/Manual_HP4750.pdf.

K. Fischer, M. Grimm, J. Meyers, C. Dietrich, R. Gläser, and A. Schulze, "Photoactive microfiltration membranes via directed synthesis of TiO2 nanoparticles on the polymer surface for removal of drugs from water", J. Membrane Sci., vol. 478, pp. 49-57, 2015.

D. J. Udonne, N. A. Folami, "Treatment of Industrial Waste Effluent Using Treated Bagasse", Int. J. Sci. Eng. Res., vol. 7, No. 3, pp. 389-397, 2016.

Z. Živcová, E. Gregorová, W. Pabst, D. S. Smith, A. Michot, and C. Poulier, "Thermal conductivity of porous alumina ceramics prepared using starch as a pore-forming agent", J. Eur. Ceram. Soc., vol. 29, No. 3, pp. 347-353, Feb. 2009.

H. Kassner, R. Siegert, D. Hathiramani, R. Vassen, and D. Stoever, "Application of suspension plasma spraying (SPS) for manufacture of ceramic coatings", J. Therm. Spray Technol., vol. 17, No. 1, pp. 115-123, 2008.

S. Sampath, X. . Jiang, J. Matejicek, A. . Leger, and A. Vardelle, "SubsliaLe temperature effects on splat formation, microstructure development and properties of plasma sprayed coatings Part I: Case study for partially stabilized zirconia", Mater. Sci. Eng. A, vol. 272, No. 1, pp. 181-188, Nov. 1999.

C. G. Joseph, Y. H. Taufiq-Yap, G. Li Puma, K. Sanmugam, and K. S. Quek, "Photocatalytic degradation of cationic dye simulated wastewater using four radiation sources, UVA, UVB, UVC and solar lamp of identical power output", Desalination Water Treatment, vol. 57, No. 17, pp. 7976-7987, 2016.

Tarasi, F., Alebrahim, E., Dolatabadi, A., & Moreau, C., "A Comparative Study of YSZ Suspensions and coatings", Coatings, 9(3), 188, 2019.

A. Larbot, J.P. Fabre, C. Guizard, L. Cot, "Inorganic membranes obtained by sol-gel techniques", J. Memb. Sci. 39 (1988) 203-212. doi:10.1016/S0376-7388(00)80929-1.

F.L. Toma, L.M. Berger, C.C. Stahr, T. Naumann, S. Langner, "Microstructures and functional properties of suspension-sprayed Al 2O 3 and TiO 2 coatings: An overview", Journal of Thermal Spray Technology, vol. 19 (1-2), Jan. 2010, pp. 262-274. doi:10.1007/s11666-009-9417-z.

P. Fauchais, R. Etchart-Salas, V. Rat, J.F. Coudert, N. Caron, K. Wittmann-Ténèze, "Parameters controlling liquid plasma spraying: Solutions, sols, or suspensions", Journal of Thermal Spray Technology, vol. (17(1), Mar. 2008. pp. 31-59. doi:10.1007/s11666-007-9152-2.

Mengjiao Zhai et al., "Efficient suspension plasma spray fabrication of black titanium dioxide coatings with visible light absorption performances", Ceramics International 45 (2019) pp. 930-935.

M. Le Bechec, N. Costarramone, T. Pigot, S. Lacombe, "Gas-Phase Photooxidation: Reactors and Materials", Chem. Eng. Technol., (2016) 39, No. 1 pp. 26-38. https://doi.org/10.1002/ceat.201500349.

X. Qiu, M. Miyauchi, K. Sunada, M. Minoshima, M. Liu, Y. Lu, D. Li, Y. Shimodaira, Y. Hosogi, Y. Kuroda, K. Hashimoto, "Hybrid CuxO/TiO2 nanocomposites as risk-reduction materials in indoor environments", ACS Nano, vol. 6, No. 2 (2012), pp. 1609-1618. https://doi.org/10.1021/nn2045888.

K. Sunada, M. Minoshima, K. Hashimoto, "Highly efficient antiviral and antibacterial activities of solid-state cuprous compounds", Journal of Hazardous Materials, 235-236 (2012), pp. 265-270. https://doi.org/10.1016/j.hazmat.2012.07.052.

M. Thukkaram, P. Cools, A. Nikiforov, P. Rigole, T. Coenye, P. Van Der Voort, G. Du Laing, C. Vercruysse, H. Declercq, R. Morent, L. De Wilde, P. De Baets, K. Verbeken, N. De Geyter, "Antibacterial activity of a porous silver Toped TiO 2 coating on titanium substrales synthesized by plasma electrolytic oxidation", (2019) https://doi.org/10.1016/j.apsusc.2019.144235.

R. Mallada and M. Menéndez, "Inorganic membranes: synthesis, characterization and applications", Amsterdam: Elsevier, 2013. (Part 1 to 5).

Miranda, F., Caliari, F., Essiptchouk A. and Pertraconi, G. , Atmospheric Plasma Spray Processes: From Micro to Nanostructures, in A. Nikiforov, & Z. Chen (Eds.), Atmospheric Pressure Plasma—from Diagnostics to Applications. IntechOpen, 2018.

Lin, Y. F., Tung, K. L., Tzeng, Y. S., Chen, J. H., & Chang, K. S., Rapid atmospheric plasma spray coating preparation and photocatalytic activity of macroporous titania nanocrystalline membranes. Journal of membrane science, (2012) 389, pp. 83-90.

P. Fauchais, Understanding plasma spraying, J. Phys. D. Appl. Phys. 37 (2004). https://doi.org/10.1088/0022-3727/37/9/R02.

E. Alebrahim, F. Tarasi, M.S. Rahaman, A. Dolatabadi, C. Moreau, Fabrication of titanium dioxide filtration membrane using suspen-

(56) References Cited

OTHER PUBLICATIONS sion plasma spray process, Surf. Coatings Technol., 378 (2019). https://doi.org/10.1016/j.surfcoat.2019.124927.

K.-L. Tung, K.L. Tung, C.J. Chuang, C.C. Hsiung, T.C. Ling, Al2O3, Microporous membranes prepared on wet substrate by plasma spray coating technology Membrane filtration View project Al2O3 n.d. https://www.researchgate.net/publication/267917756 (accessed Nov. 12, 2018).

K.L. Tung, C.C. Hsiung, T.C. Ling, K.S. Chang, T.T. Wu, Y.L. Li, C.H. Kang, W.Y. Chen, D. Nanda, Preparation and characterization of aluminum oxide cermet microfiltration membrane using atmospheric plasma spraying, Desalination, 245 (2009), pp. 408-421. https://doi.org/10.1016/J.DESAL.2009.02.004.

Holger Kassner, Roberto Siegert, Dag Hathiramani, Robert Vassen, and Detlev Stoever, Application of Suspension Plasma Spraying (SPS) for Manufacture of Ceramic Coatings, Journal of Thermal Spray Technology, vol. 17(1), 2008, pp. 115-123.

R. Vaen, H. Kaner, G. Mauer, D. Stöver, Suspension plasma spraying: Process characteristics and applications, in: Journal of Therm. Spray Technol., 2010: pp. 219-225. https://doi.org/10.1007/s11666-009-9451-x.

G.R. Li, B.W. Lv, G.J. Yang, W.X. Zhang, C.X. Li, C.J. Li, Relationship Between Lamellar Structure and Elastic Modulus of Thermally Sprayed Thermal Barrier Coatings with Intra-splat Cracks, J. Therm. Spray Technol. 24 (2015) 1355-1367. https://doi.org/10.1007/s11666-015-0292-5.

A.A. Kulkarni, S. Sampath, A. Goland, H. Herman, A.J. Allen, J. Ilavsky, W. Gong, S. Gopalan, Plasma spray coatings for producing next-generation supported membranes, Top. Catal. 32 (2005) 241-249. https://doi.org/10.1007/s11244-005-2905-6.

P. Fauchais, Vincent Rat, Cedric Delbos, Jean Franois Coudert, Thierry Chartier, and Luc Bianchi, Understanding of Suspension DC Plasma Spraying of Finely Structured Coatings for SOFC, IEEE Transactions on Plasma Science, vol. 33, No. 2, 2005, pp. 920-930.

Girish Ramakrishnan, Gopal Dwivedi, Sanjay Sampath, Alexander Orlov, Development and optimization of thermal sprayed ceramic microfiltration membranes, Journal of Membrane Science, 489, 2015, pp. 106-111.

\* cited by examiner

FILTRATION MEMBRANE AND METHODS OF USE AND MANUFACTURE THEREOF

CROSS REFERENCE TO RELATED APPLICATIONS

This application claims benefit, under 35 U.S.C. § 119(e), of U.S. provisional application Ser. No. 62/845,590, filed on May 3, 2019. All documents above are incorporated herein in their entirety by reference.

FIELD OF THE INVENTION

The present invention relates to filtration membranes. More specifically, the present invention is concerned with filtration membrane with an active layer with a unique microstructure.

BACKGROUND OF THE INVENTION

Liquid Filtration Membranes

Removing hazardous pollutants is a major concern of many industries such as chemical, petrochemical, mechanical, automotive, textile, pulp and paper, biotechnology, cosmetic, pharmaceutical and food and beverages. Filtration using membranes is known as an effective, sustainable, inexpensive and eco-friendly technique to remove contaminants. Water treatment is another major area, in which filtration plays an important role.

During the last century, global water demand has increased drastically due to the growth in global population resulting in increase in water demand by sevenfold. Around 4 billion people live under conditions of severe water scarcity for at least 1 month of the year, while 0.5 billion people experience severe water scarcity through the whole year. Beside the global water shortage, poor water quality in many parts of the world is the main cause for diseases such as cholera and diarrhea. Managing the current water challenge requires better protection of the remaining water resources as well as development of affordable and modern water treatment methods.

Nowadays, gas separation, pervaporation and electrochemical processes are used for many separation purposes. However, pressure-driven membranes have remained the most dominant in the field of water treatment technologies. Table 1 shows the classification of pressure driven membranes in four groups, namely micro filtration, ultrafiltration, nano-filtration and reverse osmosis, based on the pore size, permeability, pressure under which they perform and their selectivity.

TABLE 1

Classification of filtration membranes [12].

| | Micro-filtration | Ultra-filtration | Nano-filtration | Reverse Osmosis |
|---|---|---|---|---|
| Permeability (L/h · m² · bar) | >1000 | 10-1000 | 1.5-3 | 0.005-1.5 |
| Pressure (bar) | 0.1-2 | 0.1-5 | 3-20 | 5-120 |
| Pore size (nm) | 100-10,000 | 2-100 | 0.5-2 | <0.5 |
| Rejected species: | − | − | − | + |
| Monovalent ions | − | −/+ | + | + |
| Multivalent ions | − | − | −/+ | + |
| Small organic compounds | − | + | + | + |
| Macromolecules Partides | + | + | + | + |
| Separation mechanism | Sieving | Sieving | Sieving, Charge effects | Solution diffusion |
| Applications | Clarification, Pre-treatment, Removal of bacteria | Removal of multi molecules, bacteria, viruses | Removal of multivalent ions and relatively small organics | Ultrapure water, desalination |

A membrane is basically a selective barrier between two environments. Based on the material used to manufacture membranes, they are classified in four groups, namely organic polymer, inorganic, organic-inorganic (mixed matrix); and biological membranes. Most of the technically used membranes are organic polymer membranes, such as thin film composite membranes.

Enhanced mechanical, thermal, and chemical stability of ceramics makes them an ideal material to produce separation membranes especially those to be employed in aggressive environments. However, improvements in membranes properties, such as productivity, selectivity, fouling resistance and stability, are needed.

Ceramic membranes are commercially fabricated by slip casting-sintering method and to a more limited level by sol-gel technique. However, their application has been limited to those areas in which polymer membranes cannot be used, due to their higher price which has been made them unsuitable for large scale applications. New manufacturing methods are needed to be developed to produce inexpensive membranes.

Ceramic water treatment membranes, their characteristics and fabrication methods will be discussed in detail in the next sections.

Ceramic membranes with their superior properties propose an interesting solution for liquid filtering purposes in many industries. Polymer membranes are not reliable in aggressive acidic or basic environments, would dissolve in many solvents and cannot be used in temperatures over 100° C. Furthermore, ceramic membranes can be cleaned by back flush, by high temperature sterilization or by chemical agents and they do not swell or deform.

On the other hand, compared to polymer membranes, ceramic membranes are more expensive and sealing them in metallic housing is not easy. In addition, they are brittle, much heavier and have lower packing density.

Ceramic water treatment membranes have been traditionally produced by slip casting technique and to a more limited level by sol-gel method with an asymmetric microstructure, which is illustrated in FIG. 1. This structure is built of multiple porous layers on top of each other, in which pore size and thickness of the layers decrease respectively from the bottom layer to the top layer. The bottom layer with the largest pore size provides the mechanical support for the membrane system as well as a low-resistance path for water to pass.

The substrate is usually manufactured using a mixture of metal oxide powders and binders by extrusion or slip-casting with the thickness of the order of mm and have pore sizes larger than 1 μm. The role of the intermediate layer(s) with medium pore size is to receive the filtering layer and preventing the top layer material to penetrate into the large pores of the support and also to provide a smoother surface for the application of much thinner filtering layer during the synthesis process. Furthermore, the intermediate layer adjusts the pressure gradient through the membrane system. However, in many cases this layer can be omitted. The top layer, which is the filtering layer has the smallest pore size. The filtering layer should be uniform, defect free with a narrow pore size distribution and very thin. This is the configuration that serves both quality and quantity purposes, since it provides a highly selective barrier with elevated flux. However, producing a defect free filtering layer is not easy with commercial manufacturing methods. A too thick layer is more prone to crack during drying and sintering process and a too thin layer is more likely to form incompletely, thus not covering the whole surface of the substrate. The ideal thickness for the filtering layer is still not clear. However, it has been suggested that the thickness should be more than 50 times the diameter of the particles used for fabricating the filtering layer. Since the flux is inversely proportional to the thickness of the separation layer, it should be thin enough to obtain a reasonably high flux. On the other hand, it should be thick enough to allow the filtering process to take place.

Slip casting and sol-gel are conventional processes for manufacturing inorganic membranes. In all these methods, the fabrication process includes several steps in which ceramic nanoparticles are deposited on the surface of a porous substrate and are heat treated in order to produce a chemically attached membrane. However, application of nanoparticles in ceramic membranes is not easy due to difficulty of immobilization of these particles on commercial ceramic membranes [17]. In the slip casting route, the substrate is coated with a suspension inorganic powder and binders to form a thin layer. The membrane layer is formed after drying and sintering of the inorganic layer [1]. The sol-gel process may go through two routs; peptization of hydroxides or metallic salts or controlled hydrolysis of alkoxides [1]. In both of these methods, the substrate is coated with the sol and is dried to form the gel. The gel is heat treated to form the inorganic membrane layer [1]. There have been several efforts to find an organic binder or other connecting elements in order to overcome this issue [28][29][30]. It has to be underlined that before the sintering process the pore size of the membrane is dependent on the particle size of the precursor. However, it has been shown that the sintering process drastically influences the pore size of the membrane. Bhave et al. found that the pore size of $TiO_2$ based membranes increased 30 times by increasing the sintering temperature from 550° C. to 1100° C. [26].

The above manufacturing methods include several production steps resulting in the process to be time consuming and expensive. Furthermore, they require a high temperature heat treatment step at the end, which is an energy consuming process and can take a long time to complete. Moreover, the pore size of the ceramic membrane depends greatly on the sintering process as well as on the primary powder size. In addition, in the case of using metallic porous substrates, the sintering process may result in densification of the substrate and its oxidation.

Thermal Spraying Processes

On another subject, thermal spraying includes a group of melting-spraying processes in which small particles of various materials, including metals, ceramics and polymers can be deposited through melting the particles and accelerating them to impact a substrate. This can be carried out by combustion flame or a dc or rf plasma arc. Depending on the thermal spray process, the feedstock can be in the form of powder, wire or rod. Coating is generated by successive impact of melted and semi melted particles to the substrate in the form of splats. Suspension plasma spray is an emerging thermal spraying technique, in which a liquid media such as water and ethanol is used to carry a feedstock powder. It allows to deposit sub-micron size particles.

Depending on the method, a high temperature and high velocity flame, such as a plasma jet or an oxy-fuel jet is used to melt the feedstock particles in the form of powder, suspension and rod (or wire). The molten particles are accelerated toward the substrate and upon their impact, splats are formed. Thermal spray process can be applied on a wide range of materials such as polymers, metals, alloys, cermets and ceramics. Compared to thin film deposition techniques such as CVD, thermally sprayed coatings may be developed with higher deposition rate and lower process costs. On the other hand, the microstructures of these coatings may contain features such as intra-lamellar cracks, macro pores, inter-lamellar cracks, which might be considered as defects in some applications.

Suspension plasma spraying (SPS) is an emerging thermal spray technology in which, a liquid such as water or various alcohols are used to carry nano- to sub-micron sized particles in the form of colloidal suspension through the injecting system and into the plasma jet.

In thermally sprayed coatings, the pore size depends on the feedstock particle size beside other parameters. For example, in conventional atmospheric plasma spraying, the size of feed stock powder is kept between 10 and 100 μm in order to preserve the followability of the powder. Small particles tend to form larger agglomerates due to electrostatic forces, which may lead to clogging the injecting system. In addition, it is more difficult for the fine particles to penetrate the plasma jet. It means that fine particles may travel in the colder parts of the plasma jet with less heat transfer. As a result, spraying submicron sized particles with atmospheric plasma spray (APS) method requires a carrier gas flow rates as high as 80 slm, which greatly perturbs and intensively cools down the plasma jet. Also, limitation in choosing the minimum particle size used in conventional plasma spray process imposes a limit on the minimum splat size and consequently on minimum thickness of the coating, since larger particles are deposited in the form of larger splats with higher thickness.

On the other hand, in SPS process the size of the molten particles are typically in the range of 0.1-3 µm, the diameter of the splats are in the range of 0.2-6 µm and their thickness is between 20 to 300 nm. Consequently, compared to APS, much smaller pore sizes can be obtained, and much thinner coatings can typically be deposited.

Photocatalytic Property of Titanium Dioxide Particles

On yet another subject, the use of titanium dioxide as a photocatalytic agent in water treatment is known. $TiO_2$ is capable of degrading pollutants such as benzene, dyes, and many other chemical contaminants and micro-organism to carbon dioxide, water, and mineral acids.

FIG. 2 illustrates this photocatalytic reaction scheme. When small particles of $TiO_2$ (especially in the form of anatase, which has a bandgap energy of 3.2 eV and appropriate valence and conduction band positions) are exposed to a photon with energy greater than their band gap energy, they form hydroxy (OH) radicals, which photodegrade organic pollutants. Further, electrons react with oxygen molecules to form super excited $O_2^-$ ions, which are also active towards organic contaminants. Reacting with water molecules, they produce hydroxide ($OH^-$) ions and peroxide (OOH) radicals. These peroxide radicals then combine with $H^+$ ions to form hydroxy radicals and hydroxide ions. Thus, all reactions finally lead to the formation of hydroxyl radicals.

Titanium dioxide exists as three polymorphs: rutile, anatase and brookite. The photocatalytic activity of $TiO_2$ has been mainly associated with the anatase content of a given catalyst. This is due to the higher levels of radicals adsorbed on the surface resulting in significantly higher photocatalytic activity compared to rutile.

In order to perform a decontamination process, $TiO_2$ nanoparticles can be employed directly, which provides maximum activity due to the high reactive surface area. However, recovering the nano-catalyst particles is an issue and adds a post treatment step to the filtration process.

As a solution, magnetic nanoparticles were coated with anatase $TiO_2$ nanoparticles, thus enabling the removal of the catalyst by application of a magnetic field. Another approach was to immobilize the $TiO_2$ nanoparticles on the surface of a polymer membrane. The drawback of immobilization of catalyst particles was the decrease in photodegradation activity due to the reduction of active surface area. However, polymeric membranes are not stable under UV irradiation. $TiO_2$ nanoparticles has been applied to the surface of ceramic membranes as well. In general, photocatalytic $TiO_2$ coatings are deposited sol-gel, spray pyrolysis, chemical vapor deposition or physical vapor deposition polymer.

SUMMARY OF THE INVENTION

In accordance with the present invention, there is provided:

1. A filtration membrane comprising a porous support substrate and a porous active layer on top of the support substrate,
   wherein the active layer is formed of a network of interconnected, randomly arranged ceramic splats with ceramic particles occupying interstices between the splats, and
   wherein free spaces between the particles define a network of interconnected pores extending through the thickness of the active layer.
2. The membrane of item 1, wherein the splats are between about 50 nm and about 1 µm thick and between about 0.2 µm and about 10 µm in width and length.
3. The membrane of item 1, wherein the particles have an average particle size between about 0.02 µm and about 10 µm.
4. The membrane of item 1, wherein the active layer has a porosity between about 10% and about 80%.
5. The membrane of item 1, wherein the active layer has an average pore size between about 0.001 µm and about 15 µm.
6. The membrane of item 1, wherein the total surface area of the particles represents about half of the surface area of the active layer and the total surface area of the splats represents the remaining half of the surface area of the active layer.
7. The membrane of item 1, wherein the ceramic splats and ceramic particles are made of a ceramic, a ceramic composite, a ceramic/graphene composite or a combination thereof.
8. The membrane of item 7, wherein the ceramic, the ceramic composite, or the ceramic/graphene composite has anti-fouling photocatalytic properties.
9. A method of filtering a feed using the membrane of item 1, the method comprising the step of contacting the feed with the active layer of the membrane and applying pressure to the feed so that materials to be separated from the feed pass through the membrane as a permeate.
10. The method of item 9, wherein, in the membrane, the splats and/or the particles are made of a material with anti-fouling photocatalytic properties.
11. The method of item 10, further comprising the step of photodegrading one or more organic compounds in the feed by exposing the membrane to UV radiation while the feed is in contact with the membrane.
12. The method of item 10, further comprising the step of cleaning the membrane by exposing the membrane to UV radiation, thereby degrading fouling material on the membrane.
13. A method of manufacturing the membrane of item 1, the method comprising the steps of:
   a) providing a support substrate;
   b) providing a suspension of ceramic particles; and
   c) suspension plasma spraying the particles onto the support substrate to produce a porous active layer on the substrate, under conditions such that, when impacting the support, some of the particles are in liquid form and thus form splats in the active layer and some of the particles are in solid form and thus remain in the form of particles in the active layer.
14. The method of item 13, wherein two or more suspensions of the same or different particles are provided in step b) and suspension plasma sprayed in step c).
15. The method of item 14, wherein the two or more suspensions comprise the same particles and are injected at two different locations in the plasma jet during suspension plasma spraying.
16. The method of item 14, wherein the two or more suspensions comprise different particles.

17. The method of item 16, wherein the two or more suspensions are injected at two or more different locations in the plasma jet during suspension plasma spraying.

18. The method of item 16, wherein the two or more suspensions are injected at a same location in the plasma jet during suspension plasma spraying.

19. The method of item 13, wherein the suspension further comprises a pore forming agent.

20. The method of item 13, wherein during suspension plasma spraying, the support substrate is cooled.

DETAILED DESCRIPTION OF THE INVENTION

Turning now to the invention in more details, there is provided a filtration membrane comprising a porous support substrate and a porous active layer on top of the support substrate, wherein the active layer is formed of a network of interconnected, randomly arranged ceramic splats with ceramic particles occupying interstices between the splats, and wherein free spaces between the particles define a network of interconnected pores extending through the thickness of the active layer.

The membrane of the invention is a filtration membrane. In other words, it is a membrane that can be used or is destined to be used in filtration. Such use is encompassed within the present invention. As such, the membrane of the invention is porous and semipermeable as befit a membrane for use in filtration.

Figure 1:
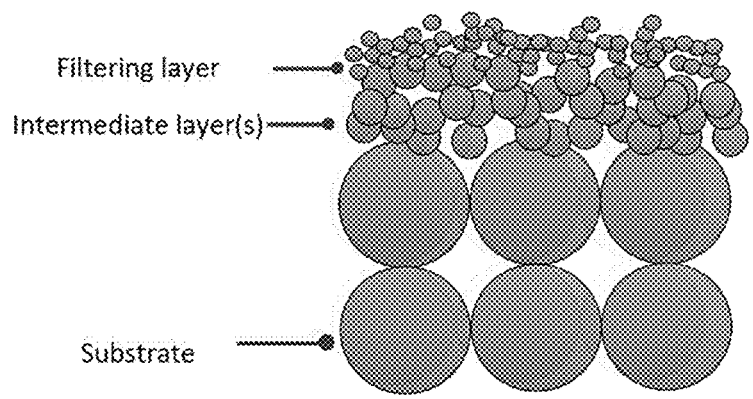
FIG. 1 Asymmetric microstructure of ceramic water treatment membranes.
Figure 2:
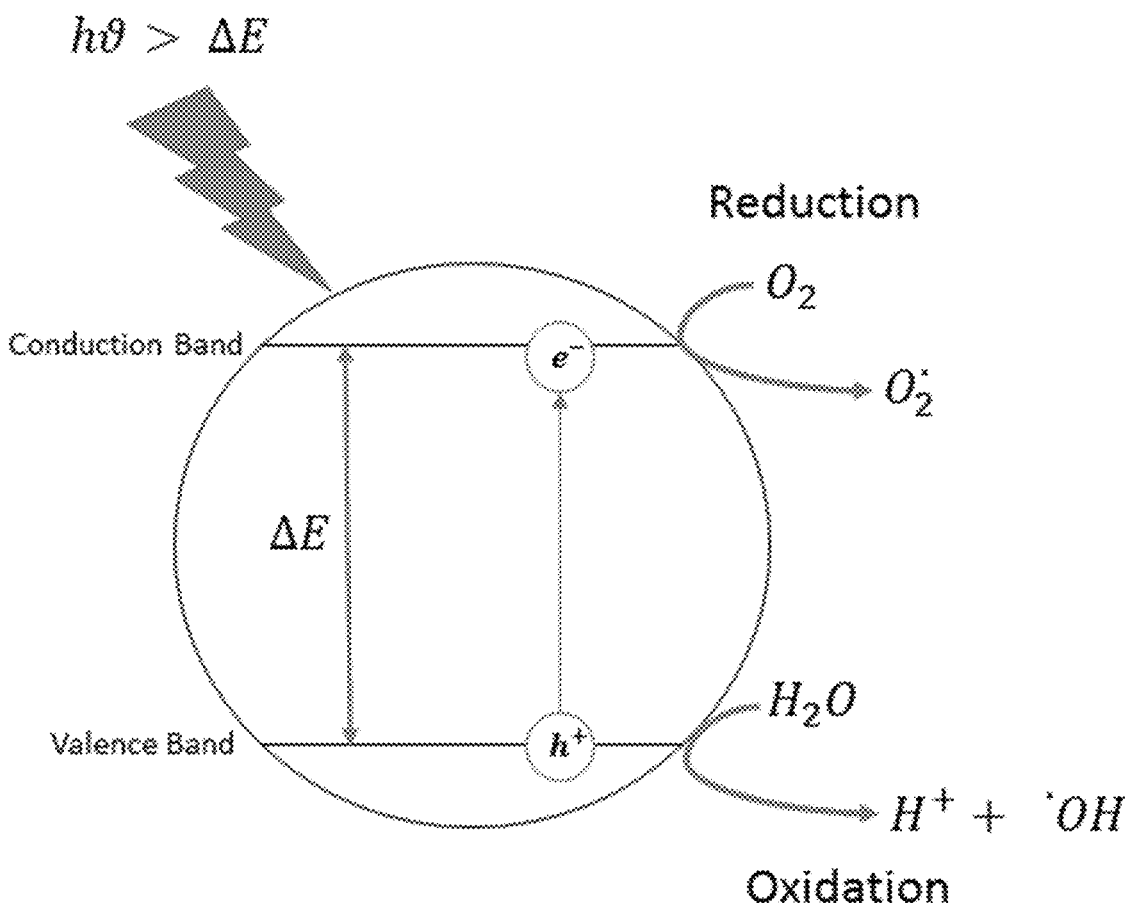
FIG. 2 $TiO_2$ photocatalytic reaction scheme.
Figure 3:
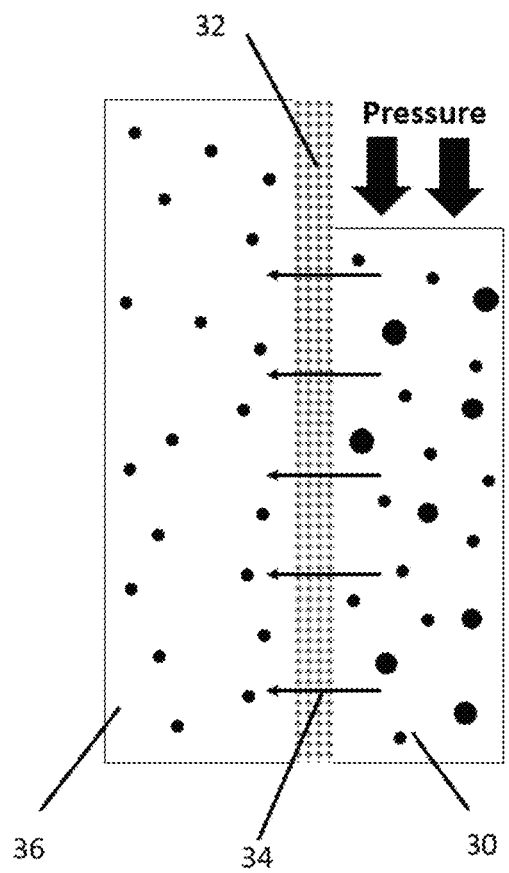
FIG. 3 Schematic representation of the filtration process.

Indeed, microfiltration (MF), ultrafiltration (UF) and nanofiltration (NF) are size exclusion-based filtration technologies differing mostly by the size of the solute being removed trough filtration, which in turns depends from the size of the pores in the filtration membrane. Typically, MF/UF/NF filtration are carried out as shown in FIG. 3. Pressure is applied to a feed (30) that is in contact with a filtration membrane (32). The pressure can be applied in a direction normal to the surface of the membrane (dead-end filtration) and or in a direction parallel to the surface of the membrane (cross-flow filtration) as shown in FIG. 3. The membrane only allows through solutes that are below a certain size (34). As a result, a permeate (36) containing these solutes is formed on the side of the filtration membrane opposite the feed. Filtration membranes are porous semipermeable membranes that allow particles/molecules below a certain size to flow through, while trapping larger particles/molecules. The degree of separation achieved with these membranes largely depends on the solute size compared to the size of the pores on the membrane.

The filtration membrane of the invention can be tailored to discriminate solutes of various sizes. In embodiments, it can retain solute that are 200 nm or more in size. In other embodiments, it can retain solute that are 20 nm or more in size.

In preferred embodiments, the membrane of the invention is an ultrafiltration or a microfiltration membrane, preferably a microfiltration membrane.

As noted above, the filtration membrane of the invention comprises a porous support substrate and a porous active layer on top of the support substrate. In preferred embodiments, the filtration membrane of the invention essentially consists of the porous support substrate and the porous active layer. In other words, there is not intervening layer/material between the support substrate and active layer. In alternative embodiments, the membrane comprises an intermediate layer located between the support substrate and active layer. Such embodiments will be discussed in more details below.

The Active Layer

The membrane of the invention is characterized by an active layer with a unique microstructure. Indeed, the active layer is formed of a network of interconnected, randomly arranged ceramic splats with ceramic particles occupying interstices between the splats. Thanks to this microstructure, pores are defined by free spaces existing between the particles.

These pores form a network of interconnected pores extending through the thickness of the active layer allowing the use of the active layer as the size-discriminating layer in a filtration membrane. Indeed, it is through these pores that the solute(s) must pass to cross the membrane. Hence, these pores are responsible for the solute size discrimination when the membrane is used to filtrate a feed. It will be understood that the porosity of the active layer is an "open porosity", i.e. the pores are interconnected allowing fluid communication between the pores and ultimate through the membrane. As a result of this open porosity, the active layer is semipermeable and allows fluids to flow through. In embodiments, the active layer has a water permeation flux between about 1 $Lh^{-1}$ $m^{-2}$ and about 1500 $Lh^{-1}$ $m^{-2}$, preferably between about 10 $Lh^{-1}$ $m^{-2}$ and about 1500 $Lh^{-1}m^{-2}$, and more preferably a water permeation flux of about 10 $Lh^{-1}m^{-2}$ to about 1000 $Lh^{-1}m^{-2}$.

"Splats" is a well-known and well-defined term in the art of thermal spraying (including suspension plasma spraying). It refers to thin and generally irregularly-shaped lamellae formed by melted or partially melted particles of matter flattening on impact on a substrate after being heated, scattered, and accelerated toward the substrate as part of a thermal spraying process.

In the active layer of the membrane of the invention, the ceramic splats are interconnected and thus form a rigid skeleton that confers mechanical strength to the active layer. The splats are also randomly arranged. In other words, they are heaped together without order; piled up haphazardly. Because of this random arrangement, interstices exist between the splats. As noted above, these interstices are occupied by ceramic particles. As will be explained below, this unique microstructure can be obtained by suspension plasma spraying under conditions such that some of the starting suspended particles are melted when they impact the support substrate on which they are sprayed (thus forming the "splats"), while some other particles are solid when they impact the support substrate, either never having melted or having melted and then re-solidified (thus forming the "particles").

In embodiments, the splats are between about 50 nm and about 1 μm thick and between about 0.2 μm and about 10 μm in width and length. Preferably, the splats are between about 100 nm and about 500 nm thick and between about 0.5 μm and about 5 μm in width and length.

In embodiments, the particles have an average particle size between about 0.02 μm and about 10 μm. Preferably, the particles have an average particle size between about 0.02 μm and about 5 μm, preferably between about 20 nm and about 200 nm. In some preferred embodiments, the particles have an average particle size of about 100 nm to about 200 nm. In other preferred embodiments, the particles have an average particle size of about 20 nm to about 100 nm. The average particle size in the active layer can be measured, for example, by SEM.

The porosity of the membrane of the invention and its individual layers can be measured by mercury intrusion porosimetry. In embodiments, the active layer has a porosity between about 10% and about 80%, preferably between about 20% and about 60%, and most preferably a porosity between about 40% and about 60%.

In embodiments, the active layer has an average pore size between about 0.001 μm and about 15 μm. Preferably, the active layer has an average pore size about 0.002 μm and about 10 μm. In preferred embodiments, the active layer has an average pore size about 100 nm to about 200 nm. In alternative preferred embodiments, the active layer has an average pore size between about 20 nm to about 100 nm, preferably between about 20 nm to about 50 nm.

In embodiments, the active layer is between about 1 μm and about 500 μm thick, preferably between about 5 μm and about 100 μm thick.

Preferably, the total surface area of the particles represents about half of the surface area of the active layer and the total surface area of the splats represents the remaining half of the surface area of the active layer.

In embodiments, a section or all of the active layer is free of columnar structures, while the remaining of the active layer exhibits columnar features. In preferred embodiment the section of the active layer that is free of columnar structures correspond to the about two-thirds of the active layer in the thickness direction closest of the support substrate. In alternative embodiments, the active layer is free of columnar structures. In alternative embodiments The active layer is preferably homogenous.

As noted above, the active layer comprises ceramic splats and ceramic particles. In preferred embodiments, the active layer essentially consists of these splats and particles.

In embodiments, the splats:particles weight ratio in the active layer is from about 15:85 to about 80:20. Preferably, this ratio is between about 30:70 and about 70:30. More preferably, this ratio is 50:50.

The ceramic splats and ceramic particles are made of a ceramic, a ceramic composite, a ceramic/graphene composite or a combination thereof.

Ceramics are defined by IUPAC as rigid materials with an infinite three-dimensional network of sintered crystalline grains comprising metals bonded to carbon, nitrogen or oxygen. The IUPAC notes as well that the term ceramic generally applies to any class of inorganic, non-metallic product subjected to high temperature during manufacture or use. Thus, herein, the term "ceramic" refers to an inorganic, non-metallic product that has been subjected to high temperature during manufacture (i.e. during suspension plasma spraying as discussed below), the product comprising a three-dimensional network of sintered crystalline grains of a material comprising metals bonded to carbon, nitrogen and/or oxygen.

A ceramic composite is a composite made of two or more ceramics.

A ceramic/graphene composite is a composite made of a ceramic matrix in which graphene or graphene oxide particles or pellets are dispersed.

In preferred embodiments, the ceramic splats and/or the ceramic particles essentially consist of a ceramic, a ceramic composite, or a ceramic/graphene composite or a combination thereof. In preferred embodiments, the ceramic splats and/or the ceramic particles are made (or essentially consist) of a ceramic. In alternative embodiments, the ceramic splats and/or the ceramic particles are made (or essentially consist) of a ceramic composite. In yet other alternative embodiments, the ceramic splats and/or the ceramic particles are made (or essentially consist) of a ceramic composite.

In embodiments, the active layer comprises a mixture of splats, that is: splats made of one of the abovementioned materials and splats made of another one of the abovementioned materials (and optionally more splats made of yet other such materials). In alternative embodiments, the active layer comprises a single type of splats (made of one of the abovementioned materials).

In embodiments, the active layer comprises a mixture of particles, that is: particles made of one of the abovementioned materials and particles made of another one of the abovementioned materials (and optionally more particles made of yet other such materials). In alternative embodiments, the active layer comprises a single type of particles (made of one of the abovementioned materials).

In some embodiments, the splats and the particles are made of a same material, i.e. they comprise the same ceramic, ceramic composite, ceramic/graphene composite or combination thereof. In alternative embodiments, the splats and the particles comprise different ceramic, ceramic composite, graphene composite or combination thereof.

In the present invention, the ceramic (in the splats and particles, whether present as a ceramic or as part of a ceramic composite or a ceramic/graphene composite) is any ceramic that can be melted during SPS at atmospheric pressure. Preferred ceramics include oxides. Non-limiting examples of ceramics include $TiO_2$, $ZrO_2$, $Al_2O_3$, $SiO_2$, $ZnO$, $SnO_2$, $CeO_2$, $WO_3$, $\alpha\text{-}Fe_2O_3$, $BiVO_4$, $SrTiO_3$, $Ag_3PO_4$, CdS, Mullite, Cordierite, and oxides with a perovskite structure.

Preferred ceramics include those with anti-fouling photocatalytic properties such as $TiO_2$, $ZnO$, $SnO_2$, $CeO_2$, $ZrO_2$, $WO_3$, $\alpha\text{-}Fe_2O_3$, $BiVO_4$, $SrTiO_3$, $Ag_3PO_4$, and CdS.

A preferred ceramic in the ceramic splats and the ceramic particles (preferably for both ceramic splats and the ceramic particles) is $TiO_2$. In embodiments, between about 0 wt % and about 100 wt % of the $TiO_2$ is the form of anatase. In some preferred embodiments, between about 20 wt % and about 80 wt %, of the $TiO_2$ is the form of anatase while the remainder of the $TiO_2$ is in the from of rutile and most preferably, about half of the $TiO_2$ is the form of anatase, while the remaining half of the $TiO_2$ is in the from of rutile. In alternative preferred embodiments, about 100 wt % of the $TiO_2$ is the form of anatase.

In embodiments, the active layer of the membrane can further comprise active particles of various material having anti-pathogen activity such as CuO, $Cu_2O$, and silver. This would provide antivirus and/or antibacterial properties under visible light and even in the dark. Such particles can be introduced in the active layer e.g. by infiltration.

The Support Substrate

The role of the porous support substrate is to support the active layer and confer mechanical strength to the filtration membrane, while the role of the active layer is to discriminate between solutes of different size, allowing through solutes smaller than a certain size only. As such, the support substrate is porous and permeable or semi-permeable.

The support substrate may be of any shape, size, or form. In particular, it may have the shape, size, and/or form of typical filtration membranes, which are well-known to the skilled person.

The support substrate may be made of a metal, a metallic alloy, a ceramic, a ceramic composite, a polymer, or a polymer composite. Preferably the substrate is made of a metal, an alloy, a ceramic, or a ceramic composite. More preferably, the substrate is made of a ceramic.

Non-limiting examples of metals and alloys include noble metals and stainless steel. Preferred metals and alloys include stainless steel.

Non-limiting examples of the ceramic for the support substrate include $Al_2O_3$, $TiO_2$, $ZrO_2$, $SiO_2$. A preferred ceramic is $Al_2O_3$.

Typically, the average pore size in the support substrate is larger than that of the active layer. This is possible because the support substrate is not responsible for size-discriminating the solutes in the feed to be filtered. In embodiments, the support substrate has a porosity between about 20% and about 60%, preferably between about 30% and about 60%, and more preferably a porosity of about 40% to 50%. In embodiments, the support substrate has an average pore size between about 1 μm and about 50 μm. Preferably, the support substrate has an average pore size of about 1190 nm.

Typically, the support substrate preferably has a relatively smooth surface, which allows the production of a more uniform active layer. In embodiments, the support substrate has a roughness $R_a$ between about 0.1 μm and about 20 μm, preferably between about 0.1 µm and about 10 µm, more preferably between about 0.1 µm and about 5 µm, and more preferably a roughness $R_a$ of about 0.9 µm.

When the support substrate has very large pores or otherwise a rough surface, one or more intermediate layer(s) between the support substrate and the active layer can be advantageously used to allow the formation of a more uniform active layer.

Optional Intermediate Layer(s)

In embodiments, the filtration membrane further comprises one or more intermediate layers between the support substrate and the active layer.

Like the support substrate, the intermediate layer(s) is(are) porous and permeable or semi-permeable.

The purpose of the intermediate layer(s) is to prepare the surface in view of the deposition of the active layer. For example, in the case where a support substrate with very large pores is used, the intermediate layer(s) prevent(s) the material forming the active layer from penetrating into pores of the support substrate. The intermediate layer(s) also provide(s) a smoother surface, which allows the use of a thinner active layer. Finally, the intermediate layer(s) adjust(s) the pressure gradient through the membrane system.

Typically, the intermediate layer(s) has(have) a pore size between the pore size of the support substrate and the pore size of the active layer. If there are more than one intermediate layer, then the intermediate layers can present a gradient of pore size between the pore size of the support substrate and the pore size of the active layer.

The thickness of the intermediate layer(s) is variable and will depend in part on the characteristics on the support substrate. For a substrate with very large pores and/or a very rough surface, a thicker intermediate layer or several intermediate layers may be needed.

Like the support substrate, the intermediate layer(s) may be made of a metal, a metallic alloy, a ceramic, a ceramic composite, a polymer, or a polymer composite. Examples and preferred examples of these materials are the same as those listed in the previous section.

Method of Use of the Filtration Membrane

In another aspect of the invention, there is provided a method of filtering a feed using the membrane described in the previous section. This method comprises the step of contacting the feed with the active layer of the membrane and applying pressure to the feed so that materials to be separated from the feed pass through the membrane as a permeate.

Examples of feeds that can be filtered using the filtration membrane and method of the invention include liquid feeds, such as water, and gaseous feeds, such as air.

In embodiments, the method further comprises the step of photodegrading one or more organic compounds in the feed by exposing the membrane to UV radiation while the feed is in contact with the membrane.

This allows water/air filtration with germ killing properties. In other words, the membrane of the invention can be used as an anti-pathogen (antiviral and/or antibacterial) filter. Therefore, the membrane of can be used as:
  anti-viral and anti-bacterial filters in fluid and/or air purification systems, and
  water and wastewater disinfection systems.

In embodiments, the method further comprises the step of cleaning the membrane by exposing the membrane to UV radiation, thereby degrading fouling material on the membrane.

This cleaning step can be carried out after the membrane has been used for filtrating a feed. Thus, this cleaning step allows re-using a membrane that has already been used. Indeed, in use, membranes may become clogged, often with organic matter, which undesirably reduce flow through the membrane. The cleaning step allows unclogging the membrane and restoring membrane performances. Thus, in embodiments, the method further comprises, after said cleaning, the step of reusing the clean membrane to filter a feed.

This cleaning step can also be carried out while the membrane is being used for filtrating a feed. Thus, this cleaning step prolongs the useful life of the membrane. The cleaning step slows membrane clogging and allows maintaining membrane performances.

It will be apparent to the skilled person that the above embodiments involving UV radiation are limited to membranes, specifically active layers, that comprise ceramic(s), ceramic composite(s), and/or graphene composite(s) with photocatalytic properties, such as $TiO_2$.

UV radiation is defined as radiation with a wavelength between 100 and 400 nm. In preferred embodiments, the feed and/or the membrane are exposed to UVA and/or UVB radiation, which are defined as radiation with a wavelength between 315 and 400 nm (UVA) and between 280 and 315 nm (UVB).

Method of Manufacture of the Filtration Membrane

In another aspect of the invention, there is provided a method of manufacturing the membrane described above. This method comprises the steps of:
  a) providing a support substrate;
  b) providing a suspension of ceramic particles; and
  c) suspension plasma spraying the particles onto the support substrate to produce a porous active layer on the substrate, under conditions such that, when impacting the support, some of the particles are in liquid form and thus form splats in the active layer and some of the particles are in solid form and thus remain in the form of particles in the active layer.

Step a)—Support Substrate and Intermediate Layer(s)

In this method, the support substrate and the optional intermediate layer(s) that can be present thereon are the same as that described above regarding the filtration membrane. All above teachings regarding the support substrate and the optional intermediate layer(s) apply here.

Step b)—Suspension of Particles

In step b), a suspension of ceramic particles is provided. In embodiments, two or more suspensions comprising the same or different suspended particles are provided.

Herein, a suspension is a liquid in which solid particles are dispersed (IUPAC definition). In the present case, the suspended particles are ceramic particles, which contains as mentioned above a ceramic, a ceramic composite, or a ceramic/graphene composite or a combination thereof. These particles are the precursor of the particles and splats found of the active layer of the filtration membrane described above. Therefore, they are made of the same material. All above teachings regarding the materials for the splats and particles in the active layer apply here.

When a ceramic/graphene composite is used, the particles in the suspension may be made of the ceramic/graphene composite or alternatively, the suspension can comprise ceramic particles together with graphene/graphene oxide particles, which together will form the desired ceramic/graphene composite splats/particles in the active layer.

During suspension plasma spraying, particle size may change due to melting, re-solidification, coalescence, etc. In embodiments, the particles in the suspension have an average particle size between about 0.01 µm and about 15 µm. Preferably, the particles in the suspension have an average particle size between about 0.01 µm and about 10 µm, preferably about 10 nm to about 200 nm. In some preferred embodiments, the particles in the suspension have an average particle size between about 100 nm and 200 nm, preferably of about 125 nm or about 137 nm. In other preferred embodiments, the particles in the suspension have an average particle size between about 10 nm and 100 nm, preferably of about 20 to about 50 nm. The average particle size can be measured, for example, by SEM.

Particle size distribution of the suspension may affect the heat treatment of the inflight particles during suspension plasma spraying step c) and as a result the microstructure of the active layer.

Typically, a suspension with a high solid content increases the deposition rate of the active layer during suspension plasma spraying step c). In embodiments, the suspension comprises between about 10 wt % and about 60 wt % of particles, based on the total weight of the suspension. Preferably, the suspension comprises between about 10 wt % and about 50 wt % of particles, based on the total weight of the suspension. Most preferably, the suspension comprises between about 20 wt % and about 40 wt % of particles, based on the total weight of the suspension.

The liquid phase of the suspension can comprise any volatile non-solvent for the particles. Indeed, the liquid phase must not dissolve the particles and must be volatile enough to evaporate during suspension plasma spraying step c). Non-solvent with higher enthalpy of evaporation (e.g. water: 2.3×10 6 J/kg, compared to other non-solvents (e.g. ethanol: 0.8×10 6 J/kg) take longer to evaporate during suspension plasma spraying step c). As a result, the particles are exposed to high temperature for a shorter time, and so heat transfer from the plasma to the particles is reduced. This tends to increase the number un-melted particles in the active layer.

Preferably, the suspension is stable, which means that the particles do not aggregate and/or settle during suspension plasma spraying step c). Indeed, homogenous and stable suspensions that are free of agglomerates have better flowability, reduce clogging of the injecting system of the suspension plasma spraying systems, and produce a more uniform active layer.

Non-limiting examples of volatile non-solvent for the liquid phase of the suspension include water and alcohols, for example ethanol. A preferred volatile non-solvent is water.

As well known to the skilled person, co-solvents and stabilizing agents, separately or in combination, can be added to the liquid phase to stabilize a suspension.

Non-limiting examples of co-solvents for the suspension include water and alcohols, for example ethanol as well as ethylene glycol. A preferred co-solvent is ethylene glycol.

In alternative embodiments, the liquid phase of the suspension is free of co-solvents.

The stabilizing agent increases the stability of the suspension and preferably hinders its agglomeration. Non-limiting examples of stabilizing agent for the suspension include poly-vinylpyrrolidone, polyacrylic acid, sodium dodecyl sulfate, cetyltrimethylammoniumbromide, oleic acid, and diammonium citrate. A preferred stabilizing agent is polyacrylic acid.

In embodiments, the suspension comprises between about 0.1 wt % and about 40 wt % of stabilizing agents, based on the total weight of the suspension. Preferably, the suspension comprises between about 0.2 wt % and about 30 wt % of stabilizing agents, based on the total weight of the suspension. Most preferably, the suspension comprises between about 5 wt % and 10 wt % of stabilizing agents, based on the total weight of the suspension.

In alternative embodiments, the suspension is free of stabilizing agent.

In embodiment, the suspension further comprises a pore forming agent.

Non-limiting examples of pore forming agents include polyester, starch, polymethylmethacrylate (PMMA), ammonium carbonate salts, ammonium bicarbonate salts, chloride salts, graphite, coal ash, natural fibers, sawdust, shell flour, starch, polystyrene (PS), polymethyl methacrylate, and $Fe_3Al$.

Step c)—Suspension Plasma Spraying

Figure 4:
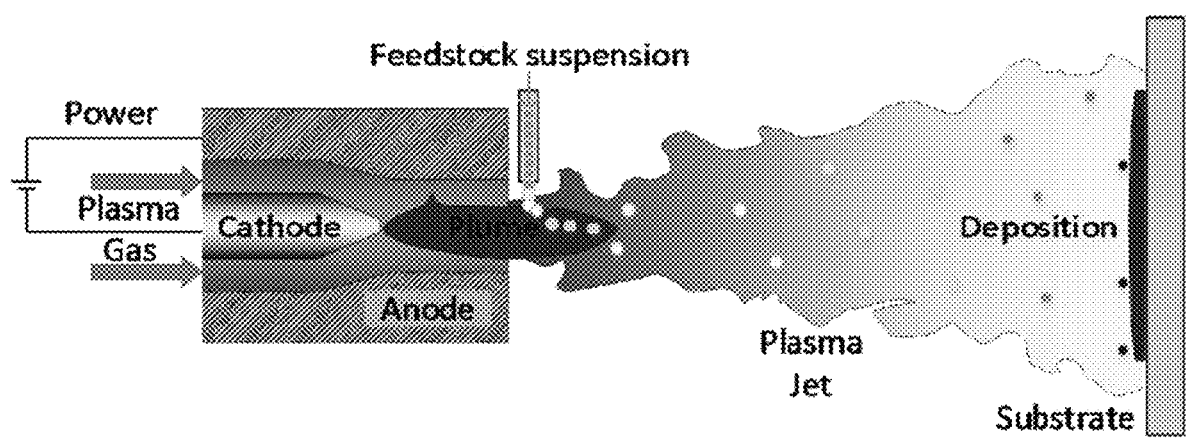
FIG. 4 Schematic of suspension plasma spray process.

A schematic of a typical suspension plasma spraying process is illustrated in FIG. 4. Plasma is generally initiated in a plasma torch by the struck of an electrical arc between an anode and a cathode. The plasma gas is usually a combination of gas with a high atomic weight (Ar, $N_2$) as primary gas and a gas with a high thermal conductivity ($H_2$, He) or with a high viscosity (He) as the secondary gas.

The suspension is injected into the plasma jet, either axially or radially. The plasma jet (i.e. a high-temperature high-velocity flame) among others heats, accelerates and ultimately sprays the ceramic onto a receiving substrate, in the present case the support substrate. The active layer is generated by successive impacts of melted, un-melted and re-solidified particles onto the support substrate.

Figure 5:
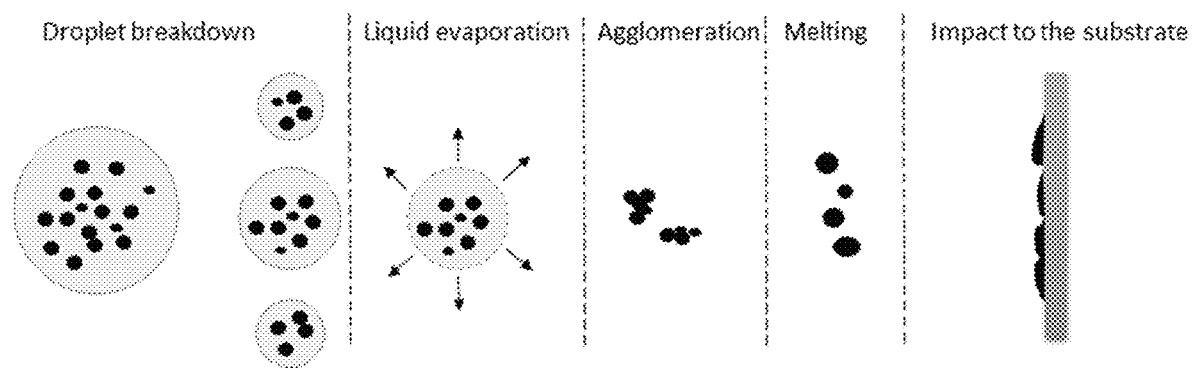
FIG. 5 Physical phenomenon involved in SPS process.

FIG. 5 is a schematic illustrating some of the physical phenomena, which occur upon penetration of the suspension into the plasma jet. When the suspension penetrates the plasma jet, aerodynamic drag forces generated by the plasma flow fragments the suspension droplets into smaller droplets. Following the fragmentation process, the liquid contained in the droplets evaporates because of the high heat flux of the plasma jet, which leaves behind solid particles. Depending on their size, temporal, spatial and temperature history, inflight particles may evaporate, sinter, melt or partially melt to form droplets, optionally re-solidify to form particles, evaporate, and/or agglomerate (in particle or droplet form), while some particles may remain un-molten.

The plasma jet can be described as having three sections based on the momentum and the temperature transfer to the particles of the suspension:
  (i) the hot core, where the particles have the highest heat and momentum transfers and are thus highly likely to melt;
  (ii) the plume, where the heat and momentum transfers to the particles are drastically lower compared to the plasma core and where the particles may or may not melt; and
  (iii) the fringe around the plasma core, where the particles might obtain enough momentum but not enough heat transfer to melt the particles.

In all cases, the ceramic, ceramic composite, ceramic/graphene composite or combination thereof is accelerated toward the support substrate at a velocity ranging from one hundred to several hundred meters per second. The state of this material in the spray impacting the support substrate will determine the microstructure of the active layer. Upon impacting on the support substrate, the melted or partially melted droplets form flattened solidified splats, while the solid (un-melted or melted and re-solidified) particles embed themselves on the surface of these splats. The formation of the coating results from the successive pile-up of the splats and particles on the surface of support substrate and on the top of previously deposited splats and particles.

As noted above, in the method of the invention, the particles are suspension plasma sprayed onto the support substrate under conditions such that, when impacting the support, some of the particles are in liquid form and some of the particles are in solid form. Indeed, the particles in liquid form (droplets) upon impact will form the desired splats, while the particles in solid form will embed themselves on the surface of the splats as also desired. Together, the splats and particles will form the active layer.

The state (solid or liquid) of the ceramic, ceramic composite, ceramic/graphene composite or combination thereof upon impacting the support substrate and thus the microstructure of the active layer produced will depend on the trajectory of the particles in the plasma jet, which itself can be manipulated by process parameters such as stand-off distance, gas flow rate, gas composition, suspension feeding rate, torch speed, and torch power.

Tables 5, 13 and 14 below provides exemplary conditions for the suspension plasma spraying in step c) of the above method. Spraying distance was between about 30 and about 70 mm, preferably about 50 mm.

In embodiments, the plasma gas mixture is for example, Ar, $H_2$, He, $N_2$, or a mixture thereof. Non-limiting examples of gas mixtures include Ar—$H_2$, Ar—He and Ar—$H_2$—He.

A main parameter is the spraying distance between the location at which the suspension is fed and the support substrate. The longer the spraying distance, the cooler the ceramic when it impacts the support substrate and the more likely it is to be in solid form. Therefore, the longer the spraying distance, the higher the proportion of particles vs splats in the active layer.

The phenomenon can be advantageously used to tailor the microstructure of the active layer. For example, a same suspension could be injected at two different locations in the plasma jet. The ceramic that is injected closer to the support substrate into the plasma jet would be more likely to be in solid form (i.e. to form particles in the active layer), while the ceramic travelling the longer distance would be more likely to be in liquid form (i.e. to form splats in the active layer).

Similarly, two or more different suspensions (for example comprising particles of different sizes and/or materials) could be injected at the same or preferably at different locations in the plasma jet. Again, the ceramic travelling the longer distance before reaching the support substrate would be more likely to be in molten form (i.e. to form splats in the active layer), while the ceramic travelling the shorter distance would be more likely to be in solid form (i.e. to form particles in the active layer). Therefore, splats in the active layer could mainly originate from one of the suspensions, while particles in the active layer originate from the other suspension.

It should be noted that the particles in the active layer are not necessarily identical to the particles in the suspension used for suspension plasma spraying. Indeed, some particles may be identical in both material and size, for example those particles that have remained un-melted during spraying. However, these un-melted particles may also have agglomerated or changed polymorphic phase (in the case of a ceramic that exhibits several polymorphs). Also, particles that have melting and re-solidified may have been changed, for example via agglomeration, and thus may not be identical to the original particles.

During suspension plasma spraying, the plasma torch may be moved to deposit the ceramic on the whole support substrate. To build the active layer until it reaches a desired thickness, the plasma torch may make numerous passes, for example 25 passes or 40 passes, for example in a raster pattern, on the support substrate.

As noted above, columnar microstructures may be formed after a certain number of passes. To avoid this, the number of passes can be reduced to produce a thinner coating.

Preferably, during suspension plasma spraying, the support substrate can be cooled, for example at a temperature of about 200° C. (e.g. 200±15 00). This tends to prevent fracturing of the filtration membrane/support substrate.

When a ceramic/graphene composite is used, it is possible to produce the active layer as per the above method using particles of a ceramic (without graphene/graphene oxide), and then dip the produced ceramic membrane in a graphene/graphene oxide solution to allow insertion of graphene/graphene oxide within the membrane structure.

Columnar Microstructures

Figure 6:
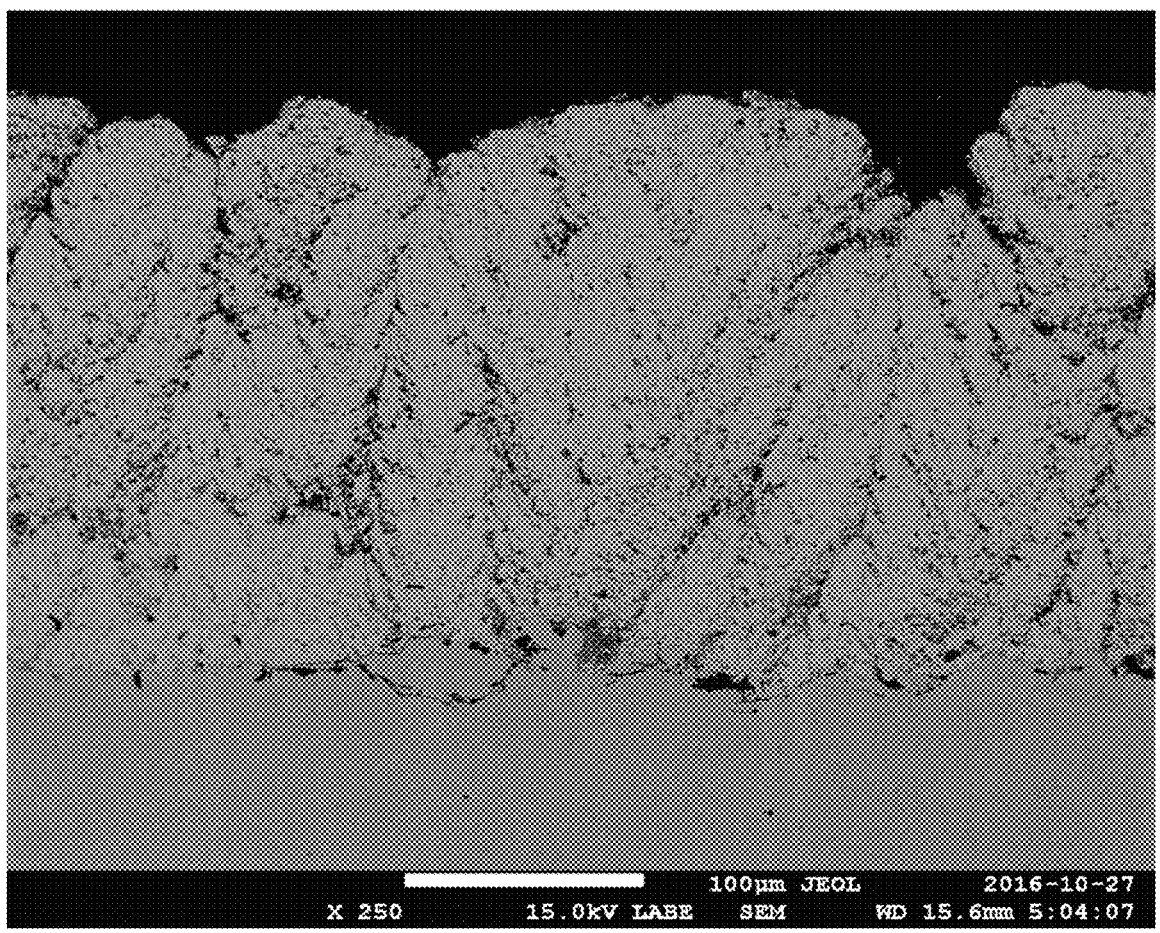
FIG. 6 Columnar microstructure in a conventional SPS coating.

FIG. 6 shows columnar microstructure, which are often found in conventional SPS coatings. These features are generally cone-shaped and appear as bumps on the surface of the coating.

As noted in a previous section, columnar microstructure in the active layer are undesirable.

Roughness on the surface of the active layer (including the formation of columnar microstructure) seems to be due to the fact that small particles are sensitive to gas velocity changes. These particles seem more likely to deposit on the sides of existing surface asperities and create a region of porosity as the active layer is built up. When the thus-formed cones grow further, they "shadow" the underlying porous region and prevent particles impingement on those areas.

Some factors that could promote the shadow effect are:
increased surface roughness of the support substrate because it provides asperities and
larger size of the support substrate and increased diversion of the plasma jet, which expose the support substrate to the periphery of the plasma jet.

Advantages of the Membrane and Methods of the Invention

In embodiments, the membrane and/or methods of the invention have one or more of the following advantages.

The membrane of the invention is water permeable.

The membrane of the invention may have high mechanical and physical properties, since in embodiments, it consists exclusively of ceramic, ceramic composite, ceramic/graphene composite or a combination thereof and/or since the active layer is bound of the support substrate and/or since the particles are solidly attached in the splats.

In embodiments, the membrane is chemically stable, thermally stable, and/or long lasting.

In embodiments, the membrane of the invention is uniform. In embodiments, it is free of columnar microstructures.

In embodiments, the membrane of the invention has submicron to a few micron-sized pores, which make it suitable for removing pollutants in many industries.

The active layer with $TiO_2$ has interesting mechanical, chemical and thermal stability, is nontoxicity, and has photocatalytic properties. As such, it can be easily cleaned and reused as described above. Thus, in embodiments, the membrane of the invention exhibits photocatalytic and/or antifouling activity, preferably towards the degradation of organic compounds. For example, in embodiments, the rate constant for degradation of methylene blue in contact with the membrane and under UVC light is about 0.05 $min^{-1}$.

To the inventor's knowledge, we report below the first attempt to fabricate filtration membrane by suspension plasma spraying (SPS).

Suspension plasma spraying (SPS) is a versatile and scalable. SPS generates reproducibly produce active layers with the desired fine microstructures (splats, particles, and pores). SPS allow generating thin active layers.

SPS has a relatively high deposition rate (i.e. it is fast). It can be used to manufacture large (long and/or wide) membranes (e.g. upon to several square meters).

The method of manufacture is a single step process, i.e. it does not involve further heat treatment of the active layer. Thus, the method is fact and potentially less costly than other manufacturing methods.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1

Below, we report below the fabrication of a ceramic filtration membrane by suspension plasma spraying (SPS). More specifically, we report:

the development of a SPS titanium dioxide (SPS $TiO_2$) membrane, the evaluation of the impact of different spray parameters and the optimization of some these parameters, and the characterization of the SPS $TiO_2$ membrane and the evaluation of its performance.

A porous water permeable titanium dioxide membrane with 14% of open porosity and considerable water flux was produced. In this SPS $TiO_2$ membrane, a network of open pores was generated by accumulation of un-melted and re-solidified particles. In addition, the SPS titanium dioxide membrane exhibited photocatalytic property.

The SPS $TiO_2$ membrane was generated using sub-micron sized particles in suspension plasma spray, which brought interesting characteristics in terms of the smaller size of the droplets, which led to a membrane with smaller pore size and lower thickness (which cannot be achieved with other thermal spray techniques).

Experimental Procedures

The experimental approach followed for deposition of suspension plasma sprayed ceramic membrane on porous ceramic substrate was as follows:

Preliminary experiment by deposition of a coating on stainless-steel substrate. The result of the preliminary coating, sample SPS-W-0 (comparative), showed the presence of columnar features in the micro structure and sedimentation of suspension during SPS process occurred.

Optimization of the suspension parameters in order to find a suspension with reliable stability that could last throughout the spray process and with a rather low viscosity.

Designing a full matrix of experiment by evaluation of three parameters at two levels. The resulting 8 spray conditions was used to deposit 8 coatings on stainless-steel substrates. The best set of parameters was chosen for producing the final membrane.

Deposition of ceramic membrane on porous alumina substrate.

Characterization of the membrane including microstructural characterization, phase analysis and porosity measurement.

Evaluation of service performance of the membrane including water permeability measurement and photocatalytic activity evaluation. As a general rule, the coatings generated were identified by the spray process name, solvent and number of the experiment. For example, in SPS-W+E-1; SPS stands for suspension plasma spray, W stands for water, E stands for ethylene glycol and 1 stands for the number of the experiment.

Suspension Plasma Spray Process

Plasma Generation

A 3 MB plasma torch (Oerlikon-Metco, Switzerland), mounted on a six-axis robot was used for plasma generation. In order to initiate the plasma, Ar was used as the primary gas and $H_2$ was used as the secondary gas.

Suspension Feeding

In the suspension feeding system, the suspension was injected radially into the plasma through an external injection (from outside of the nozzle).

Figure 7:
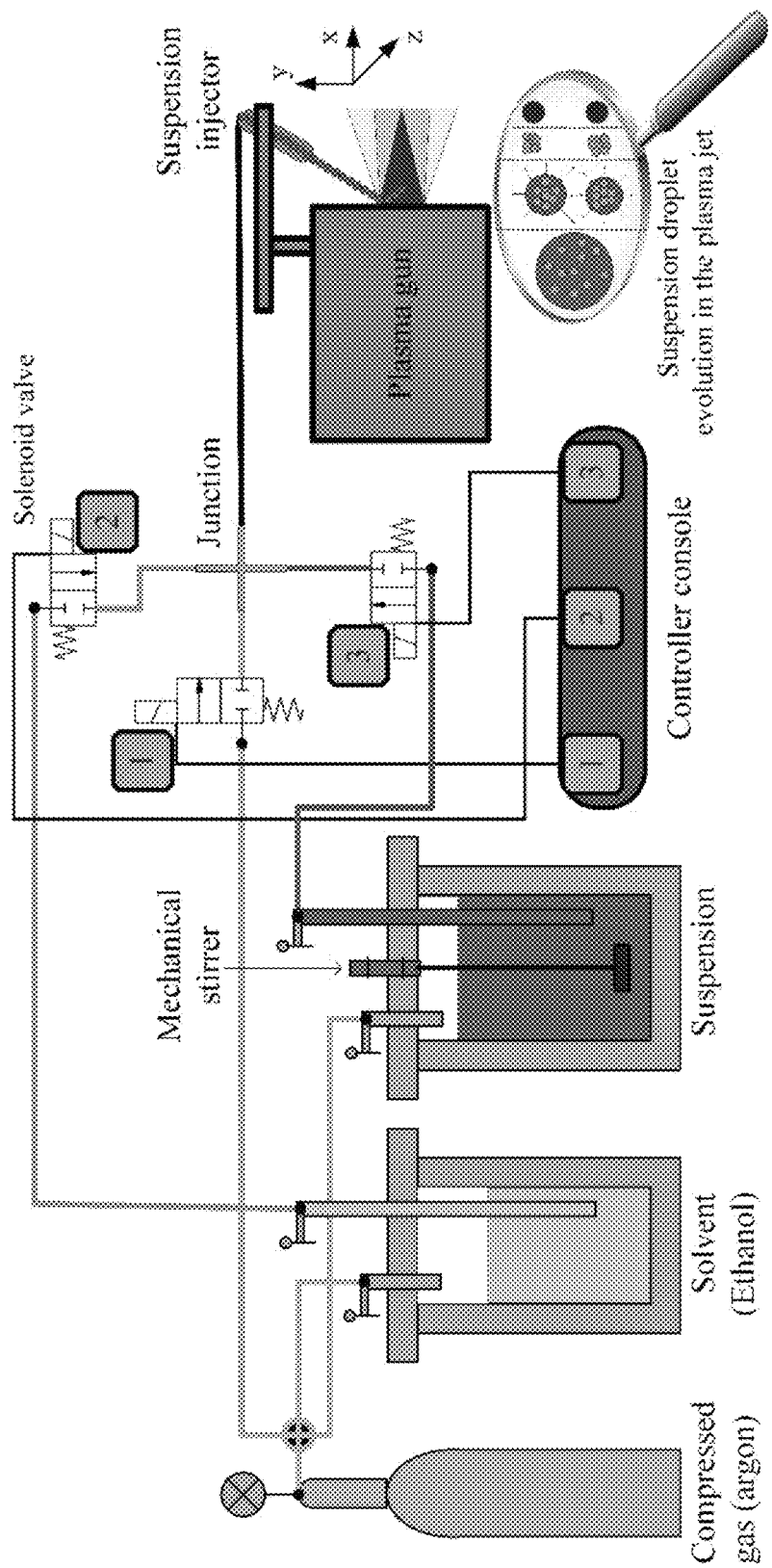
FIG. 7 Schematic of the suspension feeding system in suspension plasma spray. Image from Tarasi, F., Alebrahim, E., Dolatabadi, A., & Moreau, C. (2019). A Comparative Study of YSZ Suspensions and coatings. *Coatings*, 9(3), 188.

A schematic of the feeding system is shown in FIG. 7. The suspension and water were stored in separate containers. The suspension was introduced to the plasma plume by the means of an injector, which was oriented toward the plasma torch at a 15° angle with respect to they axis (shown in FIG. 7). This angle was chosen to keep the particles in the hot core of plasma jet for a longer time. The distance between the tip of the injector and the plasma torch orifice was 20 mm. An injector with an internal diameter of 0.2 mm was used to inject the suspension into the plasma jet.

A mechanical stirrer was positioned in the suspension container to avoid the sedimentation of the suspension during the spray process. A compressed gas (Ar, 50 psi) was used to force the suspension through the route and to the injector. The suspension flow rate was 33 mL/min. The flow rate was measured using a Coriolis flow meter. The pressure could be switched between the suspension container and the water container by the means of a set of solenoid valves through the controlling console. The suspension was introduced to the system by opening valve number 3.

At the end of each experiment, the injection system was cleaned by interval switching between valves number 1 (pressured gas) and valve number 2 (water).

Feedstock Powder Characterization

Figure 8:
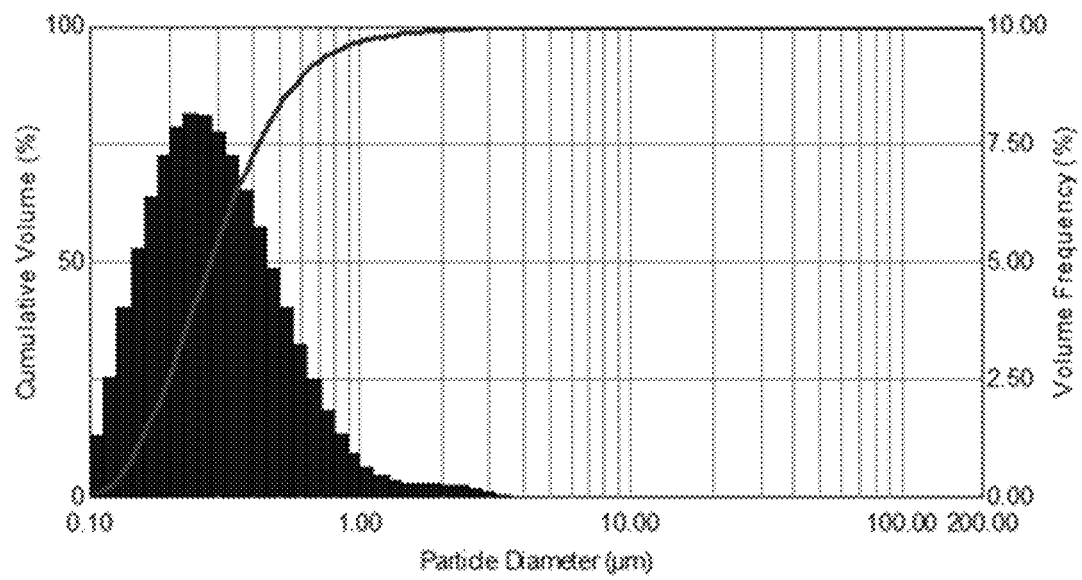
FIG. 8 Particle size analysis of titanium dioxide powder.

Particle size distribution of the suspension was measured with a laser light scattering technique (Spraytec, Malvern, UK). The particles had an average particle of Dv (50)=0.3 μm and a particle size distribution as shown in FIG. 8.

Figure 9:
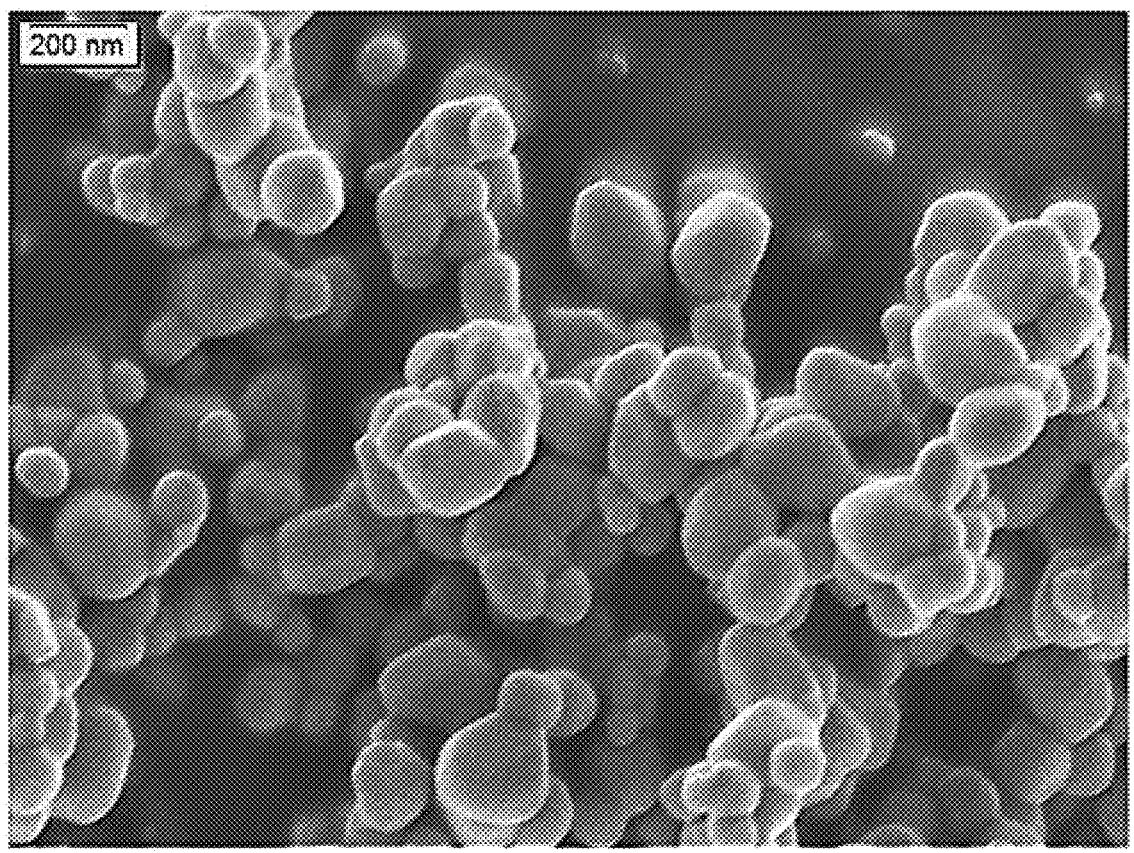
FIG. 9 SEM micrograph of titanium dioxide powder.

Powder particle size was also measured from SEM images of the feedstock powder using an image analysis software (Olympus® Stream basic, Canada). An average powder particle size of 137 nm was obtained by measuring 150 particles. A SEM micrograph of the $TiO_2$ powder is shown in FIG. 9.

The difference between the two above values could be due to that the laser light scattering technique is a volume-weighted measurement technique, while with SEM images a number-weighted measurement of powder particle size was obtained.

Substrate Characterization

Coatings were deposited on both non-porous stainless-steel substrates and porous alumina substrates. The stainless-steel substrates were used in preliminary experiments to find the best process conditions for deposition of the membrane. The alumina substrates were used to produce a final membrane system that could be used for filtration performance tests.

More specifically, the two substrates used were was are as follows:
a) Nonporous substrate: Square shaped 304 stainless-steel, 25.4 mm×25.4 mm×3 mm, and
b) Porous substrate: Disc shaped alumina (Kerafol®, Germany), 48 mm×2 mm, mean pore size of 2 μm.

Figure 10:
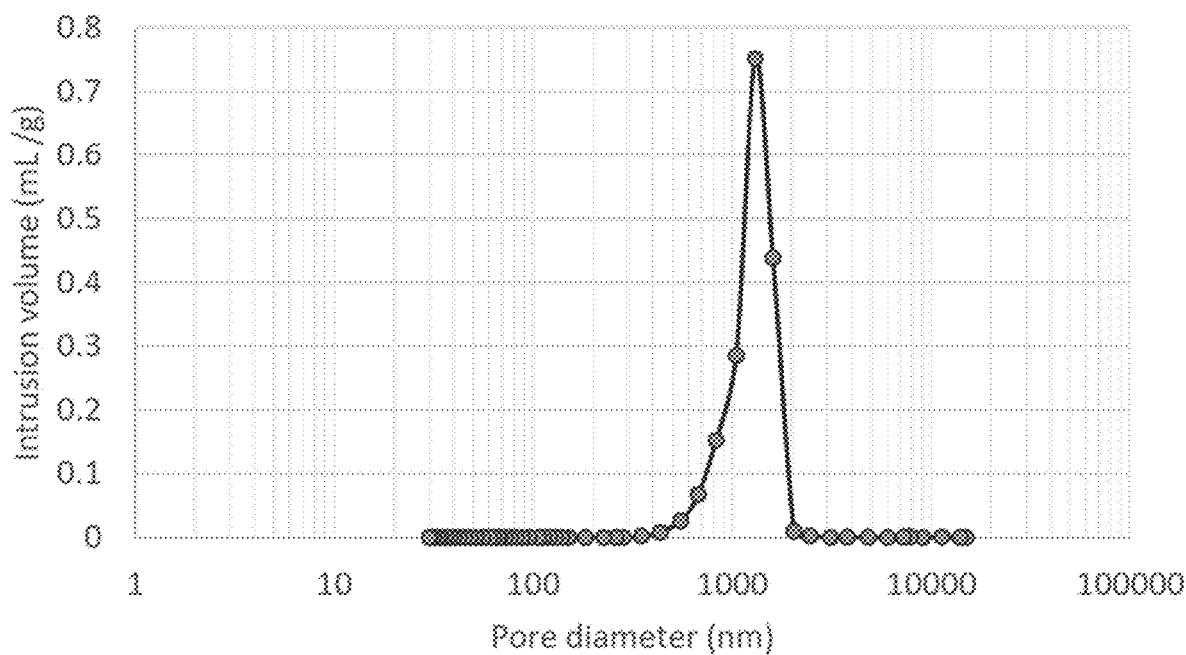
FIG. 10 Pore size distribution of porous alumina substrate.

The porosity of the alumina substrate was measured as 36% with a mercury intrusion porosimeter (Micromeritics® Autopore IV, USA) with a quite narrow pore size distribution. FIG. 10 shows the pore size distribution of the porous alumina substrate. Average pore size of the alumina substrate was 1190 nm with around 80% of the pores are in the range of 1000-3000 nm obtained with a mercury intrusion porosimeter (Micromeritics® Autopore IV, USA), which is in agreement with data received from the manufacturer.

Prior to coating on stainless-steel substrates, these substrates were grit-blasted using 80 grit $Al_2O_3$ particles, cleaned using a compressed air jet to remove the embedded particles and ultrasonically cleaned in acetone to remove any residue from blasting. The surface roughness of stainless-steel substrate was measured ($R_a$~5.3 μm) with a 3D confocal laser microscope (Olympus® OLS4000).

The porous alumina substrates were used in SPS process as purchased and without grit blasting. Before the coating deposition process, the surface of alumina substrates was cleaned using a blast of air. The surface roughness of porous alumina substrate was measured ($R_a$~0.9 μm) with a 3D confocal laser microscope (Olympus® OLS4000).

Preliminary experiment (SPS-W-0)

For the preliminary experiment, we used the spray parameters and suspension composition from a work on $TiO_2$ hydrophobic coatings: N. Sharifi, M. Pugh, C. Moreau, and A. Dolatabadi, "Developing hydrophobic and superhydrophobic $TiO_2$ coatings by plasma spraying," Surf. Coat. Technol., vol. 289, pp. 29-36, 2016, incorporated herein by reference.

To prepare the suspension for spraying sample SPS-W-0, polyacrylic acid (PAA) (Sigma-Aldrich®, Oakville, Canada) was used as surfactant. The surfactant was added at a concentration corresponding to 5% of the solid content of the suspension. Table 2 describes the suspension formulation and Table 3 describes the spray parameters of the preliminary sprayed coating, SPS-W-0.

TABLE 2

Suspension formulation of sample SPS-W-0.

| Sample | Solid content (% wt) | Spray distance (mm) | Solvent | Surfactant |
| --- | --- | --- | --- | --- |
| SPS-W-0 | 20 | 50 | Water | PAA 5% of solid content |

TABLE 3

Spray parameters of sample SPS-W-0.

| Ar (LPM) | $H_2$ (LPM) | Current (A) | Voltage (V) | Power (kW) | Spray velocity (m/s) | Injector diameter (mm) | Spray distance (mm) | No. of passes |
| --- | --- | --- | --- | --- | --- | --- | --- | --- |
| 60 | 2 | 500 | 50 | 25 | 1 | 0.2 | 50 | 75 |

Figure 11:
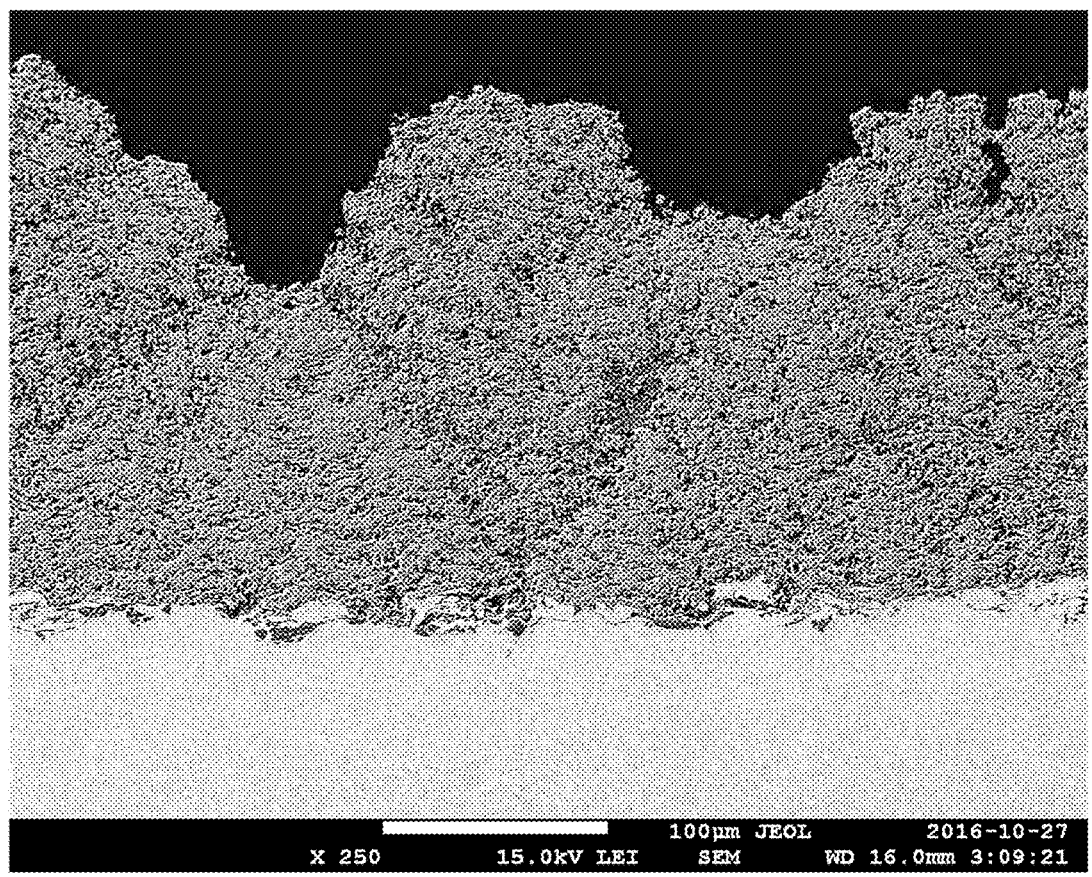
FIG. 11 SEM micrograph of the polished cross section of sample SPS-W-0.

FIG. 11 shows a SEM micrograph of the polished cross-section of sample SPS-W-0, in which undesirable columnar features can clearly be observed.

Figure 12:
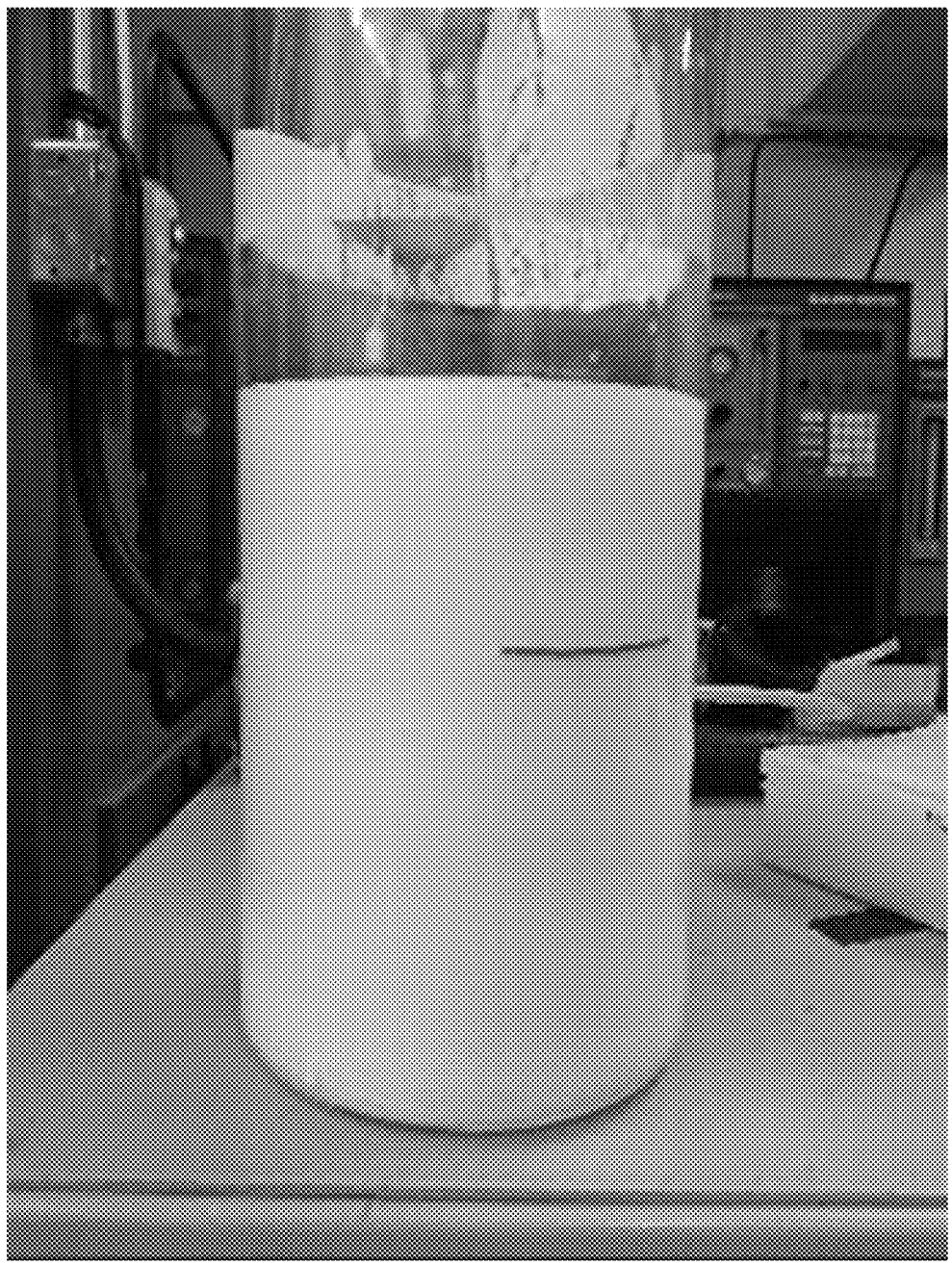
FIG. 12 Sedimentation line marked on the container of suspension used in the spray process of SPS-W-0 at the end of the SPS process.

In addition, during spray process of SPS-W-0, sedimentation of the suspension occurred as shown in FIG. 12 (the black line denotes the level of solid matter settled on the bottom of the container). This is also undesirable. Rather, a suspension that is stable throughout the spraying time is desired.

Suspension Preparation and Optimization

To find a suspension, without large agglomerates, that would be stable throughout the spray process in this work, an experiment with 8 types of suspensions according to Table 4, was performed. Polyacrylic acid (PAA) (Sigma-Aldrich, Oakville, Canada) was used as surfactant and added at various concentrations (wt % based on the weight of the TiO$_2$). Ethylene glycol was used as a part of the solvent to increase the viscosity of the suspension and was added at 20% of the fluid content of the solvent.

To prepare the suspensions, for the cases with a surfactant, in the first step surfactant was added to the solvent gradually until completely dissolved and then TiO$_2$ powder was gradually added to the mixture. To provide an effective mixing and to avoid having large agglomerates, the process was carried out on a magnetic stirrer and an ultrasonic agitator was used during the whole suspension preparation process in order to break down the large powder lumps and the agglomerates in the suspension as much as possible. In the case of the suspensions containing ethylene glycol, in the first step ethylene glycol was added to water and was stirred for one minute and the rest was according to the suspension preparation procedure.

TABLE 4

The formulation of 8 suspensions used for evaluation of the stability.

| Suspension | TiO$_2$conc. wt % | Polyacrylic acid conc. wt % | Solvent |
|---|---|---|---|
| TiO$_2$-10-0 | 10 | 0 | water |
| TiO$_2$-10-5 | 10 | 5 | water |
| TiO$_2$-10-10 | 10 | 10 | water |
| TiO$_2$-10-EG | 10 | 0 | water:ethylene glycol 80:20 v/v |
| TiO$_2$-20-0 | 20 | 0 | water |
| TiO$_2$-20-5 | 20 | 5 | water |
| TiO$_2$-20-10 | 20 | 10 | water |
| TiO$_2$-20-EG | 20 | 0 | water:ethylene glycol 80:20 v/v |

Figure 13:
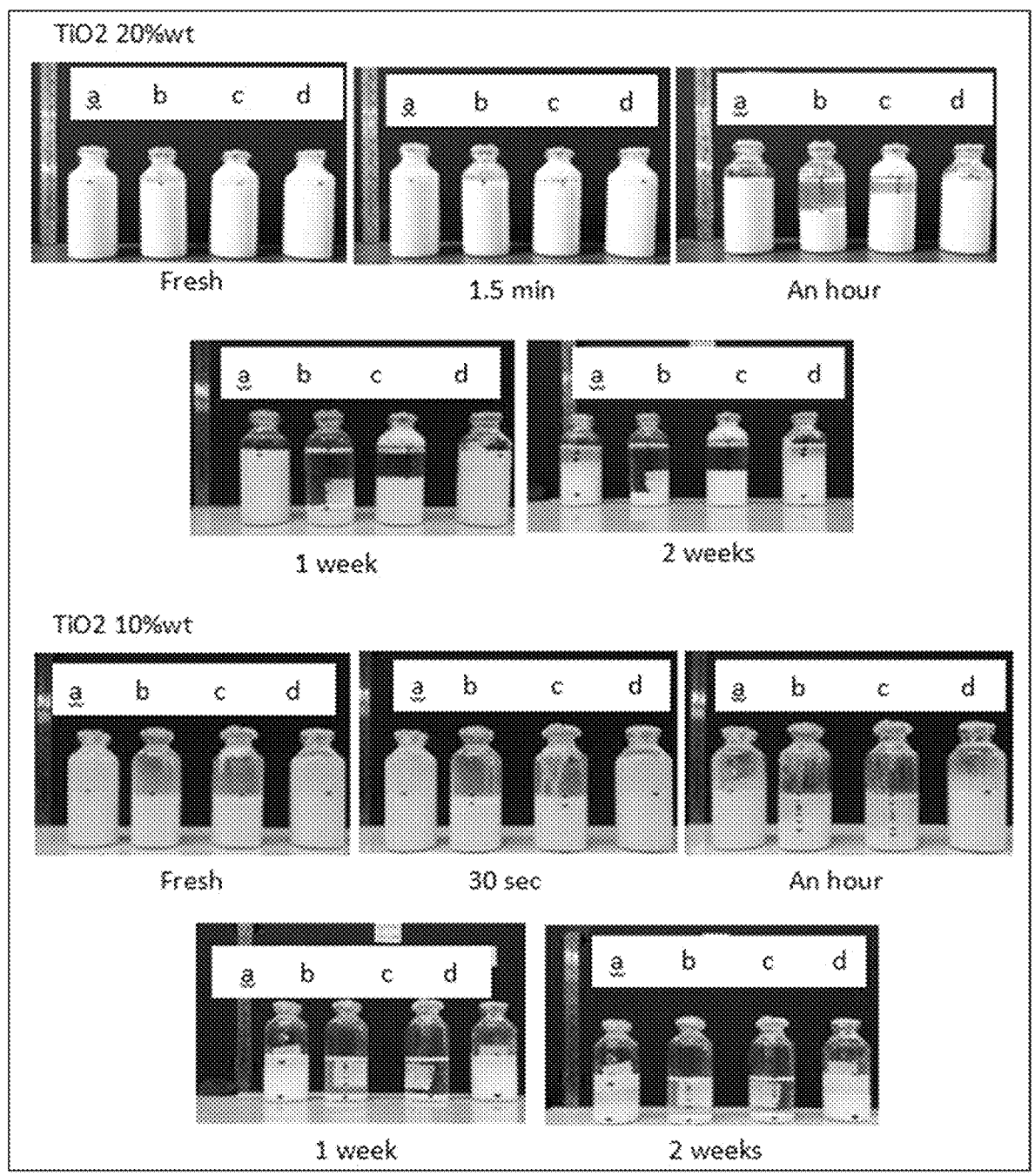
FIG. 13 Level of sedimentation of water based $TiO_2$ suspensions with $TiO_2$ 20 wt % and with $TiO_2$ 10 wt %, a) without surfactant, b) 5% of solid content surfactant, c) 10% of solid content surfactant, d) without surfactant and the solvent contained 80% water+20% ethylene glycol.

To confirm the static stability, 100 mL of each of the eight suspensions mentioned in Table 4 was prepared. In the next step, each suspension was poured in a separate vial and the opening of the vials were sealed completely. The vials were put on a stable surface and pictures were taken in intervals. FIG. 13 illustrates the level of sedimentation of the 8 suspensions mentioned above after two weeks.

By observing these samples, in both suspensions with 10 wt % and 20 wt % solid content, suspensions without any surfactant and those in which the solvent was the mixture of water and ethylene glycol showed more stability.

It was observed that in suspension with 10 wt % solid content, sedimentation started within 30 sec in both surfactant concentrations and continued with almost the same rate. On the other hand, sedimentation in suspension without surfactant and the suspension with solvent containing ethylene glycol started within around two hours. After a week all these four suspensions were settled, although some suspended particles were still observable in the suspension without surfactant and in the suspension with solvent including ethylene glycol.

In the case of suspension with 20 wt % solid content, it was observed that sedimentation started within 1.5 min in both surfactant concentrations. However, the sedimentation continued with a higher rate in suspension with 5% of surfactant. Sedimentation in the suspension without surfactant and in the suspension with solvent including ethylene glycol was started at a small level within 48 hours. Sedimentation of suspension with 10% surfactant seemed to remain unchanged in two weeks. The three other suspensions were settled in two weeks.

Suspensions with lower viscosity values are typically easier to atomize in the plasma jet. Suspension viscosity measurement on these 8 samples, based on table 4, was performed by automatic rheometer instrument (MCR® Rheometer, Anton Paar, and CANADA). The results are shown in FIGS. 14 and 15.

Figure 14:
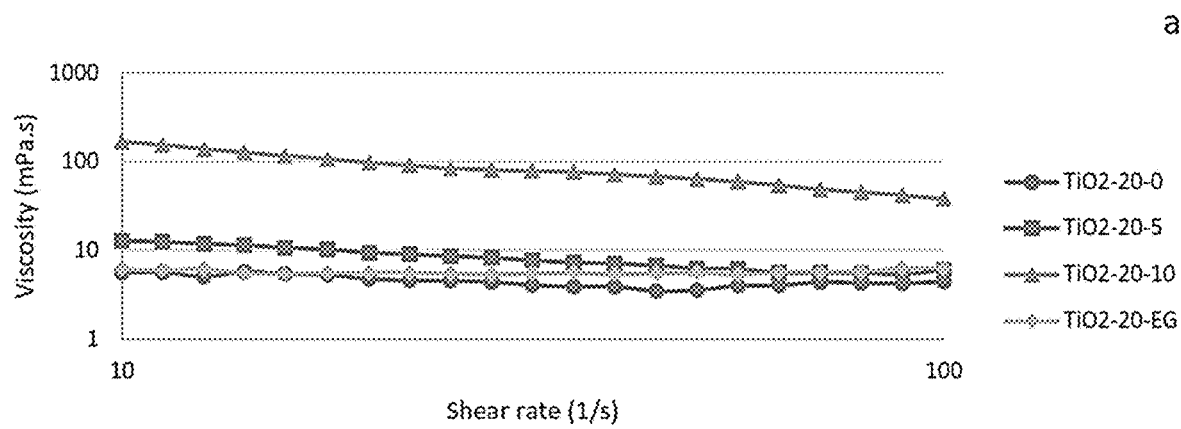
FIG. 14 Viscosity measurements of 8 samples based on suspensions in Table 5 for four water based s2 suspensions with $TiO_2$ 10 wt %.

In the case of TiO$_2$ 20 wt % suspensions in FIG. 14, the lowest viscosity belongs to the suspension without surfactant and to the suspension with solvent containing 20% ethylene glycol. In FIG. 14, it can also be observed that results for suspension with 10% surfactant is significantly higher than the three other samples. This suspension did not fulfil the higher stability condition. Therefore, it was eliminated from the chosen suspensions and no further investigation was conducted regarding its viscosity.

Figure 15:
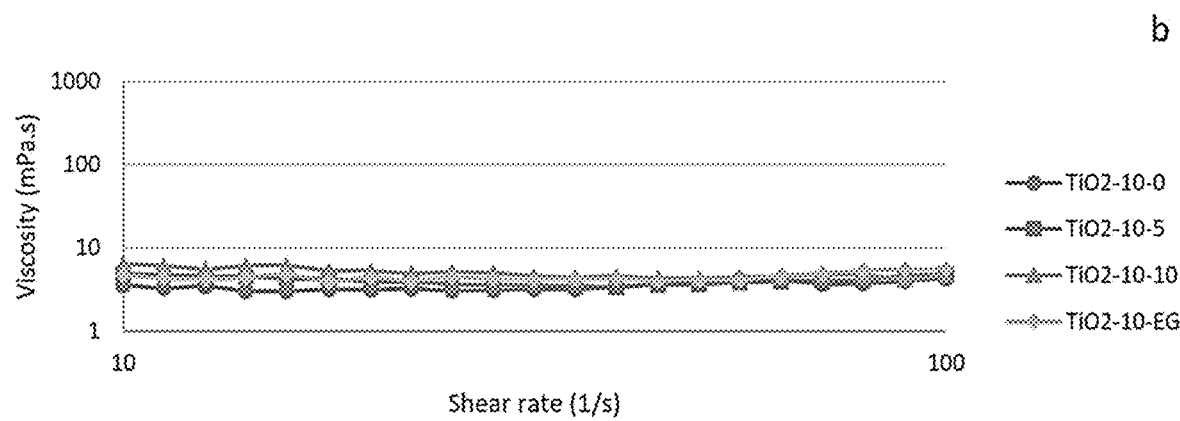
FIG. 15 Viscosity measurements of 8 samples based on suspensions in Table 5 for four water based $TiO_2$ suspensions with $TiO_2$ 20 wt %.

In the case of TiO$_2$ 10 wt % suspensions in FIG. 15, the results do not demonstrate a significant difference in viscosity.

Comparing the results on stability and viscosity measurements of the eight suspension, four suspensions that fulfilled both conditions of being more stable and having a lower viscosity were chosen to design the matrix of experiment as follows;

TiO$_2$-10-0: TiO$_2$ 10 wt % without surfactant

TiO$_2$-10-EG: TiO$_2$ 10 wt % without surfactant and with solvent containing 20% ethylene glycol TiO$_2$-20-0: TiO$_2$ 20 wt % without surfactant TiO$_2$-20-EG: TiO$_2$ 20 wt % without surfactant and with solvent containing 20% ethylene glycol Design of Experiment and Spray Conditions To examine the influence of different spray parameters on the TiO$_2$ SPS coatings, a matrix of experiments was designed to generate dissimilar TiO$_2$ coatings.

Only one set of deposition parameters, which is summarized in Table 5, was used for deposition of the coating in all samples. Argon was used as primary gas with the flow rate set on 60 LPM. The hydrogen flow rate was chosen to have power equal to 25 kW.

TABLE 5

Deposition parameters of SPS titanium dioxide membranes.

| Ar [LPM] | H$_2$ [LPM] | Current [A] | Voltage [V] | Power [kW] | Spray velocity [m/s] | Injector diameter [mm] |
|---|---|---|---|---|---|---|
| 60 | 2 | 500 | 50 | 25 | 1 | 0.2 |

A full factorial matrix of experiments was designed for three variables at two levels, which resulted in eight samples based on the difference in their solid contents, solvent and the spray distance according to Table 6. Theses 8 samples were sprayed on stainless-steel substrates.

TABLE 6

Matrix of experiments for SPS titanium dioxide membranes.

| Sample | Suspension (% wt) | Spray distance (mm) |
|---|---|---|
| SPS- W + E-1 | TiO$_2$-10-EG | 50 |
| SPS- W-2 | TiO$_2$-10-0 | 50 |
| SPS- W + E-3 | TiO$_2$-10-EG | 30 |
| SPS- W-4 | TiO$_2$-10-0 | 30 |
| SPS- W + E-5 | TiO$_2$-20-EG | 50 |
| SPS- W-6 | TiO$_2$-20-0 | 50 |
| SPS- W + E-7 | TiO$_2$-20-EG | 30 |
| SPS- W-8 | TiO$_2$-20-0 | 30 |

Coating Deposition

Figure 16:
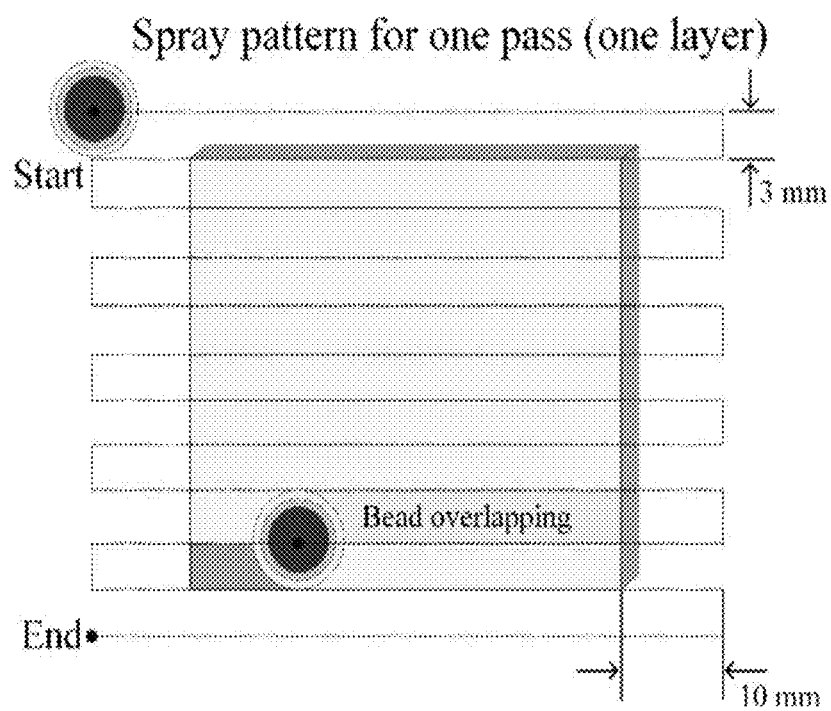
FIG. 16 Schematic description of torch raster pattern. Spray pattern for one coating pass used.

The traverse of the plasma torch over the stationary substrate was carried out by a robot-arm in a pattern with a meander-like movement as illustrated in FIG. 16.

The plasma torch was moved in the x-direction with a constant speed of 1 m/s and a specified standoff distance (30 mm or 50 mm) with respect to the substrate surface. Once the torch reached the end of the length of the substrate in the x direction, it was indexed in the y-direction (3 mm) for the next adjacent bead. To cover the entire substrate surface, the torch scanned the surface with an additional tolerance of 10 mm in each horizontal displacement. In each spray process one SPS $TiO_2$ membrane could be produced. Titanium dioxide membrane was deposited on alumina substrate by 40 passes of spraying.

Temperature Measurement on the Substrate

An infrared camera (A310, FLIR, US) was used to monitor the temperature of the substrate during the membrane deposition process on porous alumina substrates. Therefore, temperature of the ceramic substrate was held between 200±15° C. Completing one raster travel, the torch was stopped from starting the next pass for the substrate to cool down to the range of temperature mentioned above. Reaching the desired range of temperature, the next layer of coating was deposited. The temperature was read when each raster pattern was complete and the surface of the substrate was clear from the movement of the robot arm and torch, in a way that there was no interference for the infra-red camera to estimate the temperature.

Membrane Characterization

Metallographic Sample Preparation Process

The metallographic sample preparation of the sprayed samples included cold-mounting, sectioning, grinding and polishing.

Cold-Mounting

Samples were mounted with a mixture of cold-mounting resin and hardener (Epofix®, Struers®, USA) in order to facilitate their manipulation and safekeeping the deposited coating during sectioning and polishing process. A vacuum chamber (Cito Vac®, Struers®, USA) was used to enhance the epoxy infiltration through the pores in the coating for 10 minutes and at the pressure of 10 KPa.

Sectioning

Mounted samples were cut with a cut-off machine (Secotom-15, Struers®, USA). To keep the coating intact from being damaged during the cutting process, the mounted samples were fixed in a way that the coating was under compressive stress applied by the cutting wheel. A compatible cutting wheel, (50A20, 200×0.8×22 mm, Struers®, USA), was used for the cutting process. The velocity of the cutting wheel and the feed rate were adjusted at 2000 rpm and at 0.5 mm/s respectively.

Grinding and Polishing

The mounted and sectioned samples were grinded-polished with an automatic polishing machine (Tegramin-25, Struers, USA), in order to obtain smooth surfaces suitable for metallographic observation. Samples were put in the sample holder in symmetrical positions and a continuous water flow was used during the process as a coolant and also to remove the debris from grinding of the surface. Summary of the grinding-polishing process is described in Table 7. The speed of the platen and the head was 300 rpm.

TABLE 7

Summary of grinding and polishing process.

| Grinding and polishing | SiC (Grit 320) | SiC (Grit 500) | SiC (Grit 800) | Diamond suspension (9 μm) | Diamond suspension (3 μm) | Diamond suspension (1 μm) |
|---|---|---|---|---|---|---|
| Time (min) | 2 | 2 | 2 | 6 | 4 | 2 |

Microstructural Evaluation—Scanning Electron Microscope (SEM)

The microstructural observation of the samples was carried out with a field emission gun scanning electron microscope (JEOL JSM-7600F). Samples were coated with carbon film in order to create an electrically conductive surface. Both backscatter electron and secondary electron detectors were used for the observations.

X-Ray Diffraction

Phase composition of the feedstock powder and the SPS $TiO_2$ membranes was analyzed using XRD (X'Pert pro MRD, Malvern® Panalytical, UK). Measurements were carried out in the 2θ step scan mode from 20° to 90° using $CuK_\alpha$ radiation and a step size of 0.02. Content of anatase in the feedstock powder and in the SPS membrane was measured using HighScore Plus software (Malvern panalytical, UK).

Porosity Evaluation

Porosity evaluation of samples was performed with two analytical methods: gray scale image analyzing based on SEM images and mercury intrusion porosimetry.

Gray Scale Image Analyzing

Figure 17:
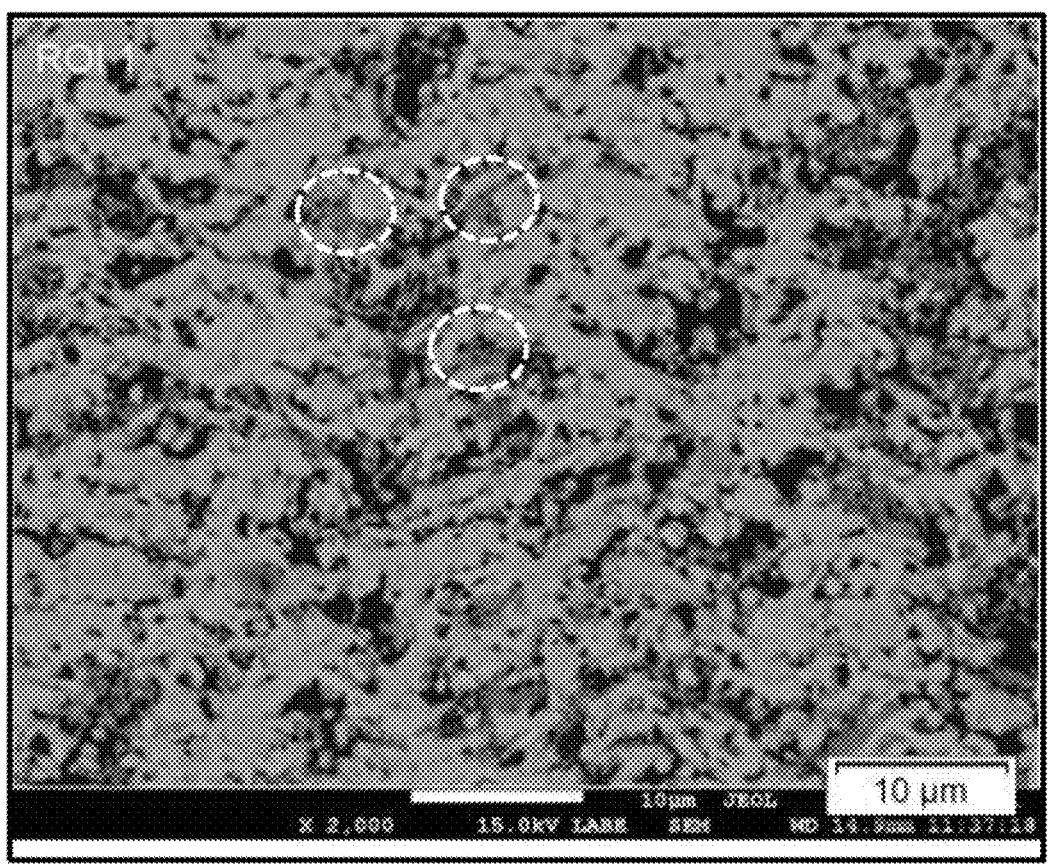
FIG. 17 Gray scale threshold adjustment for image analyzing of SPS $TiO_2$ membrane. Circled areas show the regions containing un-melted particles.

Gray scale image analyzing was performed with an image analyzing software (Olympus® Stream basic, Canada) based on SEM images of the polished cross-sections of the samples obtained with backscatter electron detector and at the magnification of 2000×. To have consistent results, the images were captured in the same conditions regarding the voltage (15 kV), working distance (15 mm), contrast and brightness. The evaluation was carried out by adjusting the gray scale threshold, at the level that provided the best coverage of the pores. FIG. 17 shows an example of the adjusted threshold in an SEM image of the cross-section of SPS $TiO_2$ membrane, in which the porous area is marked in blue color. The evaluation was completed by calculation of the surface area of the colored sections (Porous surface area), by the software. The final result was reported as the average obtained from 10 SEM images.

Mercury Intrusion Porosimetry

This technique is based on the fact that a non-wetting liquid such as mercury does not penetrate pores by capillary action. Thus, pressure is needed to be applied in order to force mercury to intrude the capillaries. The pressure is inversely proportional to the size of the pores. Large pores are intruded under lower pressure, while higher pressure is needed to intrude small pores. The relation between the capillary diameter and the pressure is described by equation (1), called Washburn equation:

$$P = \frac{-4\gamma\cos\theta}{d} \quad (1)$$

in which p is the pressure, γ is the surface tension of the liquid (mercury), θ is the contact angle of the liquid, and d is the diameter of the capillary.

Pores can be classified in three major groups: closed pores, blind pores and open pores including cross-linked pores and through pores. The pores that are filled with mercury are through pores, cross linked pores and blind pores. In this study, an automatic mercury intrusion porosimeter (Autopore IV, Micrometric, USA) was used. The evaluation was performed on a free-standing coating deposited on a stainless-steel substrate. Dimensions of the sample was ~1.5×2.5×0.014 cm. In order to remove the coating, the substrate was bent mechanically resulting in delamination of the coating from the substrate. A solid sample penetrometer with the volume of 5 cm³ and the stem volume of 0.392 cm³ was used. Mercury contact angle and its surface tension were set at 1300 and at 485 dynes/cm respectively. The measurements were carried out in both the low and high pressure ranges and the pressure was increased up to 60,000 psi (~414 MPa).

Evaluation of the Performances of the Membrane
Water Permeation Measurement

Clean water permeation measurement was performed with a dead end stirred cell (Sterlitech®, HP4750, USA). The pressure rate was up to 1000 psi and membrane discs with diameters between 47 mm and 50 mm could be fitted in this cell and the active membrane area was 14.6 cm².

The membrane was inserted in the bottom of the cylinder. The cell was closed and sealed with high-pressure clamps and the cylinder was filled with deionized water. The water was forced to pass through the membrane by applying compressed nitrogen. The pressure used in this experiment was between 2 psi and 40 psi. The volume of permeated water was measured at a constant time. The stir bar assembly and the magnetic stirring plate were not used, since the experiment was performed with clean deionized water.

Water permeation flux was calculated according to equation (2):

$$J = \frac{V}{t.A}, \quad (2)$$

in which J is the permeation flux ($Lh^{-1}m^{-2}$), V is the volume (L), A is the active surface area of the membrane ($m^2$). The experiment was repeated three times.

Evaluation of Photocatalytic Activity of the Membrane

The photocatalytic activity of the titanium dioxide membrane was evaluated by analyzing the degradation of an aqueous solution of an organic dye, methylene blue (Sigma-Aldrich®, USA) under UVC illumination (100-280 nm).

The characteristics of the UVC lamp (Ster-L-Ray®, Atlantic Ultraviolet co. USA) that was used for photodegradation of methylene blue aqueous solution in the presence of $TiO_2$ membranes, are summarized in Table 8.

TABLE 8

Characteristics of UVC light.

| Lamp description | Length (mm) | Power (W) | Current (mA) | UV output (W) | UV output at 1 meter (Micro watts) | Effective life (hours) |
|---|---|---|---|---|---|---|
| Ozone free | 201 | 18.4 | 425 | 5.8 | 59 | 10000 |

Figure 18:
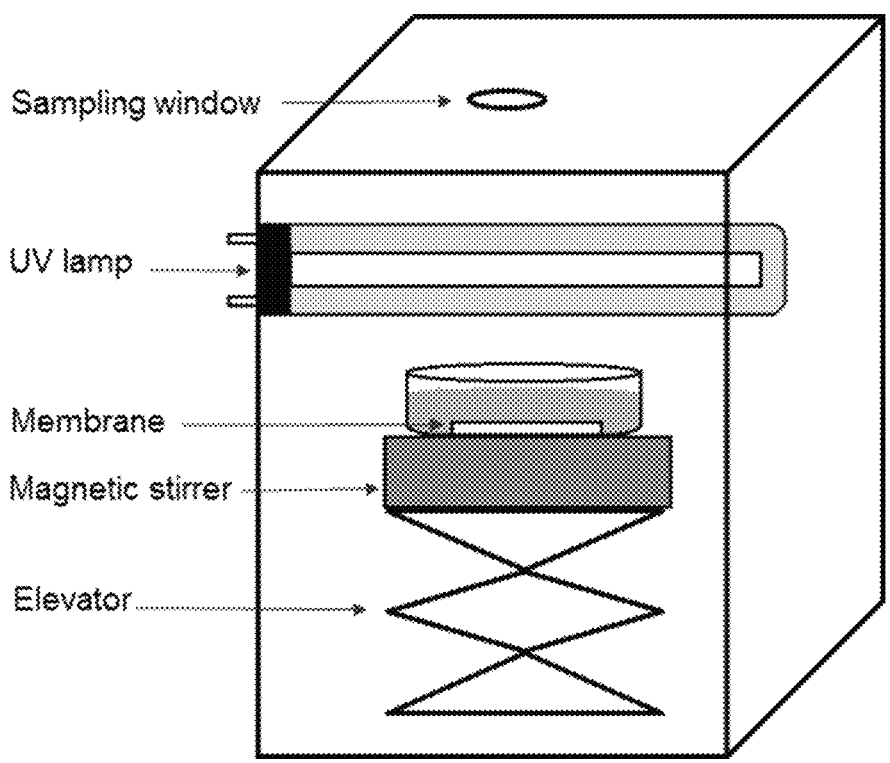
FIG. 18 Schematic of the photoreactor.

FIG. 18 illustrates a schematic of the photoreactor that was used for this experiment. The photoreactor was a system made by a petri dish containing the membrane and the dye solution enclosed in a wooden box covered with aluminum foil to avoid interference from natural light and to block UVC irradiation. To generate some agitation in the solution system, a magnetic stirrer was used. Since the intensity of the UV light decreases by increasing the distance from the light source, the petri dish was mounted on a laboratory support/lift to keep the surface of the membrane at a close distance to the UV light source. The distance between the top of the petri dish and the UV lamp was adjusted at 2 cm. Sampling was carried out with a pipette and through a sampling window on top of the box. The experiment was carried out under a fume hood and at room temperature.

The concentration of methylene blue solution used was 100 ppm. Two membranes were attached to the bottom of the petri dish with double sided tape. A 100 mL of methylene blue solution was added to the petri dish containing the membranes and was stirred on the magnetic stirrer in the dark for 30 minutes to reach Methylene blue absorption-desorption equilibrium to initiate the photocatalytic reaction. The UVC lamp was turned on after that and samples were taken with time intervals according to Table 9. The process of sampling stopped when the sample became completely clear and without traces of blue dye.

TABLE 9

Sampling time intervals for evaluation of photocatalytic activity of the membrane.

| | Sample number | | | | | | | | | |
|---|---|---|---|---|---|---|---|---|---|---|
| | 1 | 2 | 3 | 4 | 5 | 6 | 7 | 8 | 9 | 10 |
| Time (min) | 0 | 15 | 30 | 40 | 50 | 55 | 60 | 65 | 70 | 80 |

The degradation of methylene blue was analyzed by measuring the absorbance with a UV-Vis spectrometer (Cary 8454 UV-vis Spectrophotometer, Agilent® technologies) at 660 nm. To measure the absorbance of a solution of an unknown concentration, a six-points calibration curve was obtained for methylene blue samples with 10, 25, 50, 75, 100 and 125 ppm of concentration. The calibration curve was linear in the concentration range of the experiment and the linear regression equation was y=0.0082x+0.0039 with correlation coefficient 0.994. To eliminate the error associated with the loss of light due to the reflection from the surface of the cuvettes containing the methylene blue samples, a reference measurement was made with a cuvette containing only deionized water (solvent). This experiment was repeated three times.

Results and Discussion

Below, the microstructure of the above SPS samples will be discussed in the following order:
- the SPS $TiO_2$ coating on stainless-steel substrate from preliminary experiment (SPS-W-0),
- the eight SPS $TiO_2$ coatings on stainless-steel substrate listed in Table 6, and
- the SPS $TiO_2$ membrane on porous alumina substrate without and with cooling the substrate.

Then, the influence of spray conditions on microstructures of three samples (SPS-W-0, SPS-W6 on stainless-steel substrate and SPS-W-6 on alumina substrate) will be discussed and their micro structures will be described in detail. The results of porosity measurement and XRD phase analysis will be presented and the results of experiments for evaluation of service performance of the suspension plasma sprayed $TiO_2$ membranes deposited on porous $Al_2O_3$ substrate including water flux and photocatalytic behavior will be discussed.

Microstructure of the SPS $TiO_2$ Coatings and Membranes
Preliminary SPS $TiO_2$ Coating Deposited on Stainless-Steel Substrate (SPS-W-0)

The spray parameters used for deposition of sample SPS-W-0, which was the preliminary sample produced in this work, were summarized in Table 5 and the spray conditions was according to Table 10.

TABLE 10

Spray condition for preliminary experiment (sample SPS-W-0).

| Sample | Substrate | Solid content (% wt) | Spray distance (mm) | Solvent | Surfactant |
|---|---|---|---|---|---|
| SPS-W-0 | Stainless steel | 20 | 50 | Water | 5% PAA |

The coating was generated by 75 passes of spraying and the average thickness of the coating was 194 μm. Microstructure of SPS $TiO_2$ coating on stainless-steel substrate obtained from the preliminary experiment is presented in FIG. 11.

A porous coating was generated. The light gray areas in FIG. 11 correspond to the areas formed by melted particles and the dark gray areas are the porosities filled with unmelted and/or re-solidified particles. Also, the columnar features formed as the result of the shadow effect can be very easily observed.

The Eight SPS $TiO_2$ Coatings Deposited on Stainless-Steel Substrates

Figure 19:
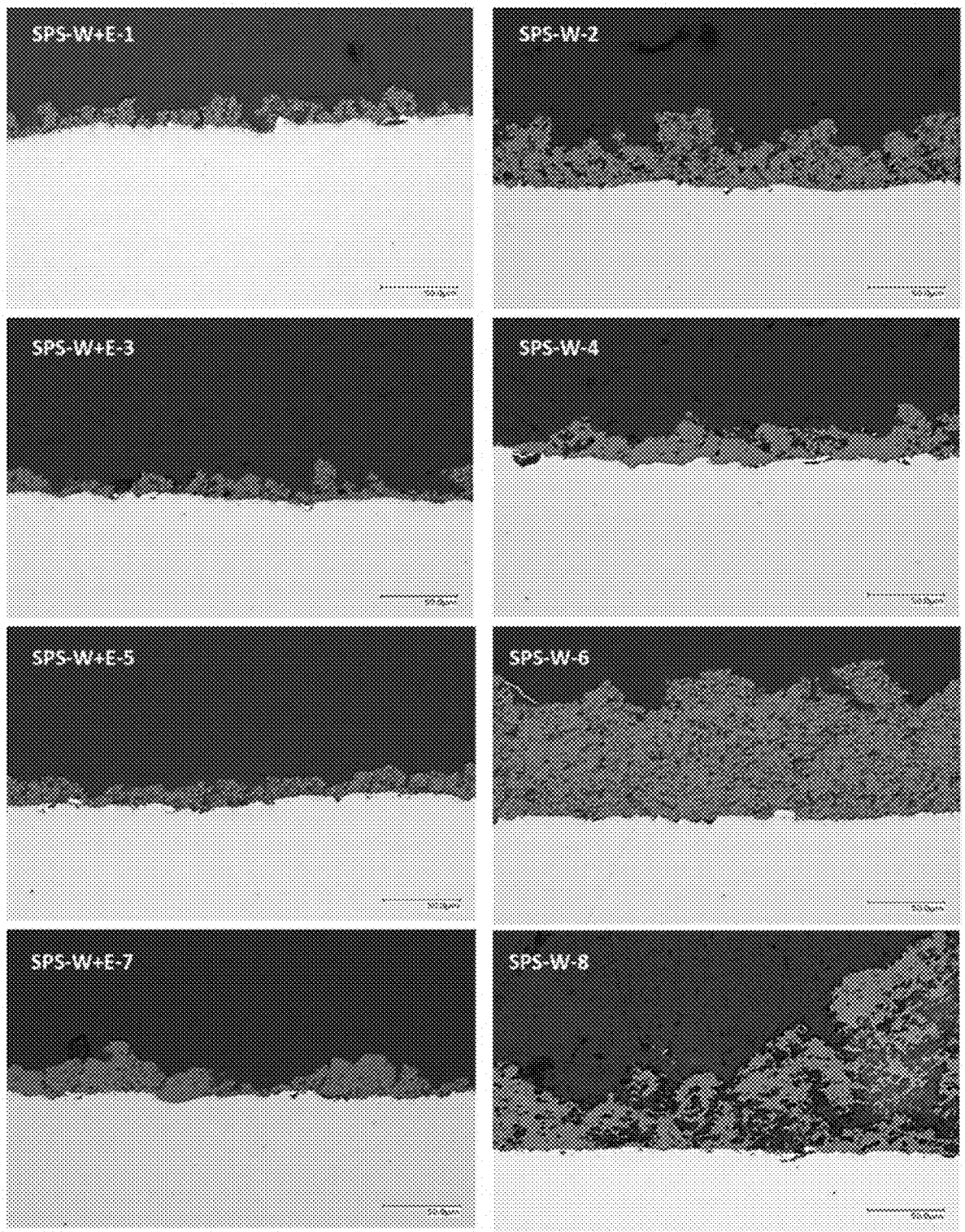
FIG. 19 Polished cross-sectional view of SPS $TiO_2$ coating deposited on stainless-steel substrates based on the designed matrix of experiments observed with optical microscope.

FIG. 19 shows the low-magnification optical microscope images of polished cross-sections of the eight coatings deposited on stainless-steel substrates based on the matrix of experiments shown in Table 6.

All these coatings were obtained after 40 passes of spraying. As mentioned before, the microstructure of the filtration membranes needs to be uniform. In addition, the membrane coating must show a certain minimal thickness and cover the entire surface of the porous substrate. The others are too thin, do not completely cover the surface and/or are highly irregular (i.e. show large thickness variations).

It can be observed in FIG. 19 that only sample SPS-W-6 formed a relatively uniform coating covering all parts of the substrate. This coating has an average thickness of 96 μm. Thus, sample SPS-W-6 was chosen to spray on porous ceramic substrate.

The SPS $TiO_2$ Membrane Deposited on Porous Alumina Substrate

SPS $TiO_2$ membranes were deposited on porous alumina substrates with and without cooling the substrate. All the membranes sprayed without substrate cooling cracked during the spay process. This could possibly be related to the decrease of thermal conductivity of alumina ceramics with porosity, which along with the low thickness of alumina substrates (2 mm), might have made it prone to cracking during the coating deposition process.

Figure 20:
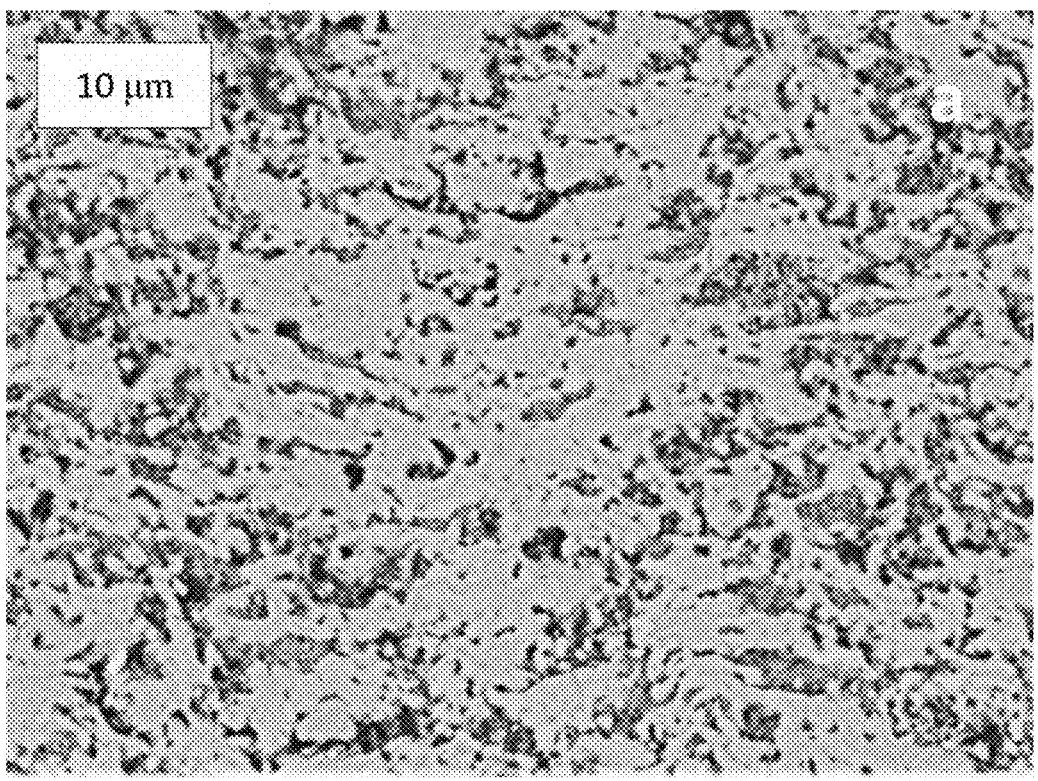
FIG. 20. SEM micrographs of polished cross sections of SPS $TiO_2$ deposited on porous alumina substrate without cooling the substrate.
Figure 21:
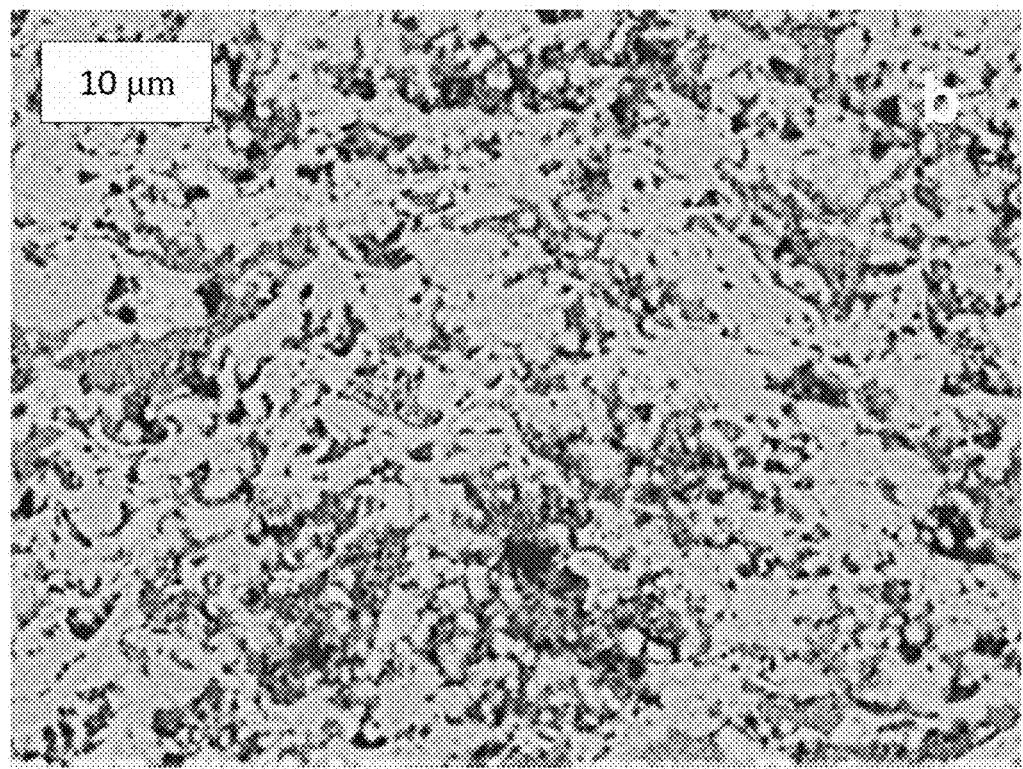
FIG. 21 SEM micrographs of polished cross sections of SPS $TiO_2$ deposited on porous alumina with cooling the substrate.

FIG. 20 shows the SEM images of the polished cross sections of SPS $TiO_2$ membrane deposited on porous alumina substrate without cooling the substrate and FIG. 21 shows the SEM images of the polished cross sections of SPS $TiO_2$ membrane deposited on porous alumina substrate with cooling the substrate. At first glance, these two images seem to show almost identical microstructures. However, results of porosity measurement and the XRD showed a slight difference between them—see below.

Figure 22:
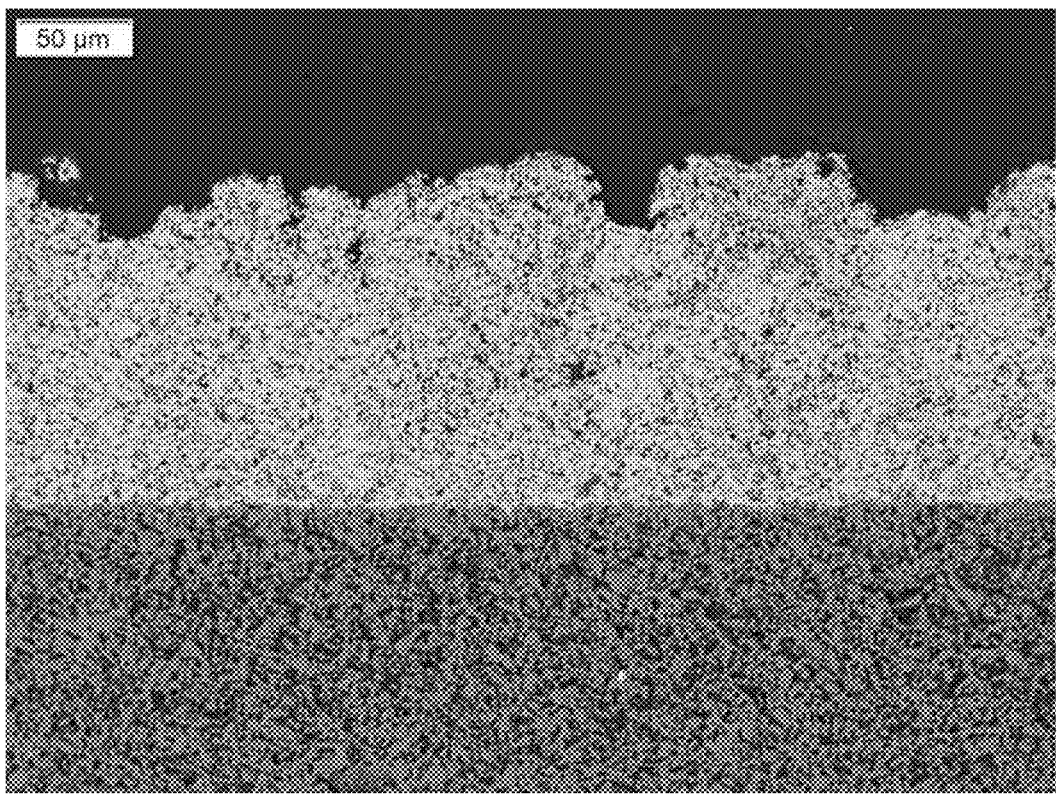
FIG. 22 Low magnification SEM micrograph of polished cross-sectional view of SPS $TiO_2$ membrane deposited on porous alumina substrate.
Figure 23:
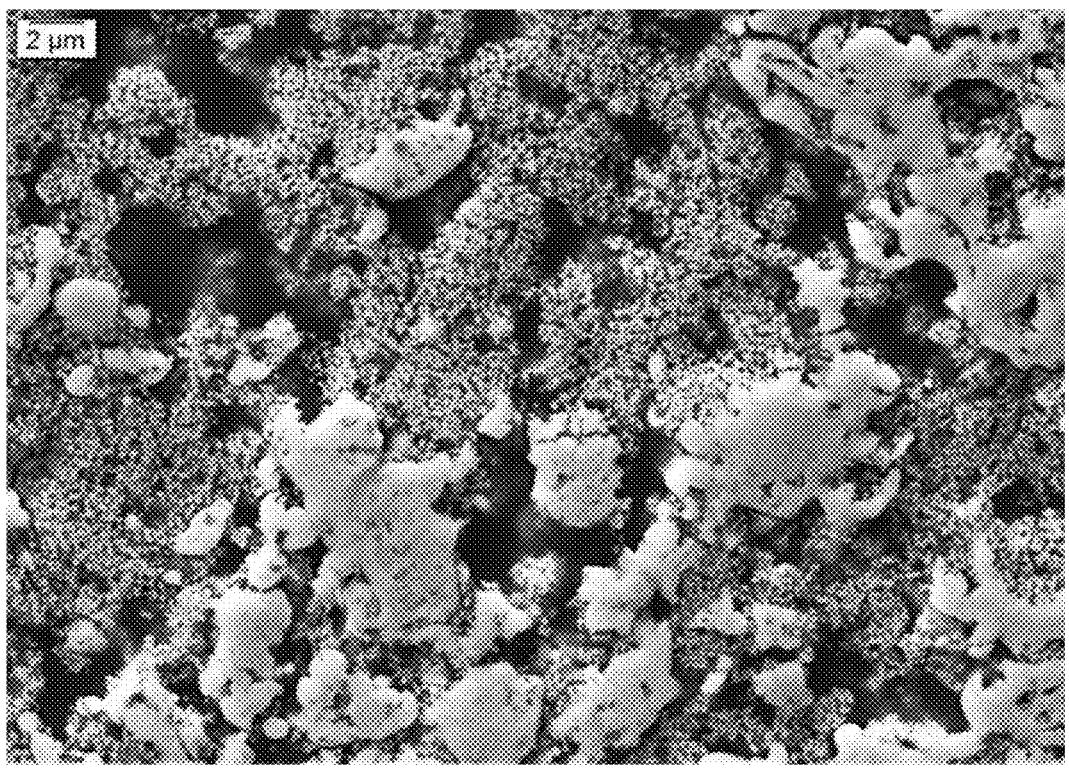
FIG. 23 High magnification SEM micrograph of polished cross-sectional view of SPS $TiO_2$ membrane deposited on porous alumina substrate.

FIGS. 22 and 23 show the low and high magnification images of SPS $TiO_2$ membrane (with cooling). As it can be seen, a relatively uniform coating was generated on the porous substrate. The high magnification image reveals more details on the microstructure.

Influence of Spray Conditions on Coating Structure

In this section, the overall homogeneity of the SPS $TiO_2$ coatings of three samples (SPS-W-0 on stainless-steel substrate (SPS-W-0-SS), SPS-W-6 on stainless-steel substrate (SPS-W-6-SS), and SPS-W-6 on porous alumina substrate (SPS-W-6-PA)) and the possible effect of two factors, namely suspension stability and the roughness of the substrate on the uniformity of the coatings will be discussed.

Table 11 shows three SPS $TiO_2$ samples based on the difference in suspension recipes and in the substrate roughness. To identify the type of substrates used for each sample, two letters have been added to the name of the samples; SS stands for stainless-steel and PA stands for porous alumina.

TABLE 11

Description of samples SPS-W-0 and SPS-W-6 on stainless-steel substrates and SPS-W-6 on a alumina substrate.

| Sample | Substrate | Substrate roughness $R_a$ (μm) | Solid content (% wt) | Solvent | Surfactant | Spray distance (mm) | No. of passes |
|---|---|---|---|---|---|---|---|
| SPS-W-0-SS | Stainless steel | 5.3 | 20 | Water | 5% of solid content PAA | 50 | 75 |
| SPS-W-6-SS | Stainless steel | 5.3 | 20 | Water | Non | 50 | 40 |
| SPS-W-6-PA | Porous alumina | 0.9 | 20 | Water | Non | 50 | 40 |

Figure 24:
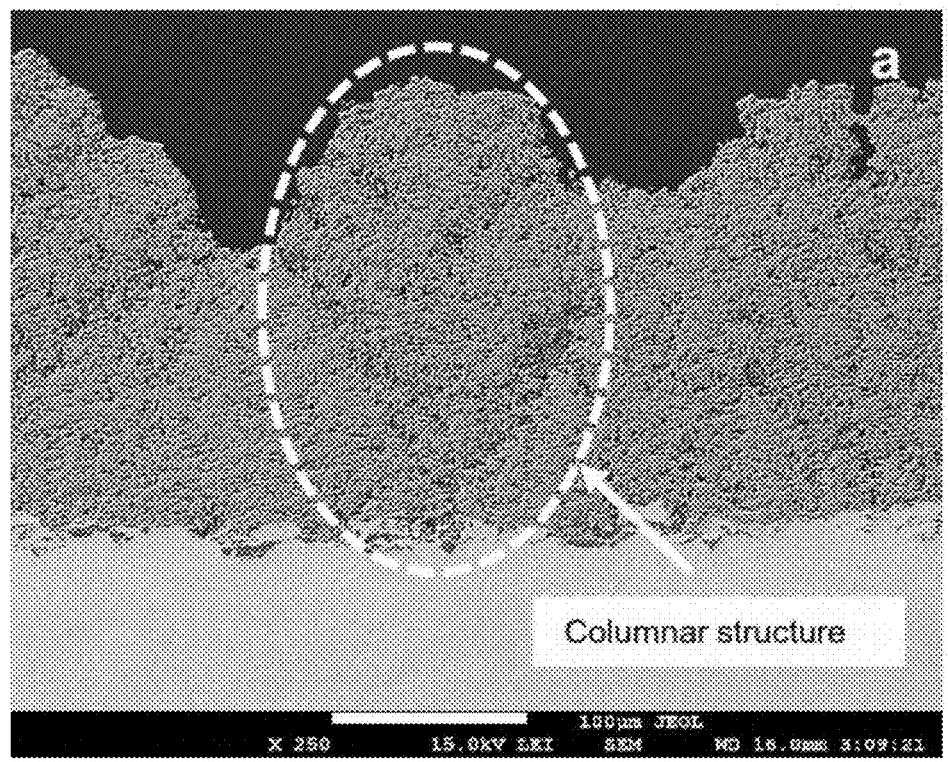
FIG. 24 SEM micrographs of SPS $TiO_2$ coating SPS-W-0-SS.
Figure 25:
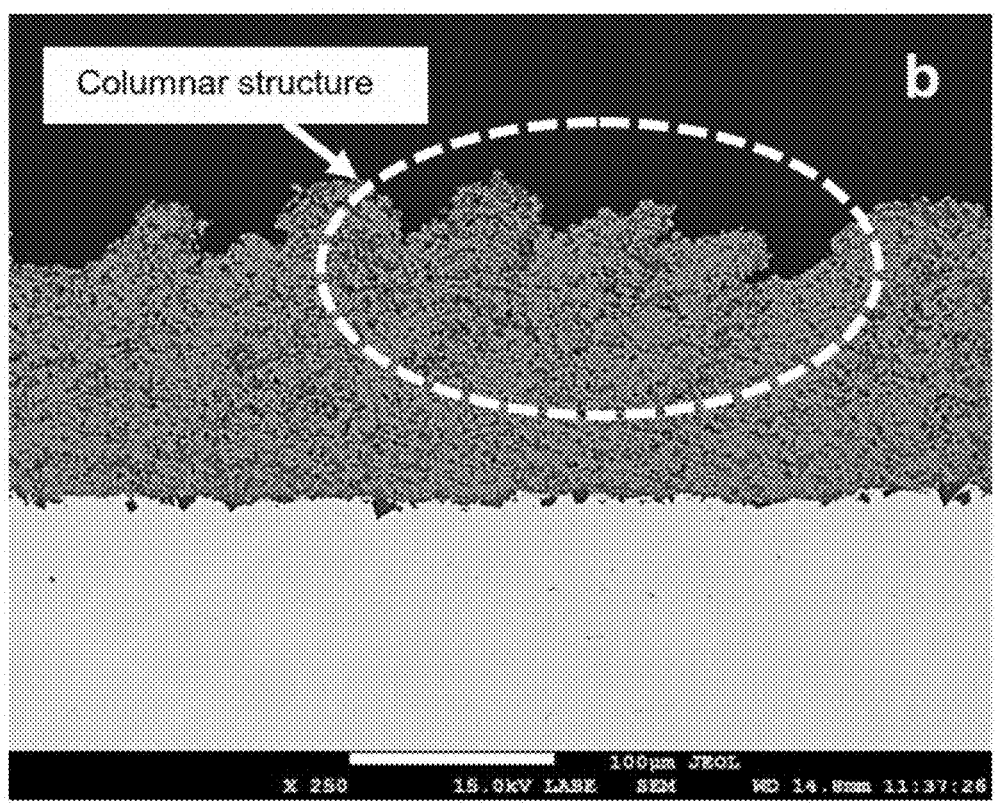
FIG. 25 SEM micrographs of SPS $TiO_2$ coating SPS-W-6-SS.
Figure 26:
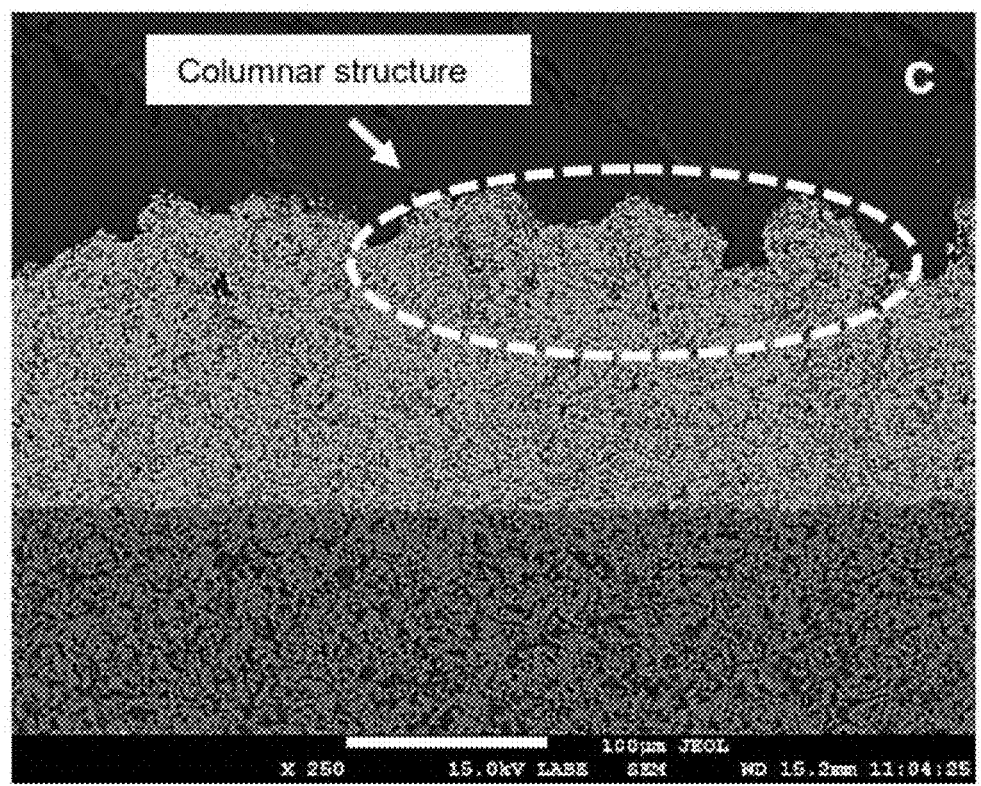
FIG. 26 SEM micrographs of SPS $TiO_2$ coating SPS-W-6-PA.

FIGS. 24, 25, and 26 shows low magnification SEM micrographs of three coatings mentioned in Table 11. Considering that a filtration membrane is expected to be uniform, the columnar microstructure generated as a result of shadow effect in SPS coatings was considered a less desirable feature in the microstructure.

The columnar features in SPS-W-0-SS, SPS-W-6-SS and SPS-W-6-PA samples can be observed in FIG. 24 to C) with various levels of severity. In this part, first samples SPS-W-0-SS and SPS-W-6-SS will be compared based on the suspension used and in the next step sample SPS-W-6-SS and sample SPS-W-6-PA will be compared based on the substrate they were sprayed on.

Comparing FIG. 24 and FIG. 25, in the former, generation of columnar features in the coating has started at the beginning of spray process. Indeed, the structure of the columns can clearly be seen across the whole thickness of the coating. In contrast, although columnar features can be observed in FIG. 25, their formation only started later during the spray process. Indeed, the column structure only appear at some intermediate point in the thickness of the coating (about halfway through or even somewhat lower than that). In fact, about half of the coating thickness, corresponding to the layers deposited in the beginning of spray process, is free of these features and shows a homogenous microstructure.

The only process difference between samples SPS-W-0-SS and SPS-W-6-SS was the suspension used in the coating deposition process as it is mentioned in Table 11. As mentioned before, sedimentation of the suspension occurred during the deposition process of samples SPS-W-0-SS. Meaning that the particles present in that suspension were more prone to agglomeration. It may be assumed that in the case of SPS-W-0-SS, impingement of the large agglomerates on the asperities of the stainless-steel substrate possibly promoted the shadow effect by creating larger asperities.

In the case of SPS-W-6-SS, there were possibly fewer large agglomerations in the suspension due to the more uniform suspension. In this case, the suspension contained had a uniform particle size distribution without large agglomerates. Therefore, a more uniform coating compared to SPS-W-0-SS has been generated at first. However, when increasing the thickness of the coating, the effect of the surface asperities possibly resulted in generation of columnar features due to the shadow effect.

Comparing coatings illustrated in FIG. 25 and FIG. 26, the effect of the substrate surface roughness on the microstructure of coating can observed. Indeed, the same suspension was used for both samples, but the substrate varied. The stainless-steel substrate was about 6 times rougher than porous alumina substrate. About two third of the coating in sample SPS-W-6-PA is homogenous and the non-uniformities are restricted to the top layers. It may be concluded that due to the lower roughness of the ceramic substrate, the effect of the surface asperities was reduced resulting in a thicker more uniform microstructure compared to SPS-W-6-SS. In fact, the smoother surface of the ceramic substrate possibly reduced the influence of large agglomeration within the suspension, which would generate the asperities on the coating.

Microstructural Features of Sample SPS-W-6 on Porous Alumina Substrate

Hereinbelow, sample SPS-W-6 deposited on porous alumina substrate will simply be referred to as the "SPS TiO$_2$ membrane".

Figure 27:
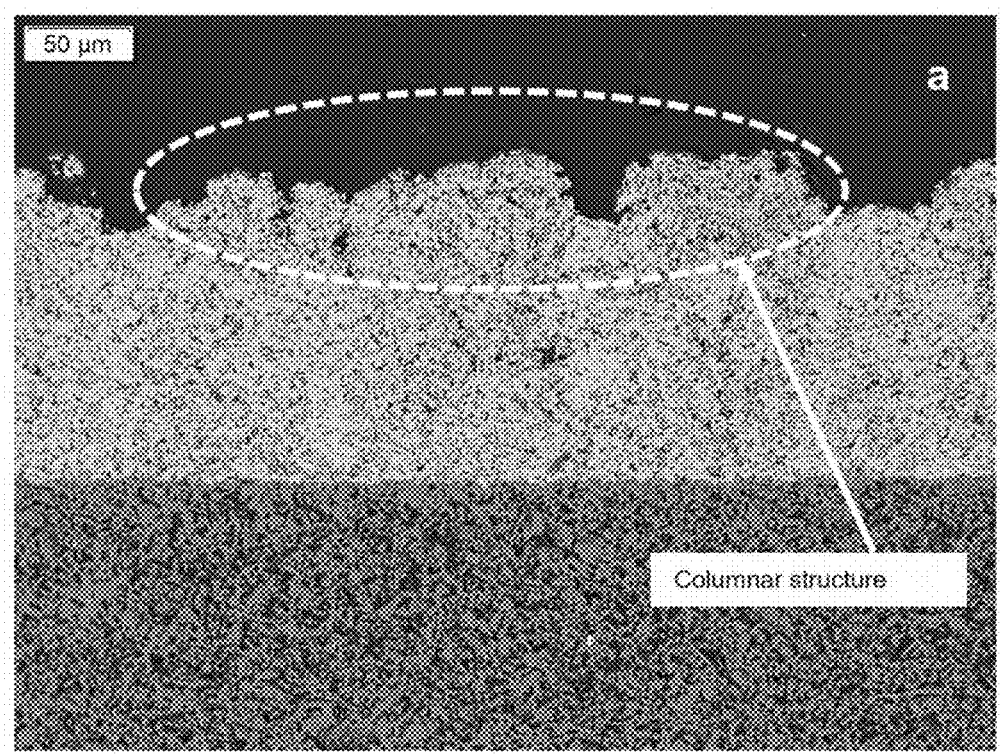
FIG. 27 Low magnification SEM micrograph of polished cross-sectional view of SPS $TiO_2$ membrane.
Figure 28:
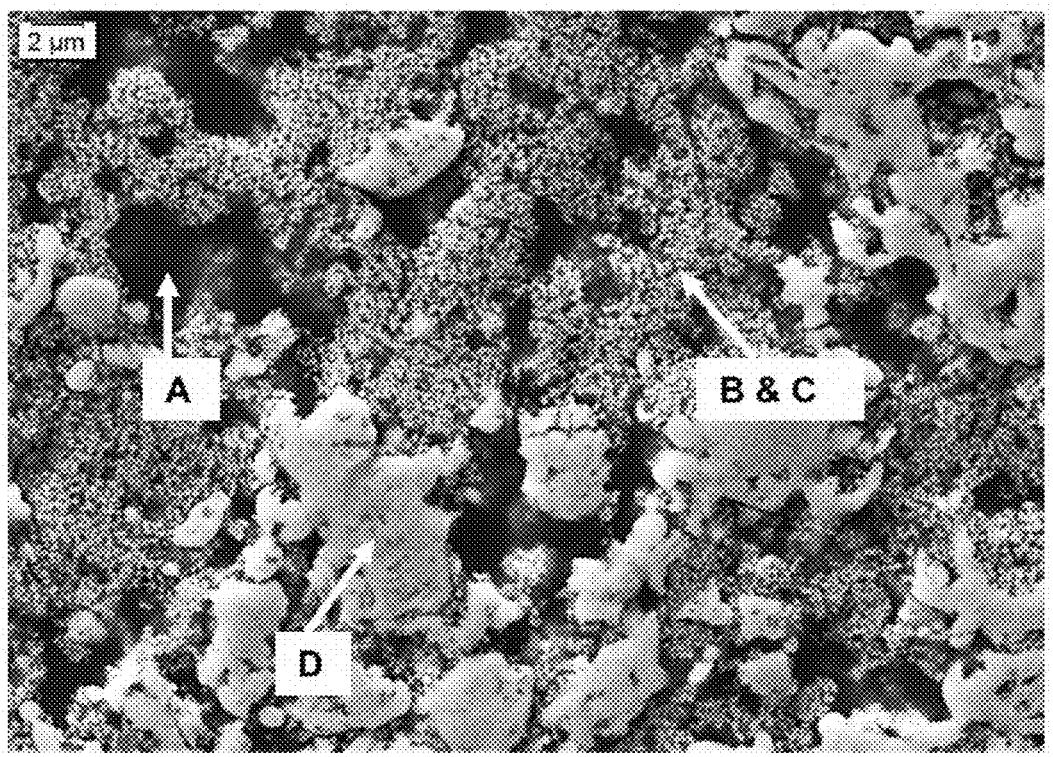
FIG. 28 High magnification SEM micrograph of polished cross-sectional view of SPS $TiO_2$ membrane.
Figure 29:
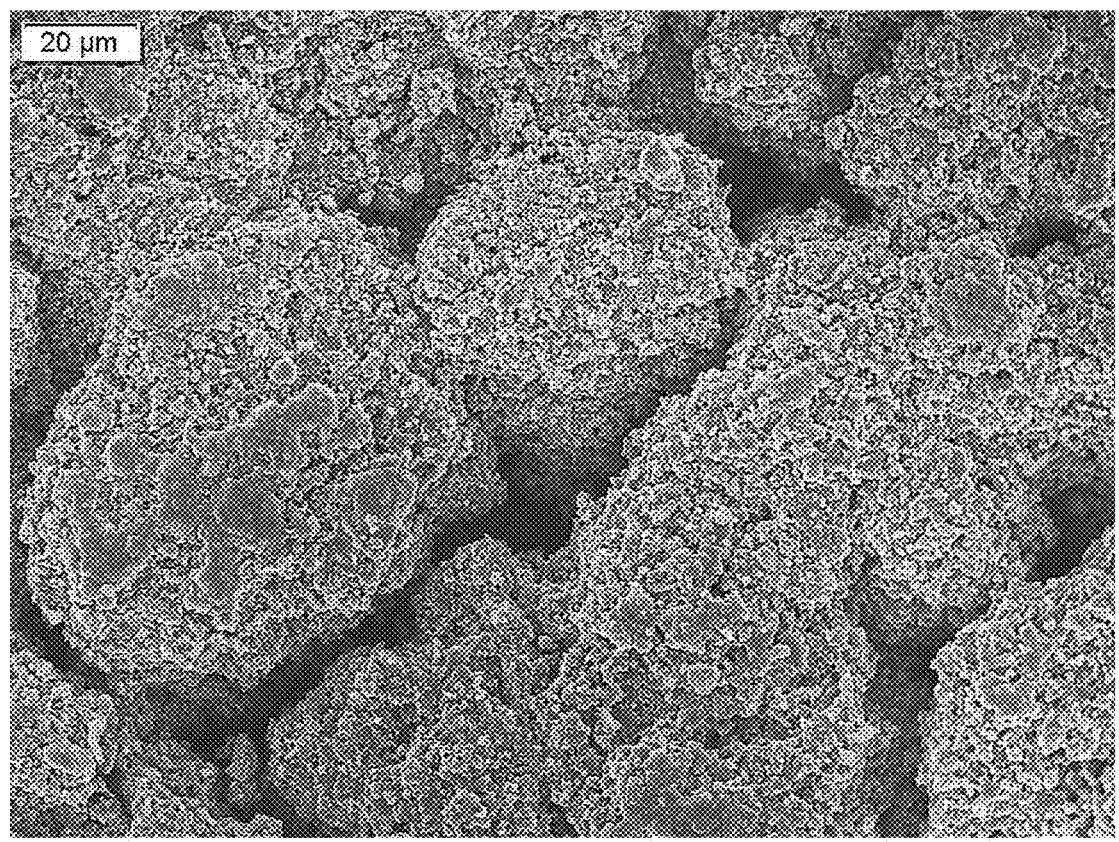
FIG. 29 SEM micrograph of columnar microstructure on the surface of SPS $TiO_2$ membrane.

FIGS. 27 and 28 shows the details of the SPS TiO$_2$ membrane in the polished cross-sectional view. Features of microstructure have been marked on the SEM images. The top of the bumps seen in FIG. 27 can be observed in FIG. 29.

The low magnification SEM micrograph of SPS TiO$_2$ membrane in FIG. 27 shows a relatively homogeneous porous coating with average thickness of 139 μm was generated with 40 passes of spraying, which gave around 3.5 μm of coating per each pass. The non-uniform features in the microstructure are limited to the top layers (top third) of the coating.

The surface roughness of SPS TiO$_2$ membrane was measured as $R_a$ equal to 8.8 μm.

As mentioned before, an ideal ceramic filtration membrane ideally has a uniform structure, which results in a more stable filtering process. A uniform microstructure is also advantageous since it is more easily cleaned. The non-uniformities on the surface of SPS TiO$_2$ membrane could probably be eliminated by producing a thinner membrane layer. However, photocatalytic property would possibly decrease by the smoothness of the surface of the membrane due to the decrease of reactive surface area. In the case of SPS TiO$_2$ membrane, although the presence of columnar features on the top layer of membrane has a negative effect on homogeneity of the membrane, it could possibly perform in favor of photocatalytic behavior of the membrane due to the increased reactive surface area.

Figure 30:
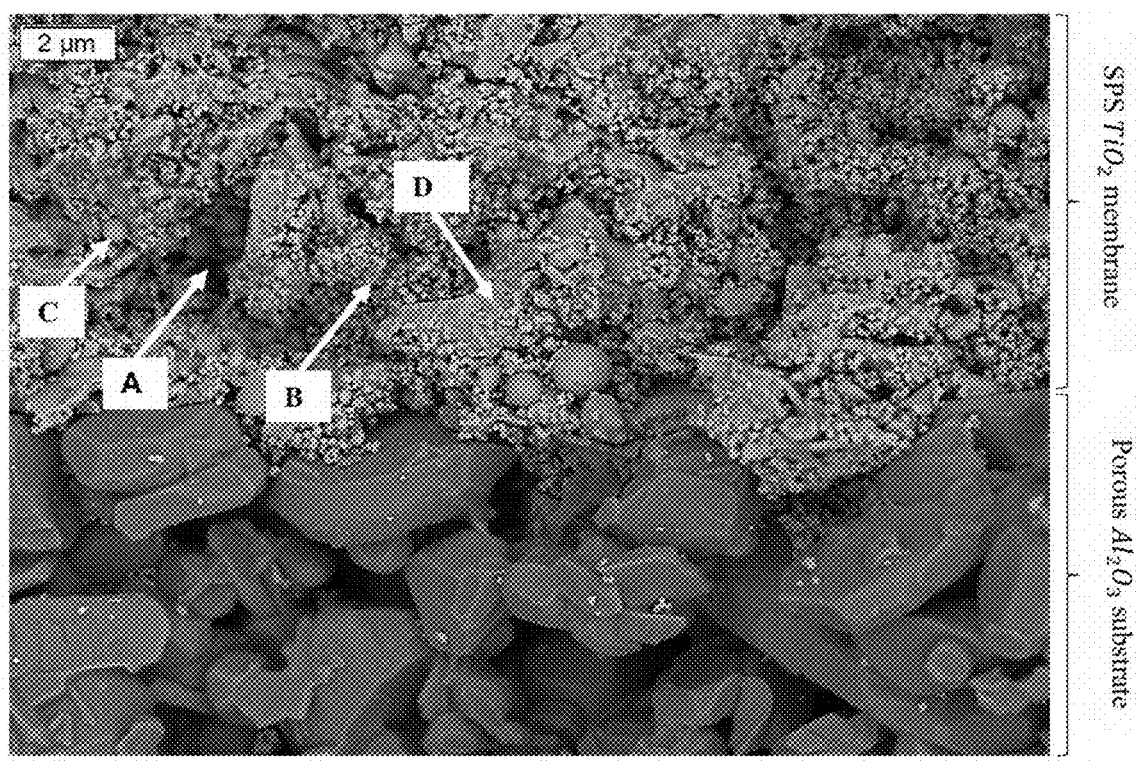
FIG. 30 SEM micrograph of fractured cross-section of SPS $TiO_2$ membrane.

Different features of the high-magnification polished cross-sectional microstructure in FIG. 28, include large porosities (A), areas including a mix of non-melted (B) and possibly re-solidified (C) particles and areas formed by fully melted particles (D). FIG. 30 shows these same microstructural features of SPS TiO$_2$ membrane on its fractured cross-section in a more detailed manner.

Unlike conventional ceramic membranes, in which the use of binders is essential not only to attach the membrane particles together but also to attach the membrane to the substrate, it can be observed that in SPS TiO$_2$ membrane a unique network of fine pores was generated as a result of entrapment of un-melted and re-solidified particles within a matrix built by fully melted particles (splats). Moreover, the adherence of the SPS TiO$_2$ membrane to the substrate occurs independent of any binder and only due to the mechanical bonds between the membrane and the substrate. Measurement of the particle diameters present in SPS TiO$_2$ membrane based on SEM micrographs of the coating showed an average particle size of 154 nm, which is in agreement with average starting feedstock powder particle size of 137 nm obtained from SEM micrographs of the TiO$_2$ powder.

Figure 31:
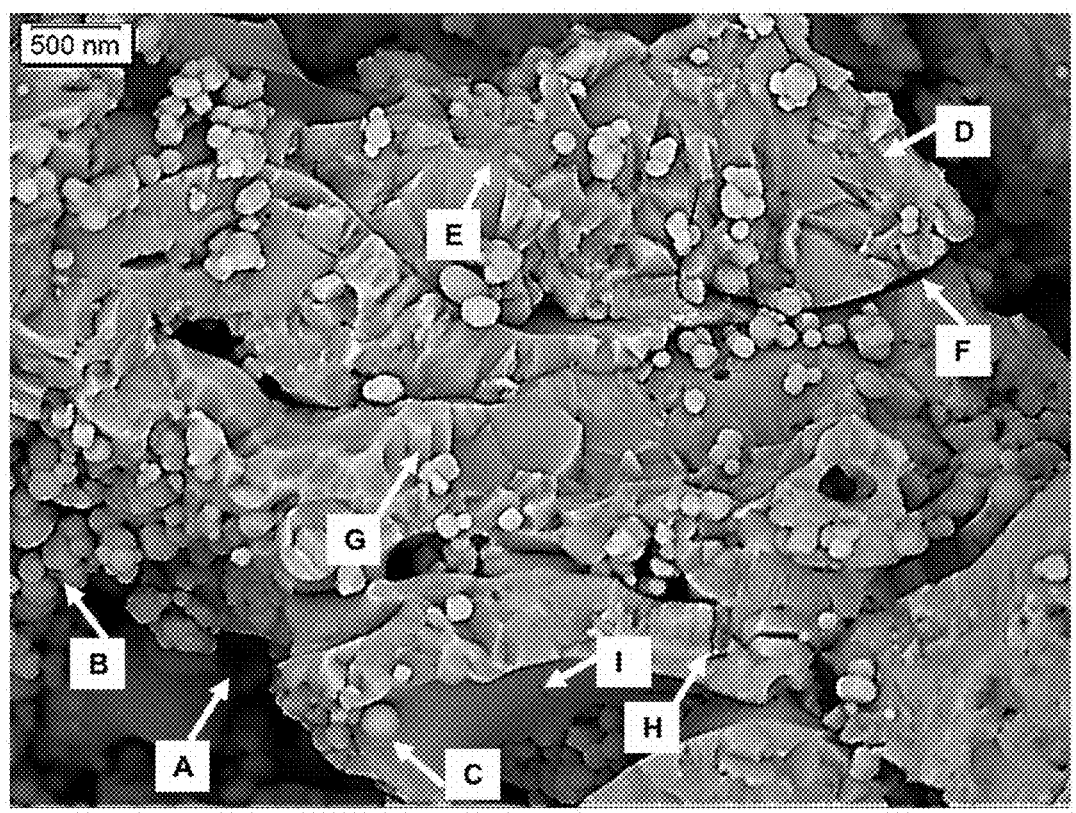
FIG. 31 High magnification SEM micrograph of fractured cross-section of SPS $TiO_2$ membrane.

Other than the microstructural features (A), (B), (C) and (D) mentioned above, with a closer look in the high magnification cross-sectional view of the fractured surface of SPS TiO$_2$ membrane shown in FIG. 31, areas of good (E) and poor (F) inter-splat bonding. Columnar grain growth of the splats (G), intra-lamellar cracks (H) and inter-splat cracks (I) can be observed.

XRD Results

Figure 32:
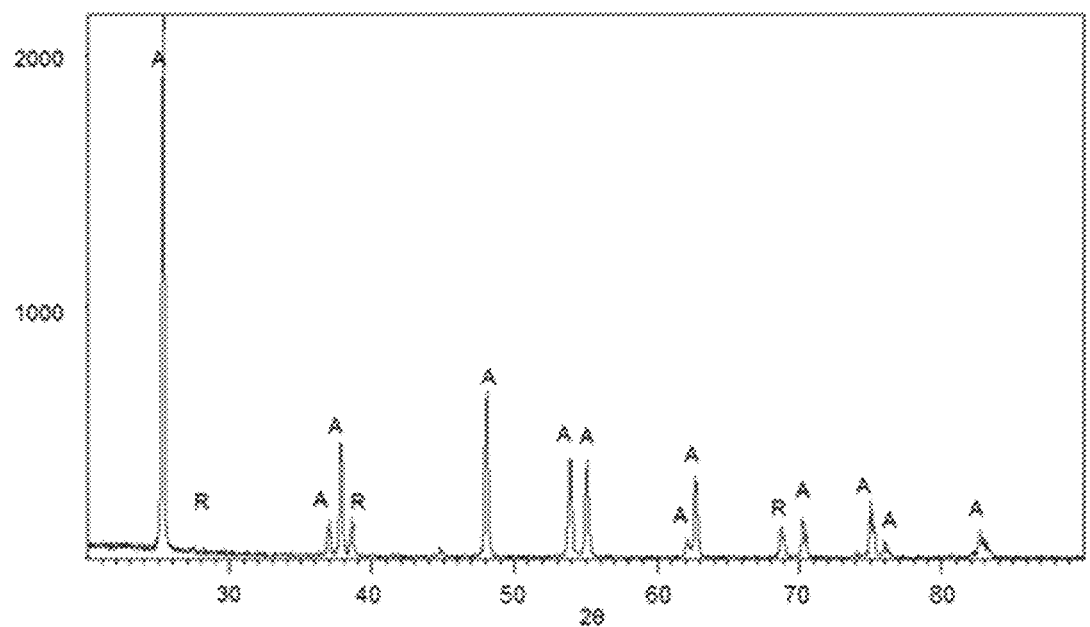
FIG. 32 X ray diffraction pattern of $TiO_2$ powder used in the feedstock suspension.
Figure 33:
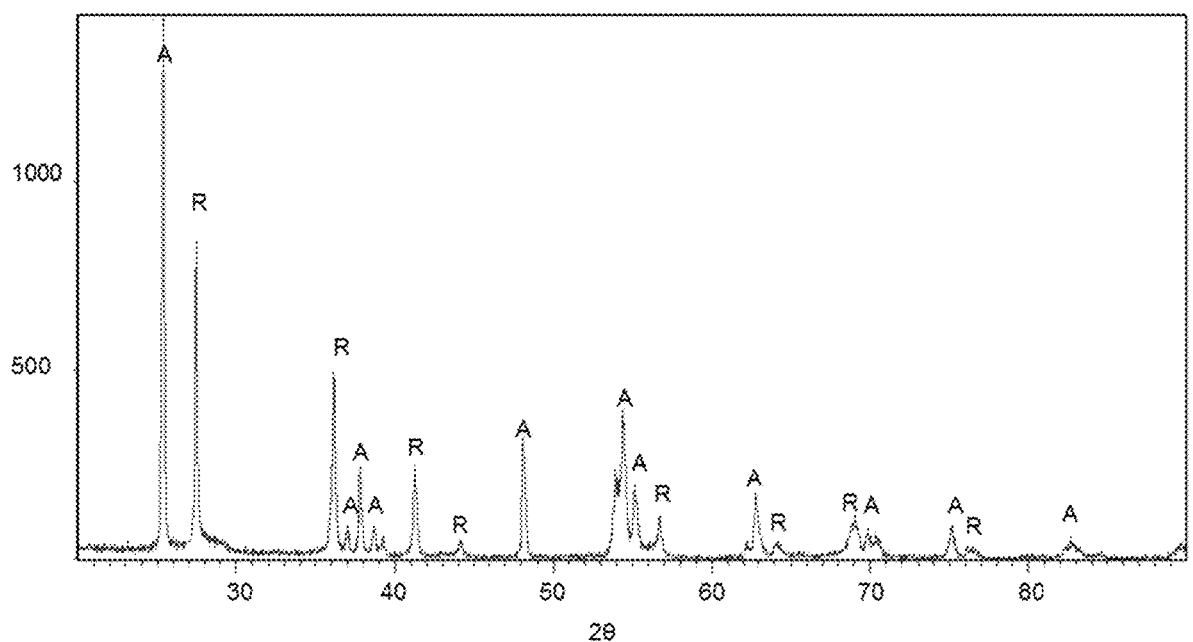
FIG. 33 X ray diffraction pattern of SPS $TiO_2$ membrane.

FIG. 32 shows the diffraction patterns of the TiO$_2$ powder used in the feedstock suspension and FIG. 33 shows the diffraction pattern in the SPS TiO$_2$ membrane. In these two images, A stands for anatase and R stands for rutile. XRD analysis results showed modifications in the crystalline composition of the SPS TiO$_2$ membrane with respect to that to the initial raw material feedstock.

Figure 34:
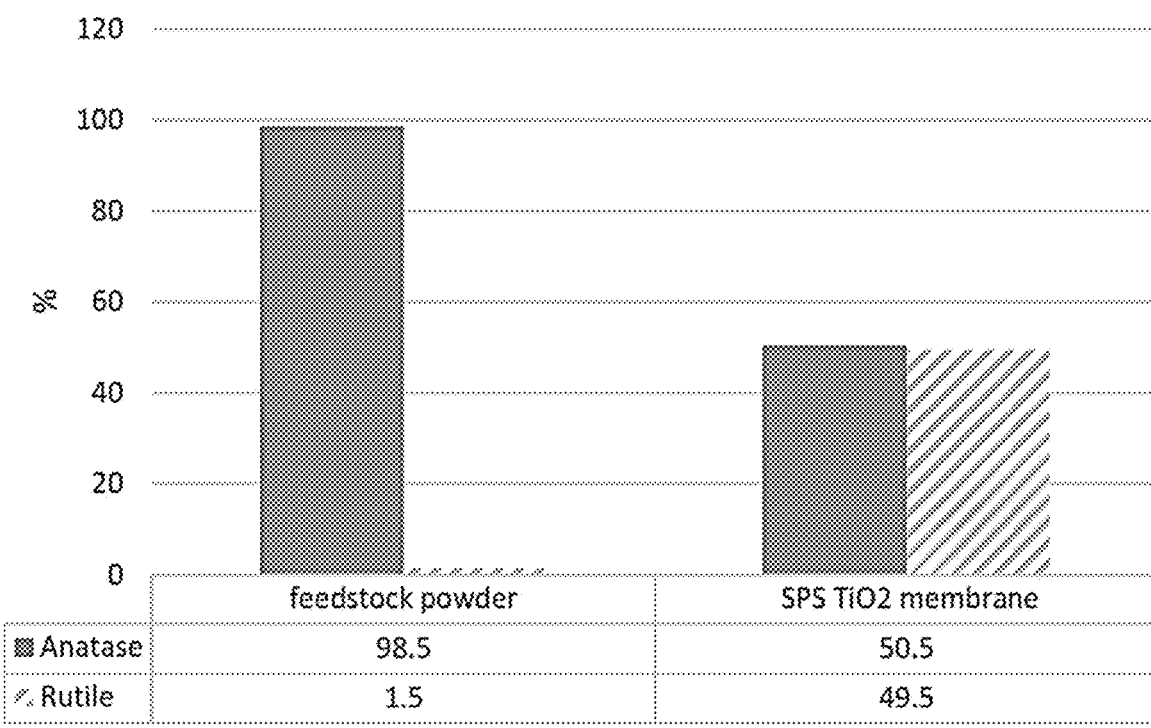
FIG. 34 Anatase and rutile contents in the feedstock powder and in the SPS $TiO_2$ membrane.

FIG. 34, compares the anatase and rutile contents in the feedstock powder and in the final membrane based on XRD results.

Anatase transforms to rutile at 900 K. Molten TiO$_2$ solidifies as rutile, which is the stable form at high temperature and is maintained at room temperature. Considering that the temperature of the substrate was maintained around 200° C. during membrane deposition process, the anatase found in the coatings was not melted during spraying. In the process of deposition of the SPS $TiO_2$ membrane, due to the presence of water as a carrier for feedstock powder, the heat transfer between the plasma and the particles is relatively low. This probably increases the number of un-melted particles with the original anatase structure in the final coating. The similarity of the size of the particles present in the coating and the size of those in the feedstock powder also support this theory. In addition, looking at FIG. 28, when eliminating the porous area, approximately 50% of the surface corresponds to the particles and the other 50% to the melted zones, which seems to be in accordance with the XRD results showing the presence of 50% anatase in the membrane. However, in SPS, nucleation of anatase from the melt could be possible depending on the free energy of nucleation and interfacial energy between solid and liquid phase. In the SPS process, agglomerates of submicron to nanosized particles are injected into the plasma jet. Some of these particles may melt or evaporate. Melted particles may then re-solidify during the flight or after impinging the substrate as metastable anatase forming nanosized crystallites.

Porosity Evaluation

Results of image analyzing of SPS $TiO_2$ membrane showed 17% of porosity in the SPS $TiO_2$ membrane. Considering that this result was obtained based on a binary image of the cross-section surface, it includes all types of pores including closed, blind, cross-linked and through pores in to account. The accuracy of the result may be limited regarding the areas containing non-melted particles shown in FIG. 17, since the adjustment of gray scale threshold in those areas could not be performed accurately. It can be seen that large pores have an anisotropic morphology, while the smaller pores have a more regular shape. The larger pores are probably open and interconnected pores containing agglomerates of un-melted particles.

To gather complementary data concerning the bulk of the coating, mercury intrusion porosimetry was performed. This method is based on the possibility of forcing mercury to fill the pores. Consequently, this method gives information on the pores connected to the surface including blind pores, crosslinked pores and through pores.

Figure 35:
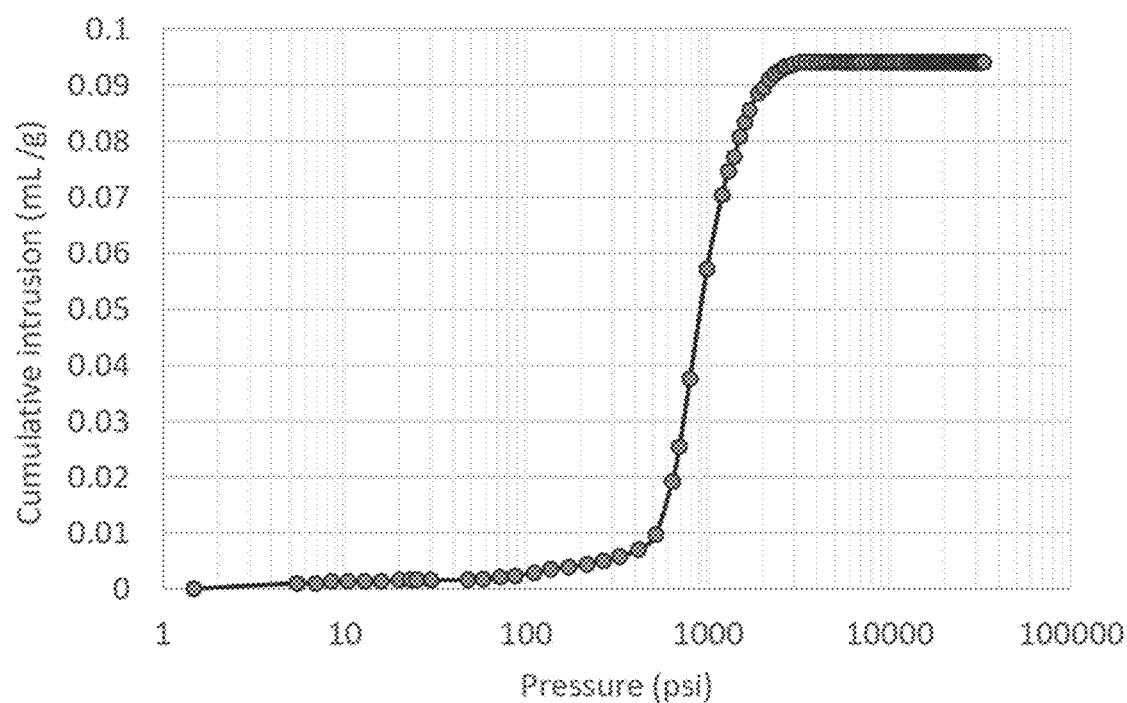
FIG. 35 MIP results of SPS $TiO_2$ membrane showing the intrusion vs pressure.

FIG. 35 illustrates the mercury intrusion volume versus pressure in SPS $TiO_2$ membrane. The intrusion volume increased with increasing pressure. The larger pores in SPS $TiO_2$ membrane were filled at lower pressures, while higher pressure was needed to fill the smaller pores. All the pores connected to the surface were filled at 33000 psi. The total porosity of SPS $TiO_2$ membrane measured by mercury intrusion porosimetry was 14%.

Figure 36:
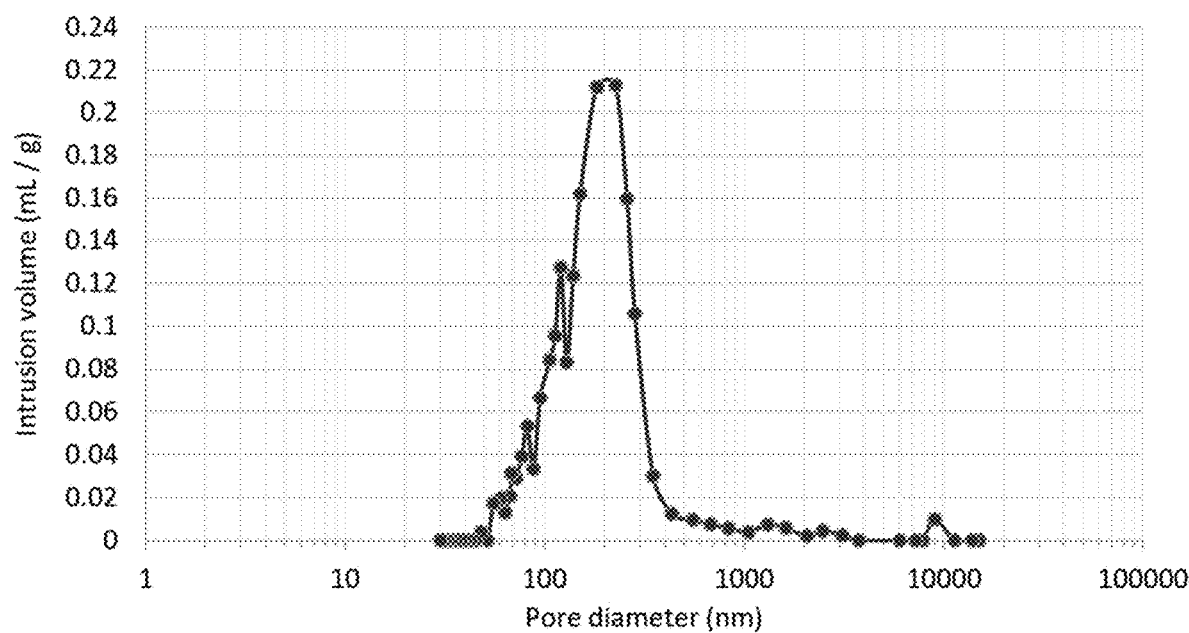
FIG. 36 MIP results of SPS $TiO_2$ membrane showing pore size distribution.

Pore size distribution of SPS $TiO_2$ membrane is shown in FIG. 36. A rather narrow pore size distribution can be observed between around 100 nm and 500 nm.

Figure 37:
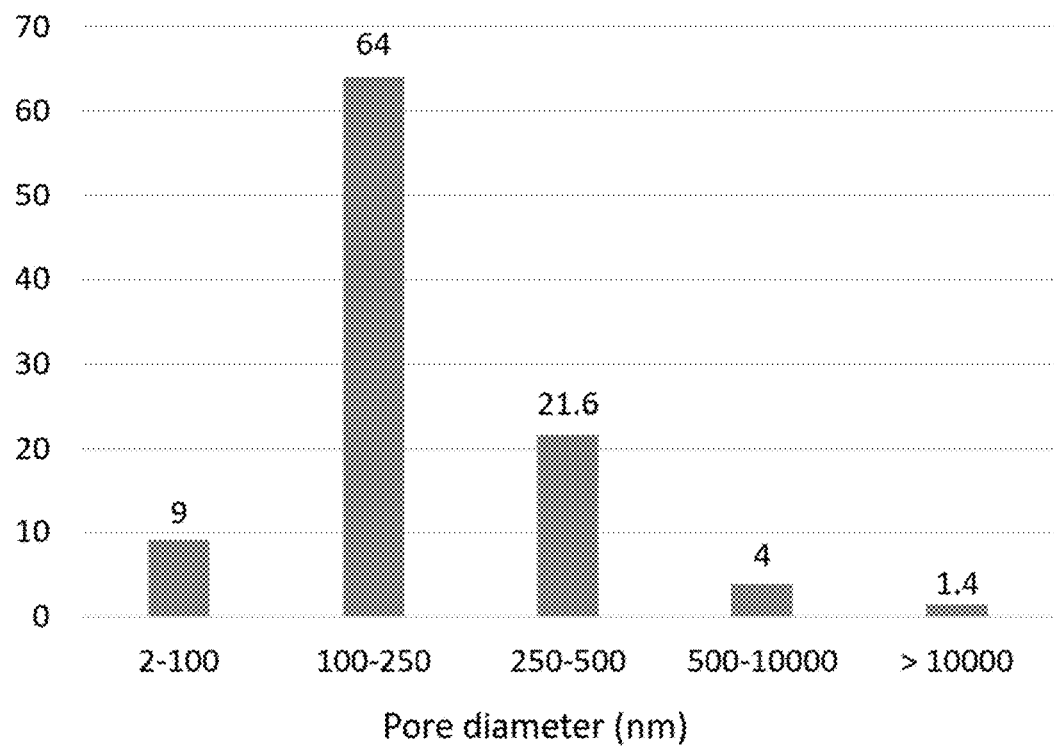
FIG. 37 Pore size classification in SPS $TiO_2$ membrane.

As can be seen in the classification of pore diameters shown in FIG. 37, about 90% of the pores were in the range of 100-10,000 nm, which according to Table 1 puts the SPS $TiO_2$ membrane in the category of microfiltration membranes. With about 86% of the pore in the range of 100-500 nm, the pore sizes in SPS $TiO_2$ membrane is close to the lower limit of microfiltration membranes. An average pore diameter of 184 nm was obtained for the membrane. It seems possible that some of the larger pore sizes probably corresponded to the columnar features on the surface of the membrane and to the voids between adjacent columns.

Effect of the Temperature of the Substrate

Substrate temperature is a parameter that can influence the deposition formation and the development of microstructure in plasma spraying. FIGS. 20 and 21 show the microstructure of polished cross-section of SPS $TiO_2$ membrane on (a) not cooled and (b) cooled porous alumina substrate. As it can be observed in FIGS. 20 and 21, these two microstructures do not seem different. However, as summarized in Table 12, measuring the porosity with image analyzing method showed a slight increase of 1.5% in porosity in samples sprayed with cooling the substrate compared to that sprayed without cooling.

TABLE 12

Porosity measurement of SPS $TiO_2$ membrane deposited on cooled and not cooled substrates obtained with gray scale image analyzing method.

| SPS $TiO_2$ membrane | Magnification | Porosity[%] |
| --- | --- | --- |
| Cooled | 2000 | 17 |
| Not cooled | 2000 | 15.5 |

This difference may be due to the fact that, when the particles impact a high temperature substrate, they deposit in the form of a disc with uniform heat conduction leading to a lower inter-lamellar porosity and enhanced contact between splats. On the other hand, impinging on a low temperature substrate, particles deposit in the form of splashes, which by providing less contact to the previously deposited splat may result in forming porosity in the deposited coating.

It also can be assumed that the intervals between depositions of two successive layers could promote weaker adhesive bonds between the layers. Although from the cross-sectional view the membrane seems to be uniform, further experiments can be designed in order to evaluate the endurance of the membrane.

Figure 38:
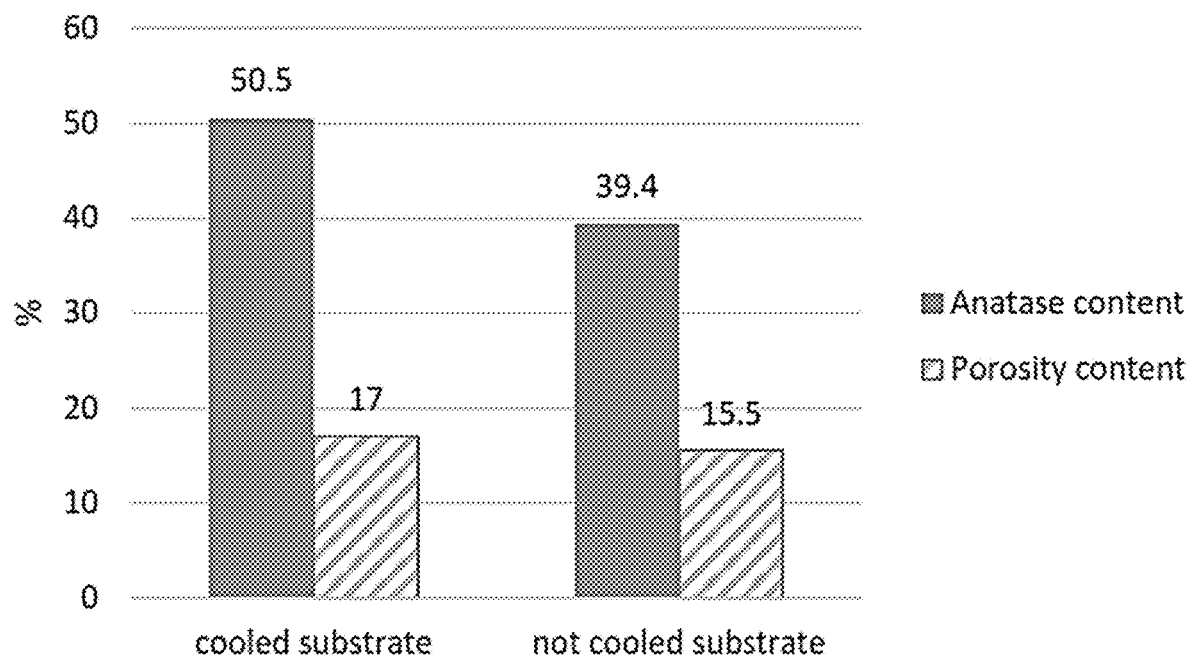
FIG. 38 Anatase content and porosity content in membranes sprayed on cooled and not cooled substrates.

Cooling the substrate also influenced the crystalline phases present of the membrane that could influence the porosity content as well. FIG. 38 compares the anatase content and porosity content in membranes sprayed on cooled and not cooled substrates. The anatase content of the membranes sprayed on cooled substrate was obtained around 10% higher than that in membranes sprayed on not cooled substrate. Considering that the anatase content in the coating possibly corresponds to the presence of un-melted anatase particles from the feedstock powder, one may conclude that the higher amount of anatase in the membrane could be interpreted as the presence of more porosity in the membrane deposited on cooled substrate.

Water Permeability of the Membrane

Figure 39:
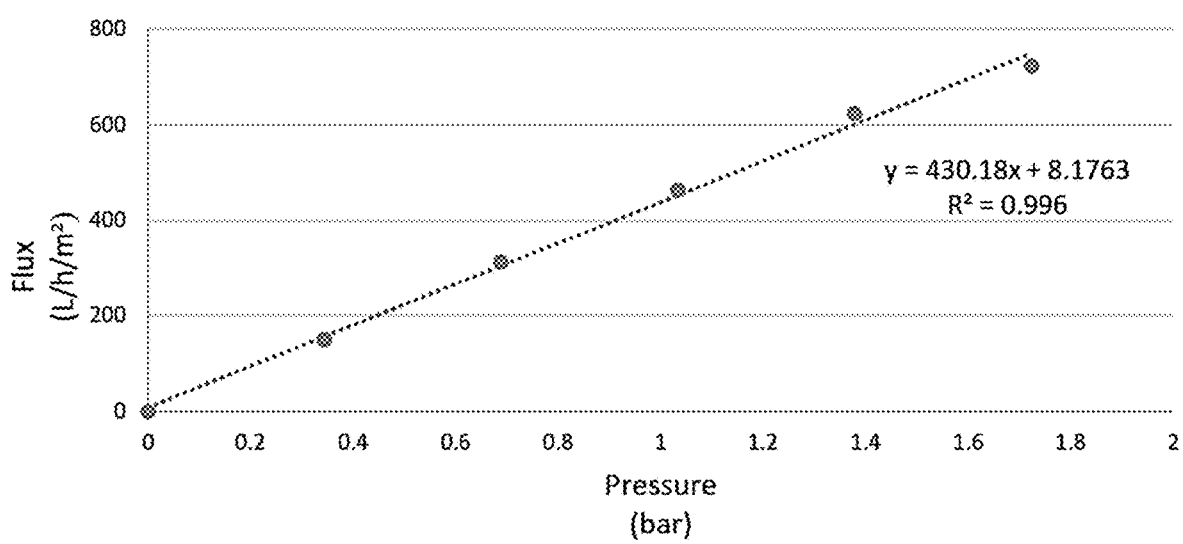
FIG. 39 Water permeability measurement on SPS $TiO_2$ membrane.

FIG. 39 shows the experimental measurements of water flux of SPS $TiO_2$ membrane. Water flux of the membrane increased linearly as a function of pressure. Clean water flux was obtained as 430 L/h/m$^2$/bar. The highest pressure applied on this membrane was 25 psi (1.72 bar).

According to the commercial data available on filtration membranes mentioned in Table 1, permeability of SPS $TiO_2$ membrane is lower than that of microfiltration membranes. This lower water permeability of the SPS $TiO_2$ membrane could be explained by its higher thickness. Water permeability of a membrane is inversely proportional to its thickness. Although a higher thickness may produce more porous layers in the SPS membrane, it also may cause the clogging of the pores on the bottom layers. Therefore, there would be no guarantee that the number of interconnected pores may be increased in a coating with higher thickness.

Optimum thickness of the membrane needs to be chosen in order to ensure the optimum permeation flux as well as the optimum filtration process. The membrane needs to be thin enough to allow a high flux and to be thick enough to make the filtration process possible. As it was mentioned earlier, the thickness of the membrane was suggested to be considered 50 times more than the particle size. Considering the average feedstock particle size in this work as 137 nm, gives the optimum membrane thickness of about 7 µm. The average thickness of SPS TiO$_2$ membrane was measured as 139 µm. The thickness of the uniform section of the coating was around 100 µm, which gives a value around 14 times greater than that suggested in literature. Thus, it may be concluded that by decreasing the membrane thickness the permeability would increase.

Photocatalytic Activity of the Membrane

The photocatalytic behavior of the SPS TiO$_2$ membrane was evaluated by measuring the degradation of an organic dye, methylene blue, in an aqueous solution under UVC illumination. The degradation was observed as a gradual change in the color of the solution from blue at first to complete discoloration after 80 min.

Figure 40:
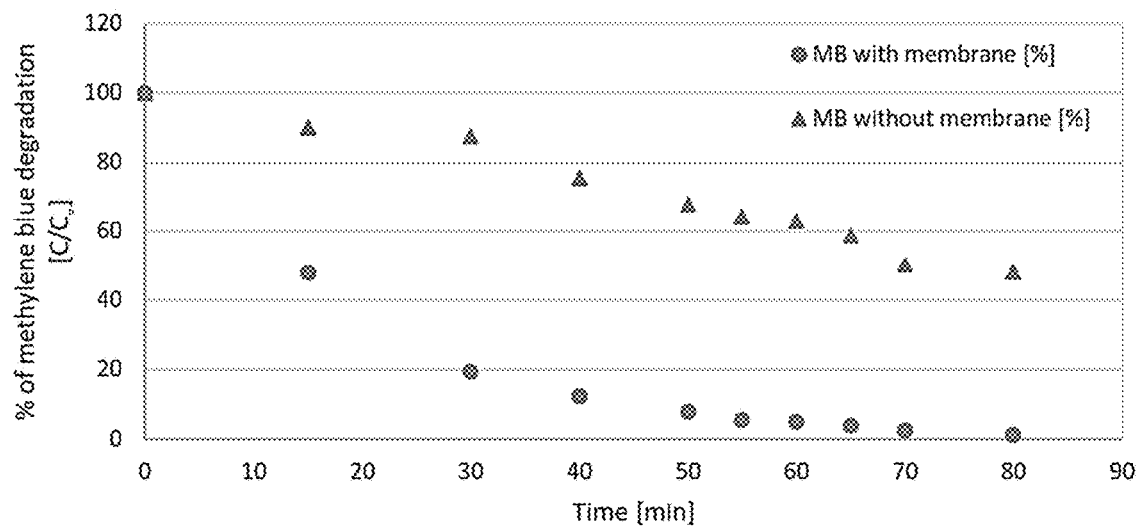
FIG. 40 Influence of SPS $TiO_2$ membrane on Photo degradation of methylene blue.

FIG. 40 shows the degradation of methylene blue under UVC light with and without membrane. The SPS TiO$_2$ membrane significantly increased the degradation of the dye. Almost total degradation occurred after 80 min.

The variation in methylene blue concentration with time may be represented using equation (4):

$$\frac{-dC}{dT} = kC, \quad (4)$$

which after integration results in equation (5):

$$-\ln\frac{C}{C0} = kt, \quad (5)$$

in which C is the methylene blue concentration (ppm), C$_0$ is the initial concentration of methylene blue, t is the irradiation time (h), and k is the constant of photocatalytic activity (min$^{-1}$).

Figure 41:
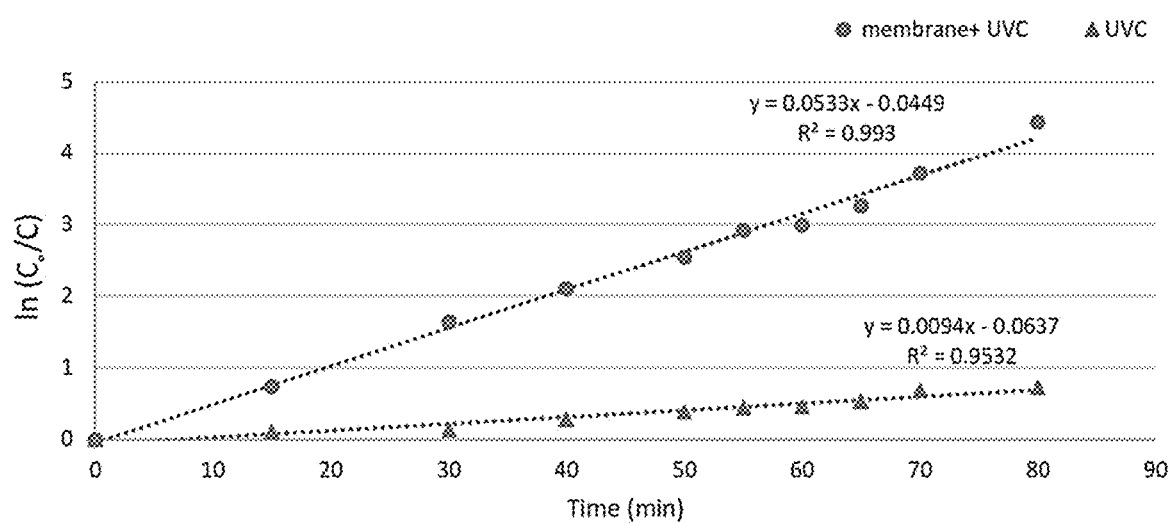
FIG. 41 Variation of $\ln(C_o/C)$ with irradiation time for SPS $TiO_2$ membrane+UVC light and for UVC light.

FIG. 41, shows the plot of ln(C$_0$/C) against time, for methylene blue under UVC light with and without the membrane, in which the slope corresponds to k. Higher k values correspond to faster degradation.

The rate constant for SPS TiO$_2$ membrane under UVC light was 0.053 min$^{-1}$ with a correlation coefficient of 0.993. The constant rate for UVC light without the membrane was obtained as 0.0094 min$^{-1}$ with a correlation coefficient of 0.953. The presence of SPS TiO$_2$ membrane increases the rate constant by a factor of 5.7.

As mentioned, a drawback of using catalysts in the form of membranes instead of powder was the decrease in their capacity of degrading organic contaminants due to the reduction of active surface area. In the case of SPS TiO$_2$ membrane, the porous structure of the membrane as well as the presence of columnar structure on the surface of the membrane, showed in FIGS. 27 and 29, favor photoreactivity of the membrane by increasing the active surface area.

Conclusion

We used suspension plasma spray process as an innovative technique to deposit sub-micron sized particles, to fabricate liquid permeable titanium dioxide membranes for filtration application for the first time.

SPS TiO$_2$ membrane was deposited on a porous alumina substrate to generate a hybrid microfiltration/photocatalysis membrane. Generation of the porous water permeable membrane was carried out through controlling and optimizing of process parameters. In addition, controlling the ceramic substrate temperature during spray process was proved to allow production of an intact membrane system.

SEM analysis of the membrane revealed a uniform porous coating with a unique complex microstructure, in which the network of open pores was built by un-melted and re-solidified particles entrapped in a body made by fully melted particles and the membrane coating was adhered to the porous substrate completely. Different microstructural features, including dense and porous regions and columnar features on the surface of the membrane were recognized. Porosity evaluation of the membrane confirmed the presence of 14% open porosity in the membrane with about 95% of the pore under 500 nm, which puts the SPS TiO$_2$ membrane in the class of micro filtration membranes. Clean water permeability of about 430 L/h/m$^2$/bar was obtained for SPS TiO$_2$ membrane. Water permeability should increase when decreasing membrane thickness. Photocatalytic performance of SPS TiO$_2$ membrane demonstrated the capacity of the membrane to to degrade organic pollutants. This property would also be useful for defouling of the membrane surface. A more homogenous membrane should be obtained by polishing the columnar features observed on the top layer of the membrane or by depositing a thinner membrane coating.

Example 2

Optimization of the Membrane

The membranes of Example 1 were optimized in order to obtain a higher porosity resulting in a higher liquid flow rate. This was done by increasing the number of un-melted and/or re-solidified particles within the structure.

Figure 42:
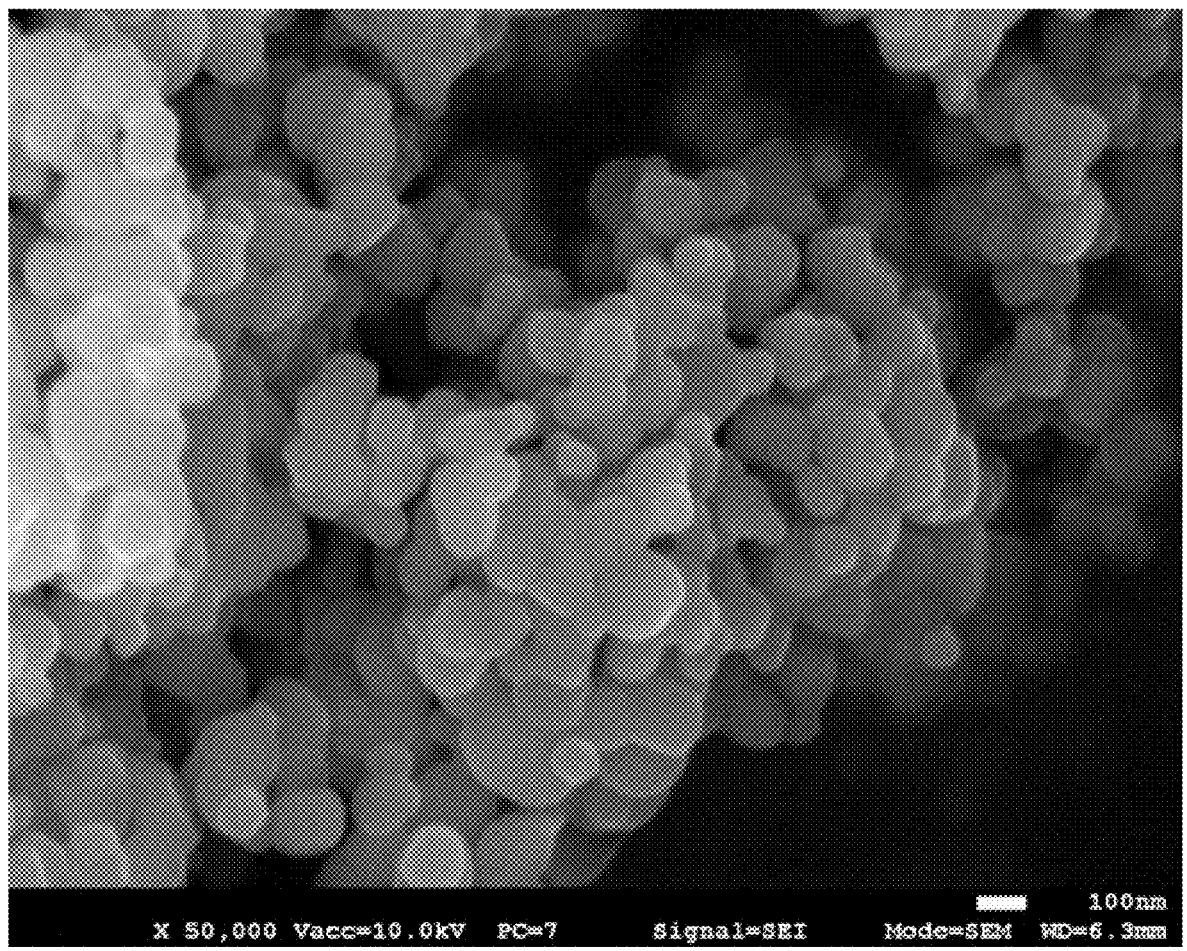
FIG. 42 SEM micrograph of titanium dioxide powder.
Figure 43:
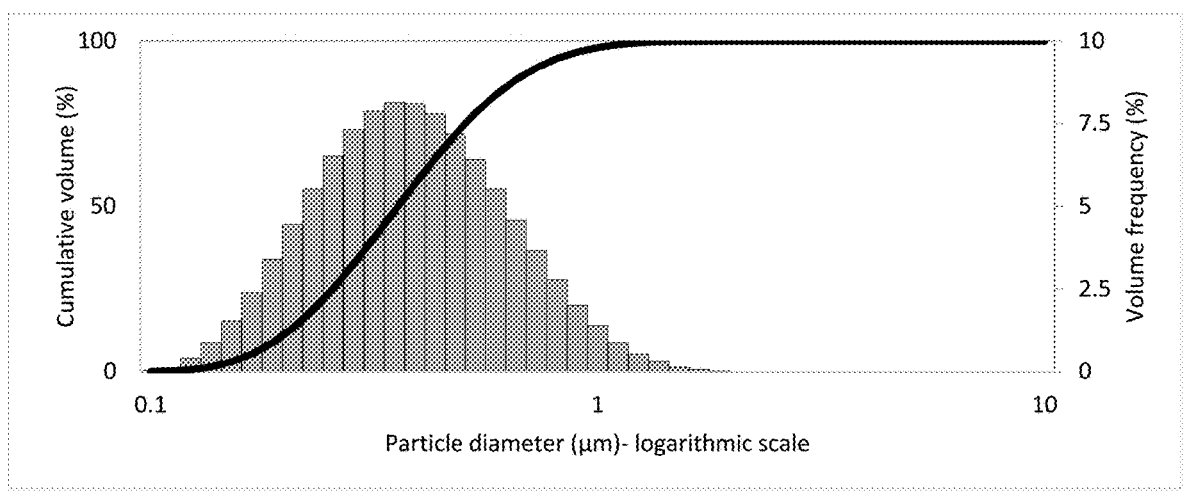
FIG. 43 Agglomerate size analysis of titanium dioxide powder in water-based suspension.

The TiO$_2$ powder was 100% anatase. FIG. 42 shows the as purchased TiO$_2$ powder (KS-203A/B, TKB Trading, US). The number-based average powder particle size was 125 nm. the volume-based particle size was D (50)=390 nm as shown in FIG. 43.

Twelve membranes were sprayed according to Table 13 and Table 14.

TABLE 13

Constant spray conditions.

| Gas (LPM) | Current (A) | power (kW) | Voltage (V) | Torch speed (m/s) | Injector diameter (mm) | No.of pass |
|---|---|---|---|---|---|---|
| Ar/H$_2$ (60/2) | 500 | 25 | 50 | 1 | 0.2 | 25 |

TABLE 14

Matrix of experiments.

| Membrane no. | Solid content (%) | Suspension flow rate (mL/min) | Spray distance (mm) |
|---|---|---|---|
| 1 | 20 | 30 | 50 |
| 2 | 20 | 30 | 60 |
| 3 | 20 | 30 | 70 |

TABLE 14-continued

Matrix of experiments.

| Membrane no. | Solid content (%) | Suspension flow rate (mL/min) | Spray distance (mm) |
|---|---|---|---|
| 4 | 20 | 40 | 50 |
| 5 | 20 | 40 | 60 |
| 6 | 20 | 40 | 70 |
| 7 | 30 | 30 | 50 |
| 8 | 30 | 30 | 60 |
| 9 | 30 | 30 | 70 |
| 10 | 30 | 40 | 50 |
| 11 | 30 | 40 | 60 |
| 12 | 30 | 40 | 70 |

Increase of the Porosity

The porosity was increased from 14% in membrane no. 1 (SPS-W-6 in the latest version of the application), to up to 47% in membrane no. 12.

Figure 44:
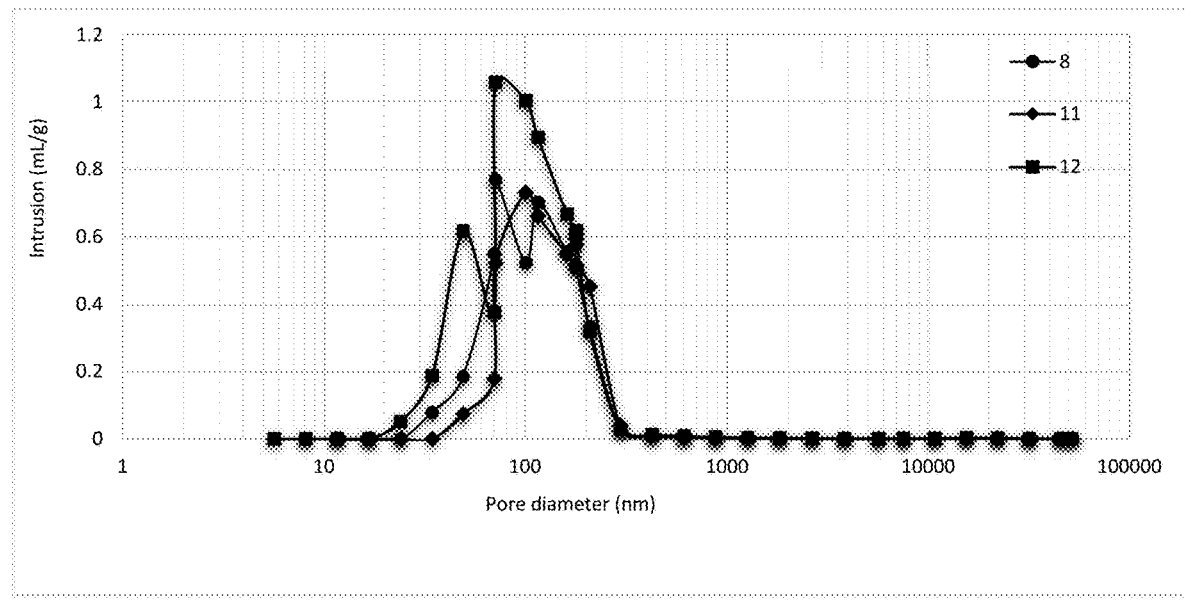
FIG. 44 MIP results for samples 8, 11 and 12.

The pore size in the membranes was around 165 nm, which is close to the $TiO_2$ powder particle size 125 nm. FIG. 44 shows the results of mercury intrusion porosimetry (MIP) for samples 8, 11 and 12. Table 14 summarizes the porosity measurements for samples SPS-W-6 (identical to membrane 1), 8, 11 and 12.

TABLE 14 porosity measurements for samples 1(SPS-W6), 8, 11 and 12.

| R | SPS-W-6 | 8 | 11 | 12 |
|---|---|---|---|---|
| Porosity (%) | 14 | 42 | 42.3 | 47 |
| Average pore size (nm) | 180 | 164 | 166 | 167 |

Increase of the Flow Rate

Figure 45:
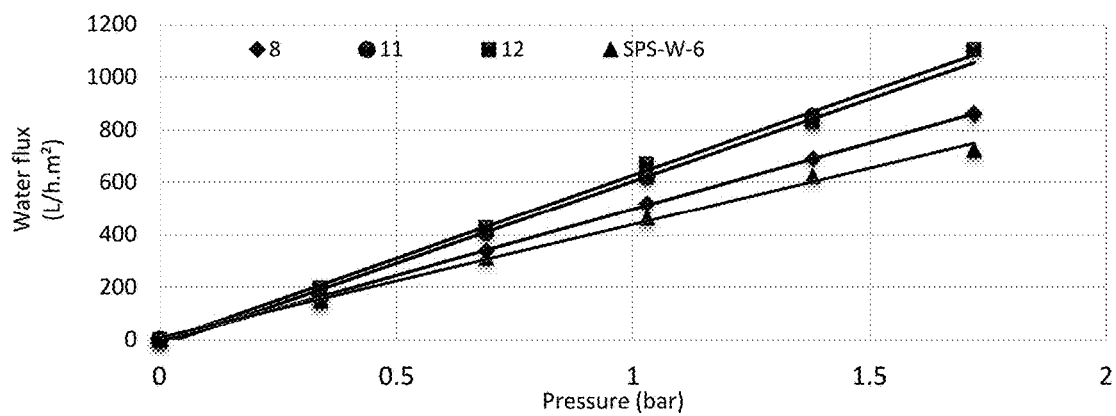
FIG. 45 Water flux of the membranes no. 8, 11 and 12 compared to no. 1 (SPS-W-6).

In order to measure the water permeability, membranes no. 8, 11 and 12, were coated on the porous alumina substrates. These three membranes showed the higher porosity based on the image analyzing results. The clean water permeation for samples 8, 11 and 12 was measured using a dead-end stirred cell (Sterlitech, HP4750, USA). As shown in FIG. 45, the water flux was increased from around 430 L/(h·m²·bar) in sample 1 to 635 L/(h·m²·bar) in sample 12, indicating an increase of around 48%.

The clean water permeability of the membranes no. SPS-W-6 (identical to sample 1), 8, 11 and 12 is summarized in Table 15.

TABLE 15

Summary of the permeability measurements in samples 8, 11 and 12 compared to sample 1 (SPS-W-6).

| Sample | SPS-W-6 | 8 | 11 | 12 |
|---|---|---|---|---|
| Thickness (μm) | 140 | 80 | 60 | 60 |
| Permeability L/(h · m² · bar) | 430 | 505 | 626 | 635 |
| Permeability increase (%) | — | 17 | 45 | 48 |

Photocatalytic Activity Under Visible Light

The photocatalytic activity of the membranes under the visible light were measured. Two 35 W Xenon arc lamps (BPS Lighting, Canada) were used. The photocatalytic property of the coatings sprayed based on Table 14 was evaluated by measuring the degradation of a 7 ppm organic methylene blue dye in an aqueous solution. Samples 3, 6, and 9 were not tested due to the low deposition efficiency of the coatings.

Figure 46:
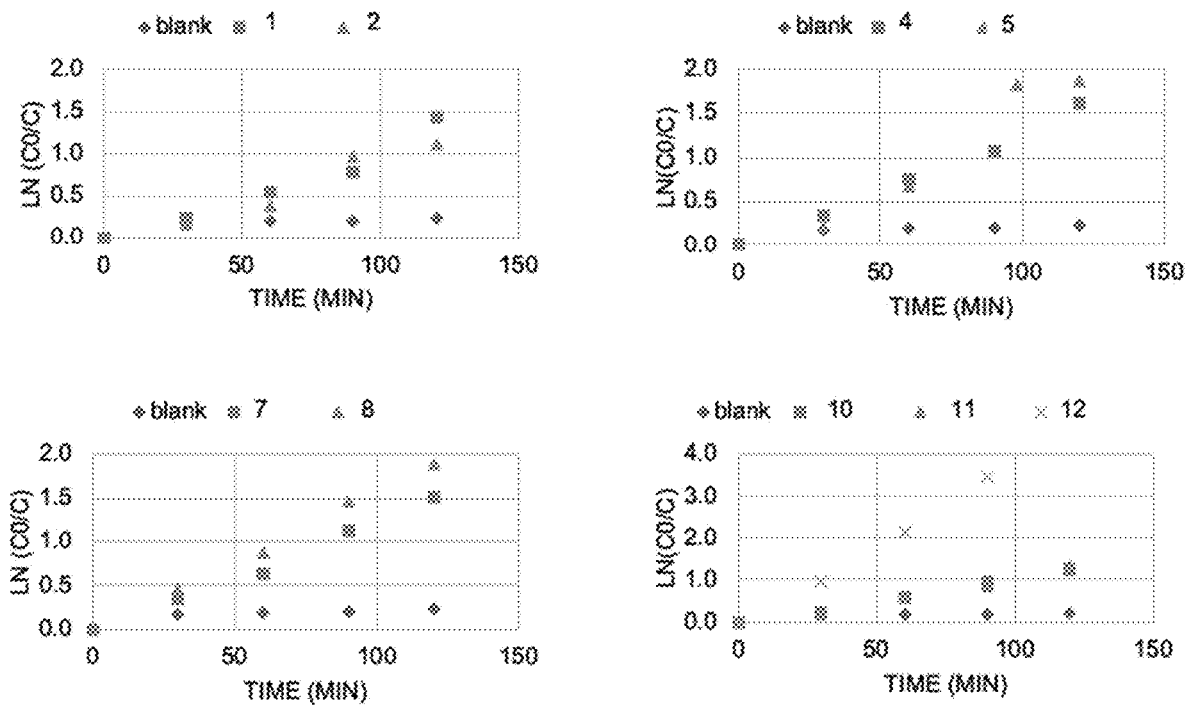
FIG. 46 Variation of $\ln(C_o/C)$ with irradiation time for SPS TiO2 membranes.

The values of the rate constant (k) and the correlation coefficient ($R^2$) are summarized in Table 16. FIG. 46, shows the plot of $\ln(C_o/C)$ against time for methylene blue under visible light. The slope corresponds to k, where higher values for k relates to faster degradation of the dye solution.

TABLE 16

Photocatalytic activity of the membranes.

| Sample | Rate constant (min⁻¹) | $R^2$ |
|---|---|---|
| blank | 0.0016 | 0.693 |
| 1 | 0.0114 | 0.9508 |
| 2 | 0.0101 | 0.9486 |
| 4 | 0.0132 | 0.9913 |
| 5 | 0.0176 | 0.9438 |
| 7 | 0.0127 | 0.9918 |
| 8 | 0.016 | 0.9974 |
| 10 | 0.0107 | 0.9938 |
| 11 | 0.0113 | 0.9782 |
| 12 | 0.0385 | 0.9946 |

Figure 47:
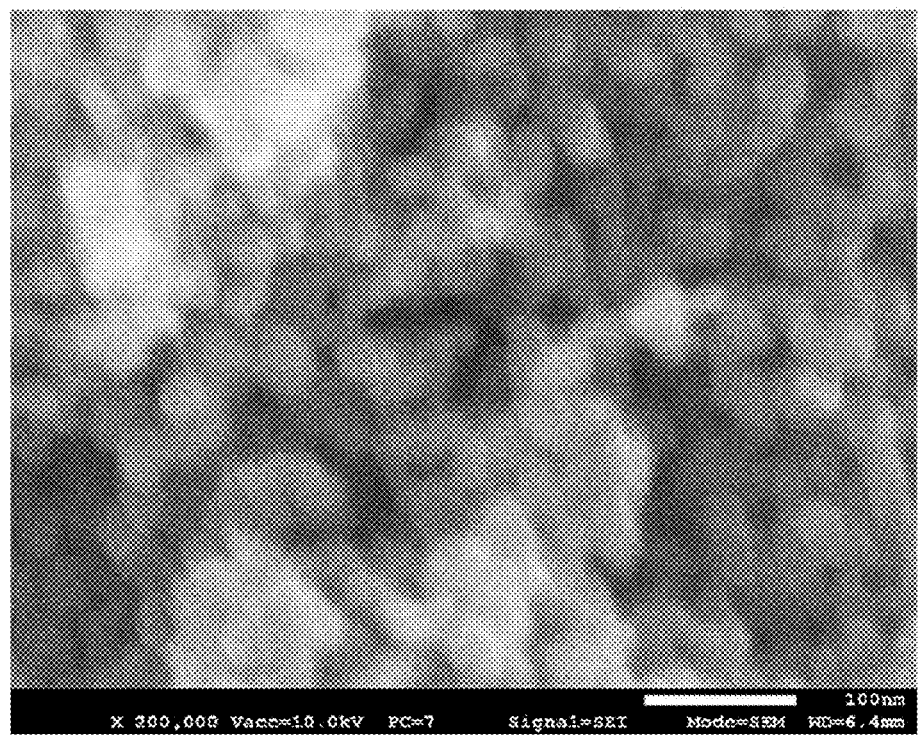
FIG. 47 SEM micrograph of titanium dioxide powder.
Figure 48:
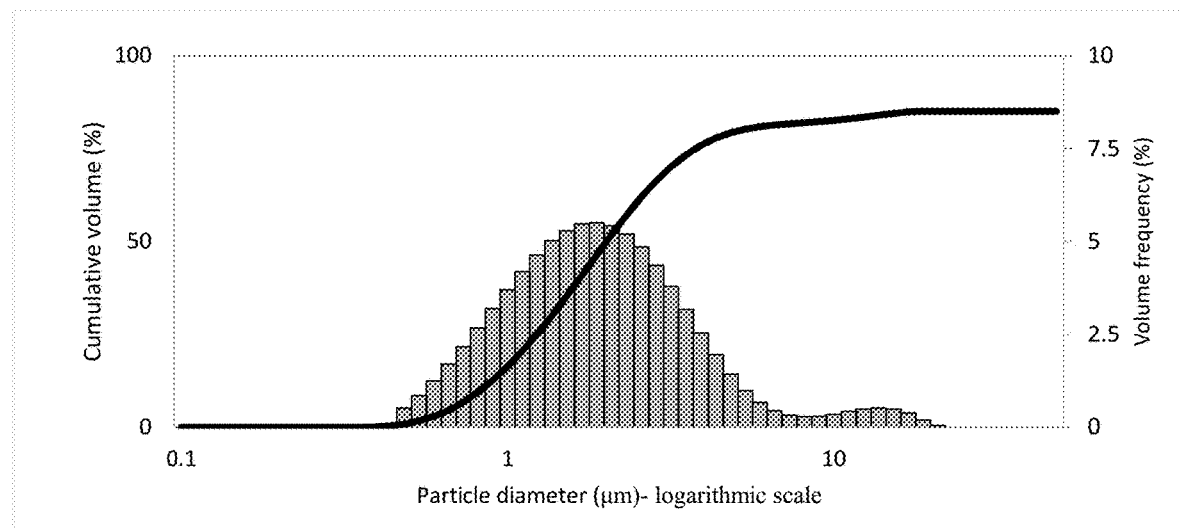
FIG. 48 Agglomerate size analysis of titanium dioxide powder in water-based suspension with PH=4.

The photocatalytic reactivity of the thermally sprayed $TiO_2$ coatings under visible light is due to a phenomenon known as self-doping. In the plasma spray process, $TiO_2$ particles are heated to their melting or partially melting temperatures in a low oxygen pressure or a hydrogen environment, resulting in inducement of oxygen vacancies in the solidified splats. Oxygen vacancies in the lattice of $TiO_2$ anatase leads to the generation of sub-stoichiometric titanium dioxide ($TiO_{2-x}$). While the $TiO_2$ powder is white, the sub-stoichiometric $TiO_2$ coating is dark blueish grey, meaning it absorbs more visible light. The presence of the oxygen deficiencies in anatase provides electronics states just below the conduction band. The electrons in these bands can hop to the conduction band enhancing the photodegradation property of the material. Thus, an oxygen deficient titanium dioxide is regarded as a self-doped catalyst. This allows the activation of the photodegradation process at lower photon energies of the visible light illumination Decrease of the Pore Size As the origin of the fine pores in the membrane is the presence of the un-melted and/or re-solidified particles from the feed stock powder in the structure, the pore size of the membrane seems to be close to the feedstock powder particle size. In order to decrease the pore size of the membrane a $TiO_2$ nano-powder (Shanghai Xinglu Chemical Co., Ltd, China) was used. FIG. 47 shows the as purchased $TiO_2$ powder (KS-203A/B, TKB Trading, US). The number-based average powder particle size was around 20-50 nm. the volume-based particle size was D (50)=2 μm as shown in FIG. 48.

A matrix of experiments was designed according to Table 17 and Table 18. Samples 50 nm-1, 50 nm-2 and 50 nm-5 were successfully sprayed. Samples 50 nm-3 and 50 nm-6 exhibited a low deposition efficiency.

TABLE 17

Constant spray conditions.

| Gas (LPM) | Current (A) | power (kW) | Voltage (V) | Torch speed (m/s) | Injector diameter (mm) | No. of pass |
|---|---|---|---|---|---|---|
| Ar/H2 (60/4.5) | 500 | 30 | 60 | 1 | 0.2 | 30 |

TABLE 18

Matrix of experiments.

| Test no. | Solid content (%) | Flow rate (ml/min) | Spray distance (mm) |
| --- | --- | --- | --- |
| 50 nm-1 | 20 | 30 | 50 |
| 50 nm-2 | 20 | 30 | 60 |
| 50 nm-3 | 20 | 30 | 70 |
| 50 nm-4 | 20 | 40 | 50 |
| 50 nm-5 | 20 | 40 | 60 |
| 50 nm-6 | 20 | 40 | 70 |

Figure 49:
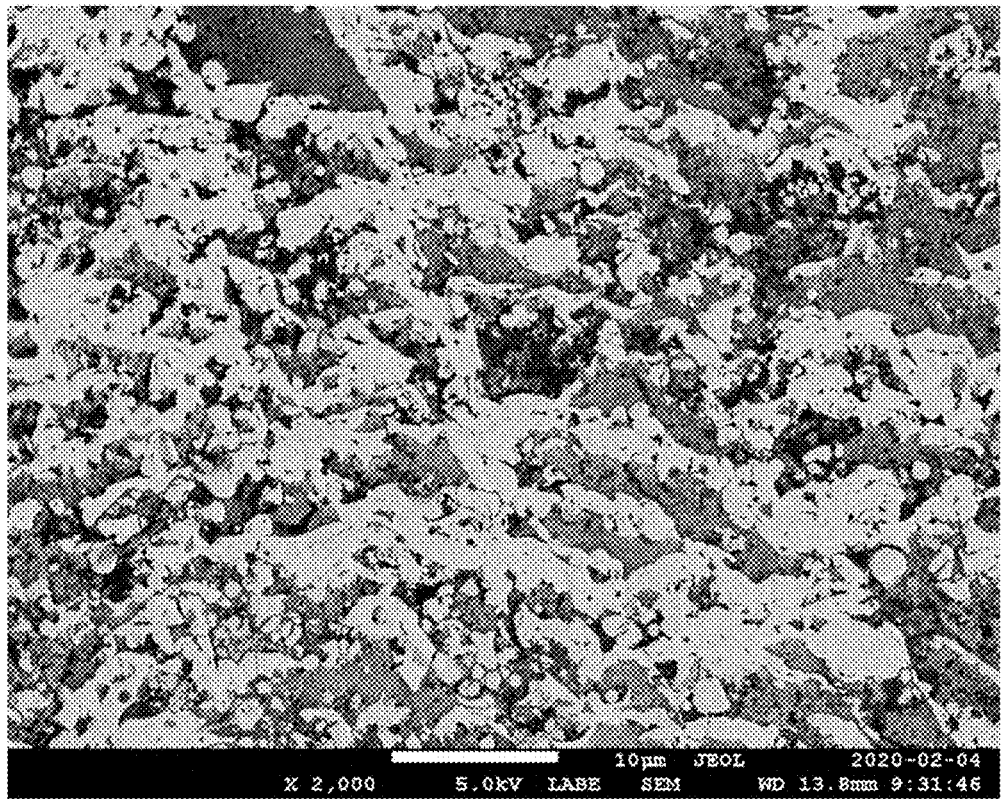
FIG. 49 SEM micrographs of the polished cross-section of sample 50 nm-2 at low magnification.
Figure 50:
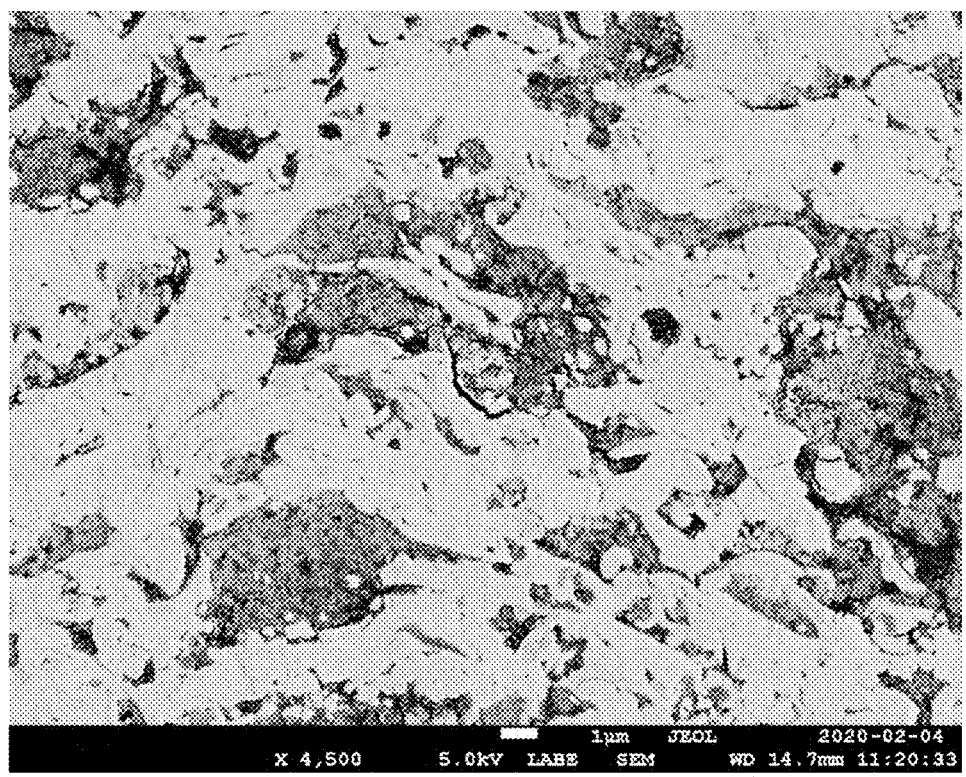
FIG. 50 SEM micrographs of the polished cross-section of sample 50 nm-2 at high magnification.

FIGS. 49 and 50 show the SEM micrographs of polished cross-section of sample 50 nm-2. Similar to the microstructural observations in the previous membranes sprayed with larger sized $TiO_2$ powder, it can be seen that the microstructure includes a body made of fully melted particles (light grey areas), large pores (black areas), and large pores filled with un-melted particles (dark grey areas).

Figure 51:
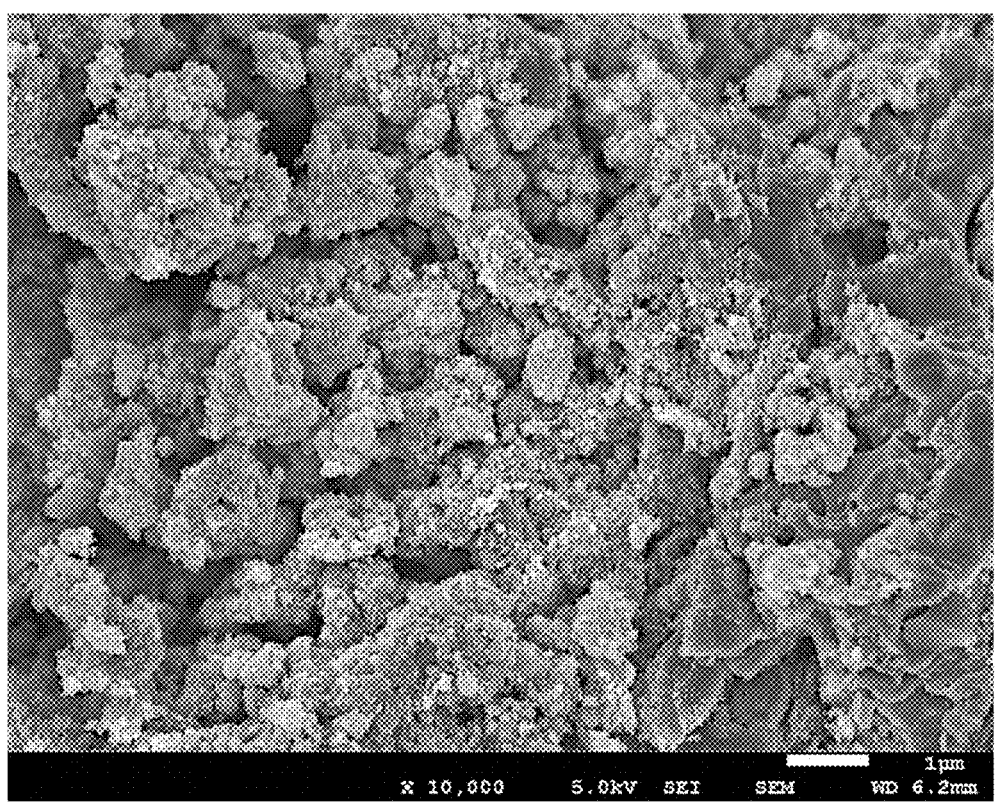
FIG. 51 SEM micrographs of the fractured cross sections of sample 50 nm-2 at low magnification FIG. 52 SEM micrographs of the fractured cross sections of sample 50 nm-2 at high magnification.
Figure 52:
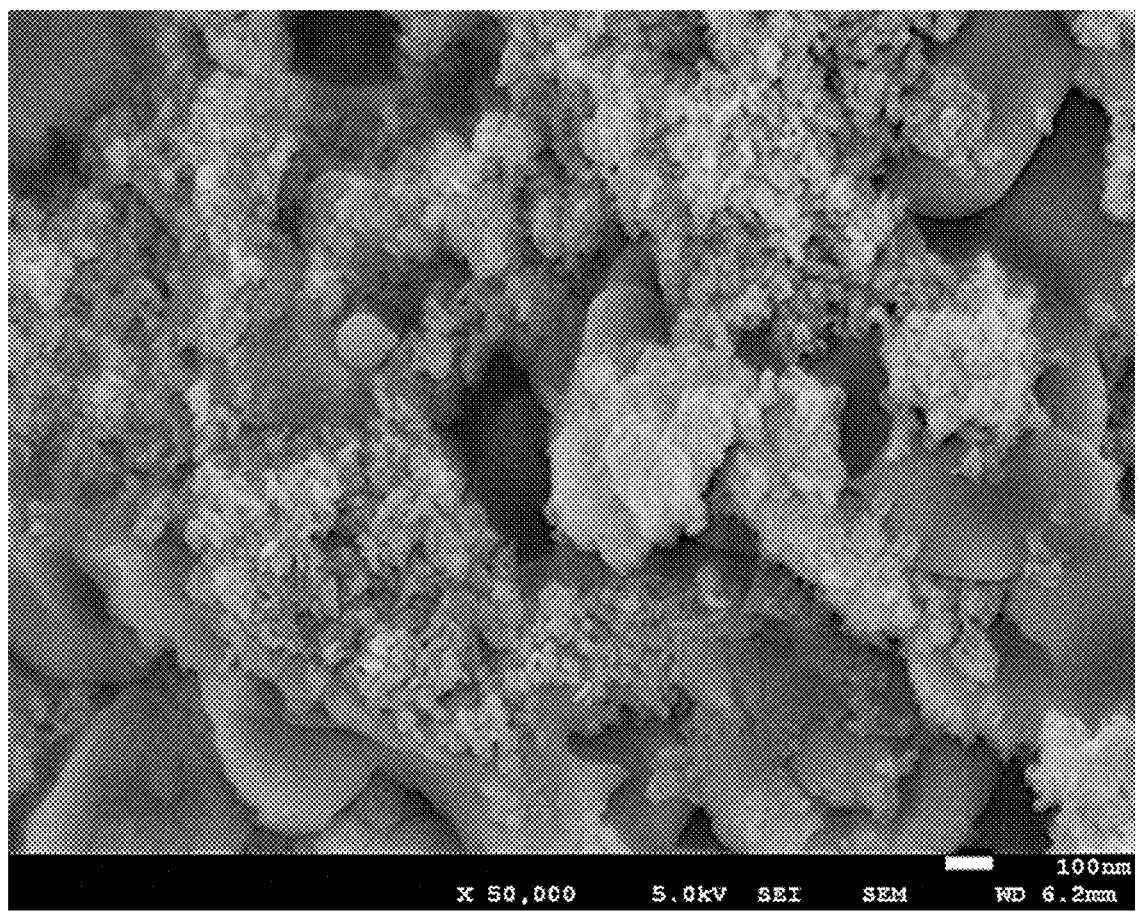

FIG. 51 shows a low magnification SEM micrograph of the fractured cross section of sample 50 nm-2. In this image it can be observed that the large pores are filled with agglomerates with the size around 1 to 2 µm can be. The size of these agglomerates is consistent with the results of the volume-based particle size analysis shown in FIG. 48. At a higher magnification in FIG. 52, it can be seen that these agglomerates consist of particles with the size of 20 to 50 nm confirming the presence of the un-melted particles within the membrane. Considering the origin of the fine pores to be the space in between of the un-melted particles, this could potentially result in a considerable decrease in the pore size of these membranes to the values close to those of the feedstock particle size (20 to 50 nm).

The scope of the claims should not be limited by the preferred embodiments set forth in the examples but should be given the broadest interpretation consistent with the description as a whole.

REFERENCES

The present description refers to a number of documents, the content of which is herein incorporated by reference in their entirety. These documents include, but are not limited to, the following:

1. D. Grey, D. Garrick, D. Blackmore, J. Kelman, M. Muller, and C. Sadoff, "Water security in one blue planet: twenty-first century policy challenges for science.," Philos. Trans. A. Math. Phys. Eng. Sci., vol. 371, no. 2002, pp. 201-204, 2013.
2. M. M. Pendergast and E. M. V. Hoek, "A review of water treatment membrane enanotechnologies," Energy Environ. Sci., vol. 4, no. 6, p. 1946, 2011.
3. M. M. Mekonnen and Y. A. Hoekstra, "Four Billion People Experience Water Scarcity," Sci. Adv., vol. 2:e1500323, no. February, pp. 1-7, 2016.
4. C. J. Vorosmarty, P. B. McIntyre, M. O. Gessner, D. Dudgeon, A. Prusevich, P. Green, S. Glidden, S. E. Bunn, C. A. Sullivan, C. R. Liermann, and P. M. Davies, "Global threats to human water security and river biodiversity," Nature, vol. 467, no. 7315, pp. 555-561, 2010.
5. R. Herman, S. Sampath, and R. McCune, "Thermal Spray: Current Status and Future Trends," MRS Bull., vol. 25, no. 7, pp. 17-25, 2000.
6. J. V. Heberlein, P. Fauchais and M. Boulos, "Thermal Spray Fundamentals," New York: Springer, 2014.
7. M. Mulder, "Basic principles of membrane technology," Dordrecht: Kluwer Acad. Publ., 2010.
8. S. Alzahrani and A. W. Mohammad, "Challenges and trends in membrane technology implementation for produced water treatment: A review," J. Water Process Eng., vol. 4, pp. 107-133, 2014.
9. H. E. Johnson and B. L. Schulman, "Assessment of the potential for refinery applications of inorganic membrane technology: An identification and screening analysis. Final report." No. DOE/FE/61680-H3. SFA Pacific, Inc., Mountain View, Calif. (United States), 1993.
10. R. W. Baker, "Membrane Technology and Applications." Hoboken, N.J.: Wiley, 2013.
11. R. Mallada and M. Menendez, "Inorganic membranes: synthesis, characterization and applications." Amsterdam: Elsevier, 2013.
12. B. Van Der Bruggen, C. Vandecasteele, T. Van Gestel, W. Doyen, and R. Leysen, "A review of pressure-driven membrane processes in wastewater treatment and drinking water production," Environ. Prog., vol. 22, no. 1, pp. 46-56, 2003.
13. M. Ulbricht, "Advanced functional polymer membranes," vol. 47, no. 7, pp. 2217-2262, 2006.
14. R. W. Baker and B. T. Low, "Gas separation membrane materials: A perspective," Macromolecules, vol. 47, no. 20, pp. 6999-7013, 2014.
15. A. Prakash Rao, N. V Desai, and R. Rangarajan, "Interfacially synthesized thin film composite RO membranes for seawater desalination," J. Membr. Sci., vol. 124, no. 2, pp. 263-272, 1997.
16. A. Sagle and B. Freeman, "Fundamentals of membranes for water treatment," Futur. Desalin. Texas, vol. 2, no. 137, pp. 1-17, 2004.
17. J. Kim and B. Van Der Bruggen, "The use of nanoparticles in polymeric and ceramic membrane structures: Review of manufacturing procedures and performance improvement for water treatment," Environ. Pollut., vol. 158, no. 7, pp. 2335-2349, 2010.
18. A. Rahimpour, M. Jahanshahi, B. Rajaeian, and M. Rahimnejad, "$TiO_2$ entrapped nanocomposite PVDF/SPES membranes: Preparation, characterization, antifouling and antibacterial properties," Desalination, vol. 278, no. 1-3, pp. 343-353, 2011.
19. L. Yan, Y. S. Li, and C. B. Xiang, "Preparation of poly(vinylidene fluoride)(pvdf) ultrafiltration membrane modified by nano-sized alumina ($Al_2O_3$) and its antifouling research," Polymer., vol. 46, no. 18, pp. 7701-7706, 2005.
20. M. Zargar, Y. Hartanto, B. Jin, and S. Dai, "Polyethylenimine modified silica nanoparticles enhance interfacial interactions and desalination performance of thin film nanocomposite membranes," J. Memb. Sci., vol. 541, pp. 19-28, 2017.
21. A. Bottino, G. Capannelli, and A. Comite, "Preparation and characterization of novel porous PVDF-$ZrO_2$ composite membranes," Desalination, vol. 146, no. 1-3, pp. 35-40, 2002.
22. L. Huang, S. Zhao, Z. Wang, J. Wu, J. Wang, and S. Wang, "In situ immobilization of silver nanoparticles for improving permeability, antifouling and anti-bacterial properties of ultrafiltration membrane," J. Memb. Sci., vol. 499, pp. 269-281, 2016.
23. J. Finley, "Ceramic membranes: A robust filtration alternative," Filtr. Sep., vol. 42, no. 9, pp. 34-37, 2005.
24. T. Tsuru, "Inorganic Porous Membranes for Liquid Phase Separation," J. Separation & purification methods, vol. 30, no. 2, pp. 191-220, 2001.
25. M. M. Cortalezzi, J. Rose, A. R. Barron, and M. R. Wiesner, "Characteristics of ultrafiltration ceramic membranes derived from alumoxane nanoparticles," *J. Memb. Sci.*, vol. 205, no. 1-2, pp. 33-43, 2002.
26. R. R. Bhave, J. Guibaud and R. Rumeau, "Inorganic Membranes Synthesis, Characteristics and Applications," Dordrecht: Springer, 1991.
27. X. Ding, Y. Fan, and N. Xu, "A new route for the fabrication of $TiO_2$ ultrafiltration membranes with suspension derived from a wet chemical synthesis," *J. Memb. Sci.*, vol. 270, no. 1-2, pp. 179-186, 2006.
28. Y. Lv, H. Liu, Z. Wang, L. Hao, Y. Sang, D. Liu, J. Wang, and R. Boughton, "Silver nanoparticle-decorated porous ceramic composite for water treatment," *J. Memb. Sci.*, vol. 331, no. 1-2, pp. 50-56, April 2009.
29. B. S. Karnik, S. H. Davies, M. J. Baumann, and S. J. Masten, "Fabrication of Catalytic Membranes for the Treatment of Drinking Water Using Combined Ozonation and Ultrafiltration." vol. 39, no. 19, pp. 7656-7661, 2005.
30. N. Ma, X. Quan, Y. Zhang, S. Chen, and H. Zhao, "Integration of separation and photocatalysis using an inorganic membrane modified with Si-doped $TiO_2$ for water purification," *J. Memb. Sci.*, vol. 335, no. 1-2, pp. 58-67, 2009.
31. "Wastewater UV Disinfection Systems—Trojan UV." [Online]. Accessed on Jul. 5, 2018. Available: https://www.trojanuv.com/products/wastewater/.
32. S. K. Sastry, A. K. Datta, and R. W. Worobo, "Ultraviolet Light," *J. Food Sci.*, vol. 65, no. 8, pp. 90-92, 2000.
33. "Fresh-Aire UV." [Online]. Accessed on Jul. 5, 2018. Available: https://www.freshaireuv.com/index.html.
34. "Air Oasis UV PCO Air Purifiers, UV Air Cleaners Sanitizers." [Online]. Accessed on Jul. 5, 2018. Available: https://www.air-oasis-uv-pco-sanitizers.com/.
35. C. Ramli, Z. Amali, N. Asim, W. N. Isahak, Z. Emdadi, N. Ahmad-Ludin, M. A Yarmo, M. A. and K. Sopian, "Photocatalytic degradation of methylene blue under UV light irradiation on prepared carbonaceous TiO2.," *Scientific World Journal.*, 2014.
36. C. G. Joseph, Y. H. Taufiq-Yap, G. Li Puma, K. Sanmugam, and K. S. Quek, "Photocatalytic degradation of cationic dye simulated wastewater using four radiation sources, UVA, UVB, UVC and solar lamp of identical power output," *Desalin. Water Treat.*, vol. 57, no. 17, pp. 7976-7987, 2016.
37. C. Xu, G. P. Rangaiah, and X. S. Zhao, "Photocatalytic Degradation of Methylene Blue by Titanium Dioxide: Experimental and Modeling Study." *J. Ind & Eng Chemistry research*, vol. 53, no. 38, pp. 14641-14649, 2014.
38. E. Bannier, G. Darut, E. Sánchez, A. Denoirjean, M. C. Bordes, M. D. Salvador, E. Rayón, E. and H. Ageorges, "Microstructure and photocatalytic activity of suspension plasma sprayed $TiO_2$ coatings on steel and glass substrates," *Surf Coatings Technol.*, vol. 206, no. 2-3, pp. 378-386, 2011.
39. S. Kozerski, F. L. Toma, L. Pawlowski, B. Leupolt, L. Latka, and L. M. Berger, "Suspension plasma sprayed $TiO_2$ coatings using different injectors and their photocatalytic properties," *Surf Coatings Technol.*, vol. 205, no. 4, pp. 980-986, 2010.
40. F.-L. Toma, G. Bertrand, D. Klein, C. Coddet, and C. Meunier, "Nanostructured photocatalytic titania coatings formed by suspension plasma spraying," *J. Therm. Spray Technol.*, vol. 15, no. 4, pp. 587-592, 2006.
41. J. H. Carey, J. Lawrence, and H. M. Tosine, "Photodechlorination of PCB's in the Presence of Titanium Dioxide in Aqueous Suspensions." *Bull. of Environmental Contamination and Toxicology*, vol. 16, no. 6, pp. 697-701, 1976.
42. E. Friedler and Y. Gilboa, "Performance of UV disinfection and the microbial quality of greywater effluent along a reuse system for toilet flushing," *Sci. Total Environ.*, vol. 408, no. 9, pp. 2109-2117, April 2010.
43. C. Sattler, L. de Oliveira, M. Tzschirner, and A. E. H. Machado, "Solar photocatalytic water detoxification of paper mill effluents," *Energy*, vol. 29, no. 5-6, pp. 835-843, April 2004.
44. M. R. Hoffmann, S. T. Martin, W. Choi, D. W. Bahnemannt, and W. M. Keck, "Environmental Applications of Semiconductor Photocatalysis," *Chem. Rev*, vol. 95, no. 1, pp. 69-96, 1995.
45. F. L. Toma, L. M, Berger, I. Shakhverdova, B. Leupolt, A. Potthoff, K. Oelschlägel, T. Meissner, J. Gomez, and Y. Miguel, "Parameters Influencing the Photocatalytic Activity of Suspension-Sprayed TiO2 Coatings," *J. Therm. Spray Technol.*, vol. 23, no. October, pp. 1-17, 2014.
46. K. Madhusudan Reddy, S. V Manorama, and A. Ramachandra Reddy, "Bandgap studies on anatase titanium dioxide nanoparticles," *Mater. Chem. Phys.*, vol. 78, no. 1, pp. 239-245, 2003.
47. Y. Ao, J. Xu, D. Fu, L. Ba, C. Yuan, "Deposition of anatase titania onto carbon encapsulated magnetite nanoparticles," *Nanotechnol.*, vol. 19, no. 40, pp. 405604, 2008.
48. R. Molinari, M. Mungari, E. Drioli, A. Paola, and V. Loddo, "Study on a photocatalytic membrane reactor for water purification," *Catal. Today*, vol. 55, no. 1-2, pp. 71-78, 2000.
49. R.-X. Zhang, L. Braeken, P. Luis, X.-L. Wang, and B. Van Der Bruggen, "Novel binding procedure of TiO2 nanoparticles to thin film composite membranes via self-polymerized polydopamine," *J. Memb. Sci.*, vol. 437, pp. 179-188, 2013.
50. S. S. Chin, K. Chiang, and A. G. Fane, "The stability of polymeric membranes in a TiO2 photocatalysis process," *J. Memb. Sci.*, vol. 275, no. 1-2, pp. 202-211, April 2006.
51. H. Choi, E. Stathatos, and D. D. Dionysiou, "Sol-gel preparation of mesoporous photocatalytic TiO2 films and TiO2/Al2O3 composite membranes for environmental applications," *Appl. Catal. B Environ.*, vol. 63, no. 1-2, pp. 60-67, 2006.
52. F. L. Toma, L. M. Berger, C. C. Stahr, T. Naumann, and S. Langner, "Microstructures and functional properties of suspension-sprayed Al2O3 and TiO2 coatings: An overview," *J. Therm. Spray Technol.*, vol. 19, no. 1-2, pp. 262-274, 2010.
53. E. S. C. Fan and O. Kesler, "Deposition of Lanthanum Strontium Cobalt Ferrite (LSCF) Using Suspension Plasma Spraying for Oxygen Transport Membrane Applications," *J. Therm. Spray Technol.*, vol. 24, no. 6, pp. 1081-1092, 2015.
54. A. Killinger, R. Gadow, G. Mauer, A. Guignard, R. Vaßen, and D. Stöver, "Review of New Developments in Suspension and Solution Precursor Thermal Spray Processes." *J. Therm. Spray Technol.*, vol. 20, no. 4, pp. 677, 2011.
55. O. Kesler, "Plasma Spray Processing of Solid Oxide Fuel Cells," *Mater. Sci. Forum*, vol. 539, pp. 1385-1390, 2007.
56. P. Fauchais, M. Vardelle, A. Vardelle, and L. Bianchi, "Plasma Spray: Study of the Coating Generation," *Ceram. Int. Publ. by Elsevier Sci. Ltd. Techna S.r*, vol. 221, no. 95, pp. 295-303, 1996.
57. G. Ramakrishnan, G. Dwivedi, S. Sampath, and A. Orlov, "Development and optimization of thermal 57. sprayed ceramic microfiltration membranes," *J. Memb. Sci., vol.* 489, pp. 106-111, September 2015.
58. X. Ma, J. Dai, H. Zhang, J. Roth, T. D. Xiao, and D. E. Reisner, "Solid Oxide Fuel Cell Development by Using Novel Plasma Spray Techniques," *J. Fuel Cell Sci. Technol.*, vol. 2, no. 3, p. 190, 2005.
59. A. A. Kulkarni, S. Sampath, A. Goland, and H. Herman, "Plasma spray coatings for producing next-generation supported membranes," *Top. Catal., vol.* 32, no. 3-4, pp. 241-249, 2005.
60. S. S. Madaeni, M. E. Aalami-Aleagha, and P. Daraei, "Preparation and characterization of metallic membrane using wire arc spraying," *J. Memb. Sci.*, vol. 320, no. 1-2, pp. 541-548, 2008.
61. K. L. Tung, C. Hsiung, T. C. Ling, K. S Chang, T. Wu, and Y. L. Li, "Preparation and characterization of aluminum oxide cermet microfiltration membrane using atmospheric plasma spraying," *Desalination*, vol. 245, no. 1-3, pp. 408-421, 2009.
62. F. L. Toma, A. Potthoff, L. M. Berger, and C. Leyens, "Demands, Potentials, and Economic Aspects of Thermal Spraying with Suspensions: A Critical Review," *J. Therm. Spray Technol.*, vol. 24, no. 7, pp. 1143-1152, 2015.
63. R. Vaßen, H. Kaßner, G. Mauer, and D. Stover, "Suspension Plasma Spraying: Process Characteristics and Applications." *J. Therm. Spray Technol.*, vol. 19, no. 1-2, pp. 219-225, January 2010.
64. L. Pawlowski, "Suspension and solution thermal spray coatings," *Surf Coatings Technol.*, vol. 203, no. 19, pp. 2807-2829, 2009.
65. P. Fauchais, V. Rat, C. Delbos, J. F. Coudert, and T. Chartier, "Understanding of Suspension DC Plasma Spraying of Finely Structured Coatings for SOFC." *Trans. on Plasma Sci.*, vol. 33, no. 2, pp. 920-930, 2010.
66. P. Fauchais, R. Etchart, and C. Delbos, "Suspension and solution plasma spraying of finely structured layers: potential application to SOFCs," *J. Phys. D Appl. Phys*, vol. 40, pp. 2394-2406, 2007.
67. N. Sharifi, M. Pugh, C. Moreau, and A. Dolatabadi, "Developing hydrophobic and superhydrophobic $TiO_2$ coatings by plasma spraying," *Surf Coat. Technol., vol.* 289, pp. 29-36, 2016.
68. A. Vardelle, C. Moreau, N. J. Themelis, and C. Chazelas, "A Perspective on Plasma Spray Technology." *Plasma Chem. and Plasma Process.*, vol. 35, no. 3, pp. 491-509, May. 2015.
69. P. Fauchais, V. Rat, J. F. Coudert, R. Etchart-Salas, and G. Montavon, "Operating parameters for suspension and solution plasma-spray coatings," *Surf Coatings Technol.*, vol. 202, no. 18, pp. 4309-4317, 2008.
70. P. Fauchais and A. Vardelle, "Solution and Suspension Plasma Spraying of Nanostructure Coatings," *Adv. Plasma Spray Appl.*, no. March 2012, pp. 149-188, 2012.
71. P. Fauchais, R. Etchart-Salas, V. Rat, J. F. Coudert, N. Caron, and K. Wittmann-Ténèze, "Parameters controlling liquid plasma spraying: Solutions, sols, or suspensions," *J. Therm. Spray Technol.*, vol. 17, no. 1, pp. 31-59, March 2008.
72. J. O. Berghaus, J.-G. Legoux, C. Moreau, F. Tarasi, and T. Chrska, "Mechanical and Thermal Transport Properties of Suspension Thermal-Sprayed Alumina-Zirconia Composite Coatings." *J. Therm. Spray Technol.*, vol. 17, no. 1 pp. 91 104, 2008.
73. K. Vanevery, M. Krane, R. W. Trice, and, H. Wang, "Column Formation in Suspension Plasma-Sprayed Coatings and Resultant Thermal Properties." *J. Therm. Spray Technol.*, vol. 20, no. 4, pp. 817-828, 2011.
74. F. L. Toma, L. M. Berger, D. Jacquet, and D. Wicky, "Comparative study on the photocatalytic behaviour of titanium oxide thermal sprayed coatings from powders and suspensions," *Surf Coatings Technol.*, vol. 203, no. 15, pp. 2150-2156, 2009.
75. F. L. Toma, G. Bertrand, D. Klein, C. Meunier, and S. Begin, "Development of photocatalytic active Tio2 surfaces by thermal spraying of nanopowders," *J. Nanomater.*, vol. 2008, no. 1, p. 58, 2008.
76. E. Bannier, G. Darut, E. Sanchez, A. Denoirjean, M. C. Bordes, M. D. Salvador, E. Rayón, E. and H. Ageorges, "Microstructure and photocatalytic activity of suspension plasma sprayed $TiO_2$ coatings on steel and glass substrates," *Surf. Coatings Technol., vol.* 206, no. 2-3, pp. 378-386, 2011.
77. D. A. H. Hanaor and C. C. Sorrell, "Review of the anatase to rutile phase transformation." *J. Material Sci.*, vol. 46, no. 4, pp. 855-874, 2011.
78. G. Mauer, A. Guignard, and R. VaRen, "Plasma spraying of efficient photoactive $TiO_2$ coatings," *Surf. Coatings Technol.*, vol. 220, pp. 40-43, 2013.
79. E. S. C. Fan and O. Kesler, "Deposition of Lanthanum Strontium Cobalt Ferrite (LSCF) Using Suspension Plasma Spraying for Oxygen Transport Membrane Applications," *J. Therm. Spray Technol.*, vol. 24, no. 6, pp. 1081-1092, August 2015.
80. M. C. Bordes, M. Vincent, A. Moreno, and R. Moreno, "Microstructure and photocatalytic activity of APS coatings obtained from different TIO2 nanopowders," *Surf. Coatings Technol., vol.* 220, pp. 179-186, April 2013.
81. O. Rezania, "Anelastic Behavior of Suspension Plasma Sprayed Ceramic Coatings," Master, Concordia University, 2016.
82. R. Rampon, O. Marchand, C. Filiatre, and G. Bertrand, "Influence of suspension characteristics on coatings microstructure obtained by suspension plasma spraying," *Surf Coatings Technol.*, vol. 202, no. 18, pp. 4337-4342, June 2008.
83. A. B. Abell, K. L. Willis, and D. A. Lange, "Mercury Intrusion Porosimetry and Image Analysis of Cement-Based Materials." *J. Colloid & Interface Sci.*, vol. 211, no. 1, pp. 39-44. March 1999.
84. S. hee Kim and C. C. Chu, "Pore structure analysis of swollen dextran-methacrylate hydrogels by SEM and mercury intrusion porosimetry," *J. Biomed. Mater. Res.*, vol. 53, no. 3, pp. 258-266, 2000.
85. "HP4750 assembly; operational manual." Sterlitch corp., 2018. Accessed on Jul. 5, 2018,
86. [Online]. Available: https://www.sterlitech.com/media/wysiwyg/Manual2018/Manual_HP4750.pdf
87. K. Fischer, M. Grimm, J. Meyers, C. Dietrich, R. Glaser, and A. Schulze, "Photoactive microfiltration membranes via directed synthesis of TiO2 nanoparticles on the polymer surface for removal of drugs from water," *J. Membrane Sci.*, vol. 478, pp. 49-57, 2015.
88. D. J. Udonne, N. A. Folami, "Treatment of Industrial Waste Effluent Using Treated Bagasse," *Int. J. Sci. Eng. Res.*, vol. 7, no. 3, pp. 389-397, 2016.
89. Z. ivcová, E. Gregorová, W. Pabst, D. S. Smith, A. Michot, and C. Poulier, "Thermal conductivity of porous alumina ceramics prepared using starch as a pore-forming agent," *J. Eur. Ceram. Soc.*, vol. 29, no. 3, pp. 347-353, February 2009.
90. H. Kassner, R. Siegert, D. Hathiramani, R. Vassen, and D. Stoever, "Application of suspension plasma spraying (SPS) for manufacture of ceramic coatings," *J. Therm. Spray Technol.*, vol. 17, no. 1, pp. 115-123, 2008.

91. S. Sampath, X. Jiang, J. Matejicek, A. Leger, and A. Vardelle, "Substrate temperature effects on splat formation, microstructure development and properties of plasma sprayed coatings Part I: Case study for partially stabilized zirconia," *Mater. Sci. Eng. A*, vol. 272, no. 1, pp. 181-188, November 1999.
92. C. G. Joseph, Y. H. Taufiq-Yap, G. Li Puma, K. Sanmugam, and K. S. Quek, "Photocatalytic degradation of cationic dye simulated wastewater using four radiation sources, UVA, UVB, UVC and solar lamp of identical power output," *Desalin. Water Treat.*, vol. 57, no. 17, pp. 7976-7987, 2016.
93. Tarasi, F., Alebrahim, E., Dolatabadi, A., & Moreau, C. (2019). A Comparative Study of YSZ Suspensions and coatings. *Coatings,* 9(3), 188.
94. A. Larbot, J. P. Fabre, C. Guizard, L. Cot, Inorganic membranes obtained by sol-gel techniques, J. Memb. Sci. 39 (1988) 203-212. doi:10.1016/50376-7388(00)80929-1.
95. F. L. Toma, L. M. Berger, C. C. Stahr, T. Naumann, S. Langner, Microstructures and functional properties of suspension-sprayed Al2O3 and TiO2 coatings: An overview, J. Therm. Spray Technol. 19 (2010) 262-274. doi: 10.1007/s11666-009-9417-z.
96. P. Fauchais, R. Etchart-Salas, V. Rat, J. F. Coudert, N. Caron, K. Wittmann-Ténèze, Parameters controlling liquid plasma spraying: Solutions, sols, or suspensions, J. Therm. Spray Technol. 17 (2008) 31-59. doi:10.1007/s11666-007-9152-2.
97. Zhai et al. Ceramics International 45 (2019) 930-935
98. M. Le Bechec, N. Costarramone, T. Pigot, S. Lacombe, Gas-Phase Photooxidation: Reactors and Materials, Chem. Eng. Technol. 39 (2016) 26-38. https://doi.org/10.1002/ceat.201500349.
99. X. Qiu, M. Miyauchi, K. Sunada, M. Minoshima, M. Liu, Y. Lu, D. Li, Y. Shimodaira, Y. Hosogi, Y. Kuroda, K. Hashimoto, Hybrid CuxO/TiO2 nanocomposites as risk-reduction materials in indoor environments, ACS Nano. 6 (2012) 1609-1618. https://doi.org/10.1021/nn2045888.
100. K. Sunada, M. Minoshima, K. Hashimoto, Highly efficient antiviral and antibacterial activities of solid-state cuprous compounds, J. Hazard. Mater. 235 (2012) 265-270. https://doi.org/10.1016/j.jhazmat.2012.07.052.
101. M. Thukkaram, P. Cools, A. Nikiforov, P. Rigole, T. Coenye, P. Van Der Voort, G. Du Laing, C. Vercruysse, H. Declercq, R. Morent, L. De Wilde, P. De Baets, K. Verbeken, N. De Geyter, Antibacterial activity of a porous silver doped TiO2 coating on titanium substrates synthesized by plasma electrolytic oxidation, (2019). https://doi.org/10.1016/j.apsusc.2019.144235.
US 2006/199024 A
US 2011/244216 A
US 2012/052183 A
US 2013/220126 A
US 2013/255499 A
US 2013/260132 A
US 2014/197103 A
US 2015/140284 A
US 2015/162583 A
US 2015/233256 A
US 2015/258508 A
US 2016/273089 A
US 2016/281204 A
US 2016/320059 A
US 2017/152753 A
WO 2014/126633 A3
WO 2018/073538 A1
WO 2018/073538 A1
WO 98/20181 A1
CN 103623711 A
CN 108787370
CN 108793978 A
CN 204563801 U
CN 206476792 U
DE 102014222686 A1
KR 20180076523 A

The invention claimed is:

1. A filtration membrane comprising a porous support substrate and a porous active layer on top of the support substrate,
    wherein the active layer is formed of a network of interconnected, randomly arranged ceramic splats with ceramic particles occupying interstices between the splats, and
    wherein free spaces between the particles define a network of interconnected pores extending through the thickness of the active layer,
    wherein the splats are thin lamellae and the particles are spheroidal,
    wherein the splats are between about 50 nm and about 1 µm thick and between about 0.2 µm and about 5 µm in width and length,
    wherein the particles have an average particle size between about 0.02 µm and about 5 µm,
    wherein the splats and the particles are made of a same material, and
    wherein a splats:particles weight ratio in the active layer is about 30:70 and about 70:30.

2. The membrane of claim 1, wherein the splats are between about 100 nm and about 500 nm thick and between about 0.5 µm and about 5 µm in width and length.

3. The membrane of claim 1, wherein the particles have an average particle size between about 20 nm and about 200 nm.

4. The membrane of claim 1, wherein the active layer has a porosity between about 10% and about 60%.

5. The membrane of claim 1, wherein the active layer has an average pore size between about 0.001 µm and about 15 µm.

6. The membrane of claim 1, wherein the total surface area of the particles represents about half of the surface area of the active layer and the total surface area of the splats represents the remaining half of the surface area of the active layer.

7. The membrane of claim 1, wherein the ceramic splats and ceramic particles are made of a ceramic, a ceramic composite, a ceramic/graphene composite or a combination thereof.

8. The membrane of claim 7, wherein the ceramic, the ceramic composite, or the ceramic/graphene composite has anti-fouling photocatalytic properties.

9. A method of filtering a feed using the membrane of claim 1, the method comprising the step of contacting the feed with the active layer of the membrane and applying pressure to the feed so that materials to be separated from the feed pass through the membrane as a permeate, wherein the feed is gaseous or liquid.

10. The method of claim 9, wherein, in the membrane, the splats and/or the particles are made of a material with anti-fouling photocatalytic properties.

11. The method of claim 10, further comprising the step of photodegrading one or more organic compounds in the feed by exposing the membrane to UV radiation while the feed is in contact with the membrane.

12. The method of claim 10, further comprising the step of cleaning the membrane by exposing the membrane to UV radiation, thereby degrading fouling material on the membrane.

13. A method of manufacturing the membrane of claim 1, the method comprising the steps of:
  a) providing a support substrate;
  b) providing a suspension of ceramic particles; and
  c) suspension plasma spraying the particles onto the support substrate to produce a porous active layer on the substrate, under conditions such that, when impacting the support, some of the particles are in liquid form and thus form splats in the active layer and some of the particles are in solid form and thus remain in the form of particles in the active layer.

14. The method of claim 13, wherein two or more suspensions comprising the same particles are injected at two different locations in the plasma jet during suspension plasma spraying.

15. The method of claim 13, wherein during suspension plasma spraying, the support substrate is cooled.

16. The method of claim 13, wherein a single suspensions is injected in the plasma jet and step c) comprises adjusting stand-off distance, gas flow rate, gas composition, suspension feeding rate, torch speed, and torch power so that, when impacting the support, some of the particles are in liquid form and thus form splats in the active layer and some of the particles are in solid form and thus remain in the form of particles in the active layer.

17. The membrane of claim 1, wherein a section of the active layer, in the thickness direction, closest to the support substrate is free of columnar structures.

18. The membrane of claim 1, wherein the active layer is free of columnar structures.

19. The membrane of claim 1, wherein the active layer has a porosity between about 40% and about 60%.

20. The membrane of claim 1, wherein a splats:particles weight ratio in the active layer is about 50:50.

* * * * *